United States Patent [19]
Sussman et al.

[11] Patent Number: 5,686,960
[45] Date of Patent: Nov. 11, 1997

[54] IMAGE INPUT DEVICE HAVING OPTICAL DEFLECTION ELEMENTS FOR CAPTURING MULTIPLE SUB-IMAGES

[75] Inventors: Michael Sussman, 51 Myrtle Ter., Winchester, Mass. 01890; Harry R. McKinley, Southampton; Robert H. Webb, Lincoln, both of Mass.

[73] Assignee: Michael Sussman, Winchester, Mass.

[21] Appl. No.: 218,566

[22] Filed: Mar. 28, 1994

Related U.S. Application Data

[63] Continuation-in-part of Ser. No. 820,568, Jan. 14, 1992, abandoned.

[51] Int. Cl.$^6$ ............................................. H04N 5/225
[52] U.S. Cl. ........................... 348/218; 348/335; 382/284
[58] Field of Search ...................................... 348/218, 219, 348/207, 335, 340; 382/284; 250/201.5

[56] References Cited

U.S. PATENT DOCUMENTS

| | | | |
|---|---|---|---|
| 3,614,190 | 10/1971 | Haines | 350/3.5 |
| 4,002,824 | 1/1977 | Petrocelli et al. | 358/180 |
| 4,004,086 | 1/1977 | Buss | 358/109 |
| 4,005,285 | 1/1977 | Price | 250/208 |
| 4,038,690 | 7/1977 | Hoagland | 358/213 |
| 4,044,384 | 8/1977 | Inokuchi | 358/293 |
| 4,134,135 | 1/1979 | Inokuchi et al. | 358/280 |
| 4,204,230 | 5/1980 | Sprague | 358/213 |

(List continued on next page.)

FOREIGN PATENT DOCUMENTS

| | | | |
|---|---|---|---|
| 0 462 748 | 12/1991 | European Pat. Off. | |
| 2 627 042 | 8/1989 | France | |
| 59-9623 | 1/1984 | Japan | |
| 59-033978 | 2/1984 | Japan | |
| 5095529 | 4/1993 | Japan | H04N 5/93 |
| 5130489 | 5/1993 | Japan | H04N 5/232 |
| WO 90/15499 | 12/1990 | WIPO | |
| WO 93/14594 | 7/1993 | WIPO | H04N 5/335 |

OTHER PUBLICATIONS

Converso, L. and Hoseck, S., Optical Character Recognition, J. Vis. Inpair. Blind., pp. 493–498 (Dec. 1990, New York, New York).

DeWitt, J.C. et al., A Look at Closed Circuit Televison Systems (CCTV) for Persons with Low Vision, J. Vis. Inpair. Blind., pp. 151–199 (Apr. 1988, New York, New York).

Fant, K.M., IEEE Computer Graphics and Applications, A Nonaliasing, Real–Time Spatial Transform Technique, pp. 71–80 (Jan. 1986, New York, New York).

Frederick, C. and Schwartz, E., Conformal Image Warping, IEEE Computer Graphics and Applications, pp. 54–61, 2 (1990, New York, New York).

George Wolberg, Digital Image Warping (IEEE Compute Society Press 1990, Los Alamitos, California).

Seitz, P., Optical Superresolution Using Solid–State Cameras and Digital Signal Processing, Optical Engineering, vol. 27, No. 7, pp. 535–540 (Jul. 1988).

Product Data Sheet for Part No. TMC2301, TRW LSI Products Inc., La Jolla, California (Nov. 1990).

Product Data Sheet for Part No. TMC2208, TRW LSI Products Inc., La Jolla, California (Nov. 1990).

*Primary Examiner*—Wendy Garber
*Attorney, Agent, or Firm*—Fish & Neave; Richard A. Inz; G. Victor Treyz

[57] ABSTRACT

An image input device is provided in which an optical deflector is positioned to divide the image of an object into a plurality of sub-images and to deflect the sub-images to an image sensor via an imaging lens. The images sensed by the image sensor are stored in a memory and combined by an image processor to form a composite image of the object. A hybrid zoom arrangement allows the magnification of an image on a display to be adjusted both mechanically and electronically. Techniques and circuitry for image processing allow a user to remove undesirable motion blur from the real time image and allow an input image to be patch-wise warped into an output image. An optical encoder for accurately determining the position of a deflector such as a mirror has also been provided.

56 Claims, 40 Drawing Sheets

U.S. PATENT DOCUMENTS

| | | | |
|---|---|---|---|
| 4,204,729 | 5/1980 | Inokuchi | 355/11 |
| 4,224,509 | 9/1980 | Cheng | 235/457 |
| 4,231,062 | 10/1980 | Stewich | 358/109 |
| 4,272,684 | 6/1981 | Seachman | 250/578 |
| 4,323,925 | 4/1982 | Abell et al. | 358/213 |
| 4,333,006 | 6/1982 | Gorin et al. | 235/457 |
| 4,348,593 | 9/1982 | Seachman | 250/578 |
| 4,356,513 | 10/1982 | Yoshimura et al. | 358/213 |
| 4,383,170 | 5/1983 | Takagi et al. | 250/216 |
| 4,424,534 | 1/1984 | Nagane | 358/287 |
| 4,516,032 | 5/1985 | Barr | 250/578 |
| 4,543,491 | 9/1985 | Tateoka et al. | 250/578 |
| 4,589,030 | 5/1986 | Kley | 358/225 |
| 4,656,517 | 4/1987 | Shida et al. | 358/213 |
| 4,661,858 | 4/1987 | Tateoka | 358/284 |
| 4,669,812 | 6/1987 | Hoebing | 350/3.73 |
| 4,676,596 | 6/1987 | Kato et al. | 350/167 |
| 4,745,484 | 5/1988 | Drexler et al. | 358/227 |
| 4,748,507 | 5/1988 | Gural | 358/213.28 |
| 4,762,989 | 8/1988 | Motooka | 250/216 |
| 4,786,964 | 11/1988 | Plummer et al. | 358/44 |
| 4,793,812 | 12/1988 | Sussman et al. | 434/116 |
| 4,835,532 | 5/1989 | Fant | 340/728 |
| 4,897,539 | 1/1990 | Wester-Ebinghaus | 250/216 |
| 4,928,137 | 5/1990 | Kinoshita | 358/213.26 |
| 5,064,258 | 11/1991 | Inokuchi et al. | 350/21 |
| 5,138,471 | 8/1992 | McGrew | 359/17 |
| 5,182,659 | 1/1993 | Clay et al. | 359/17 |
| 5,187,754 | 2/1993 | Currin et al. | 382/284 |
| 5,194,959 | 3/1993 | Kaneko et al. | 358/225 |
| 5,210,559 | 5/1993 | Ohki | 354/202 |
| 5,218,190 | 6/1993 | Hardesty et al. | 235/462 |
| 5,227,896 | 7/1993 | Ozawa et al | 358/474 |
| 5,369,264 | 11/1994 | Rosa et al. | 235/462 |

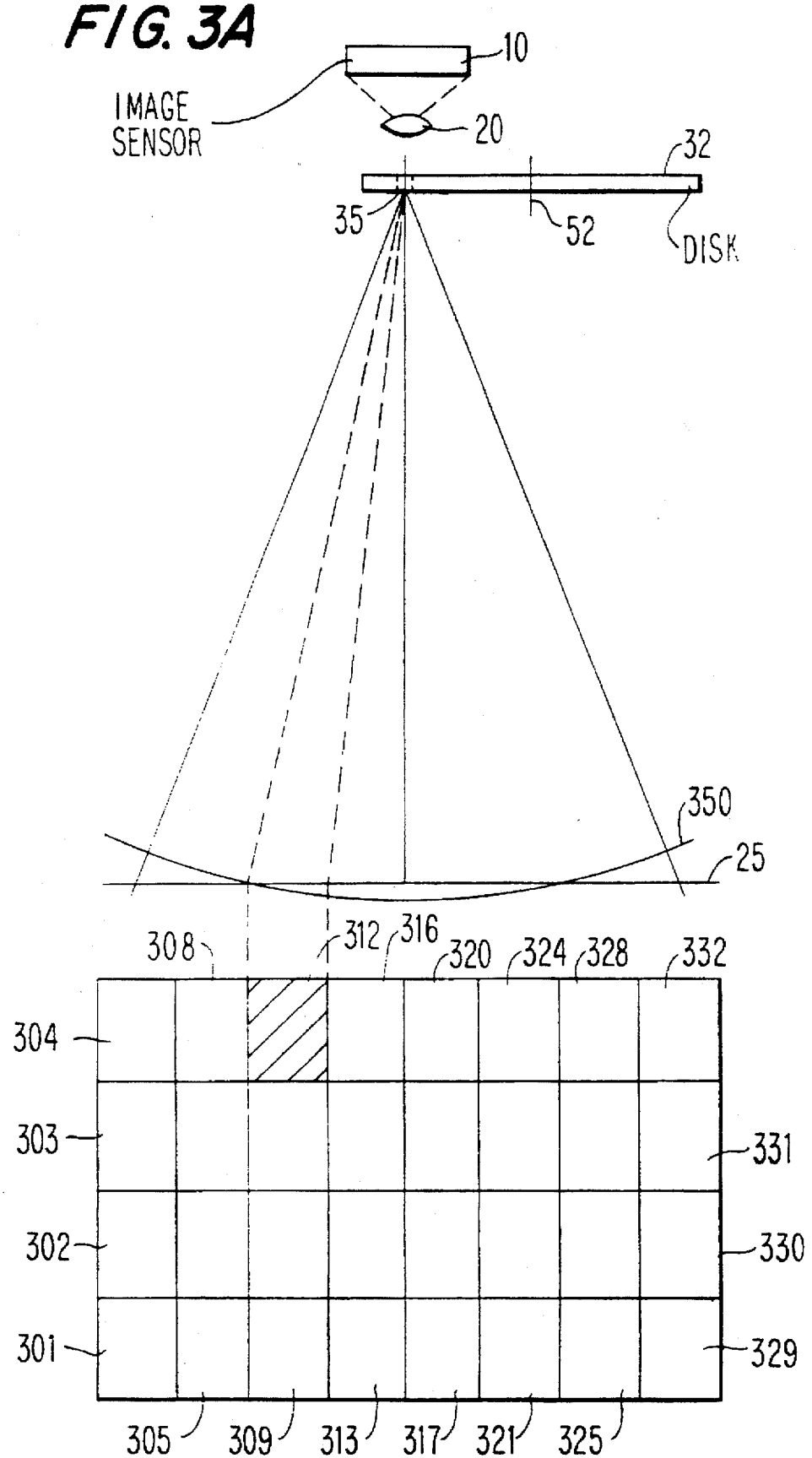

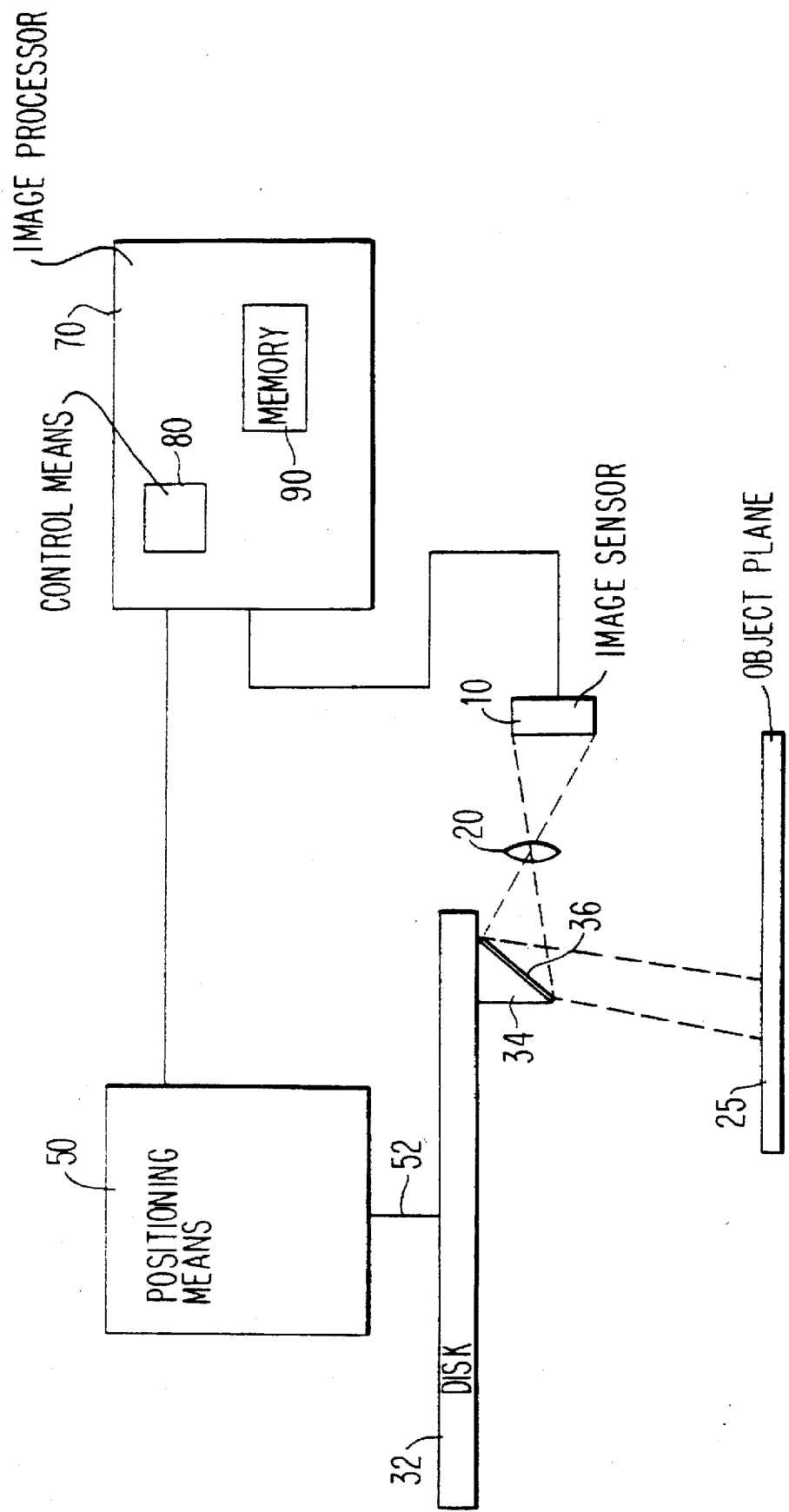

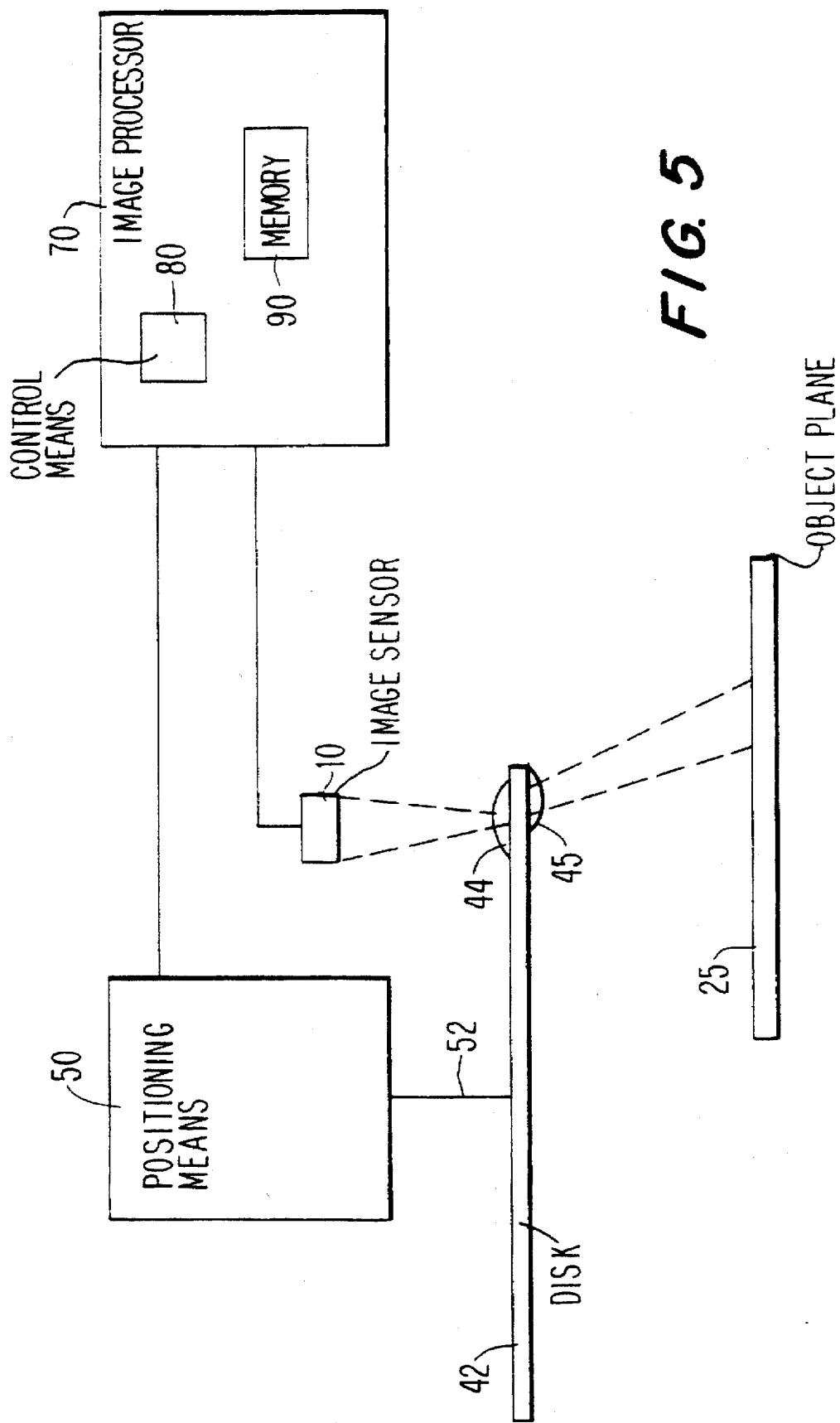

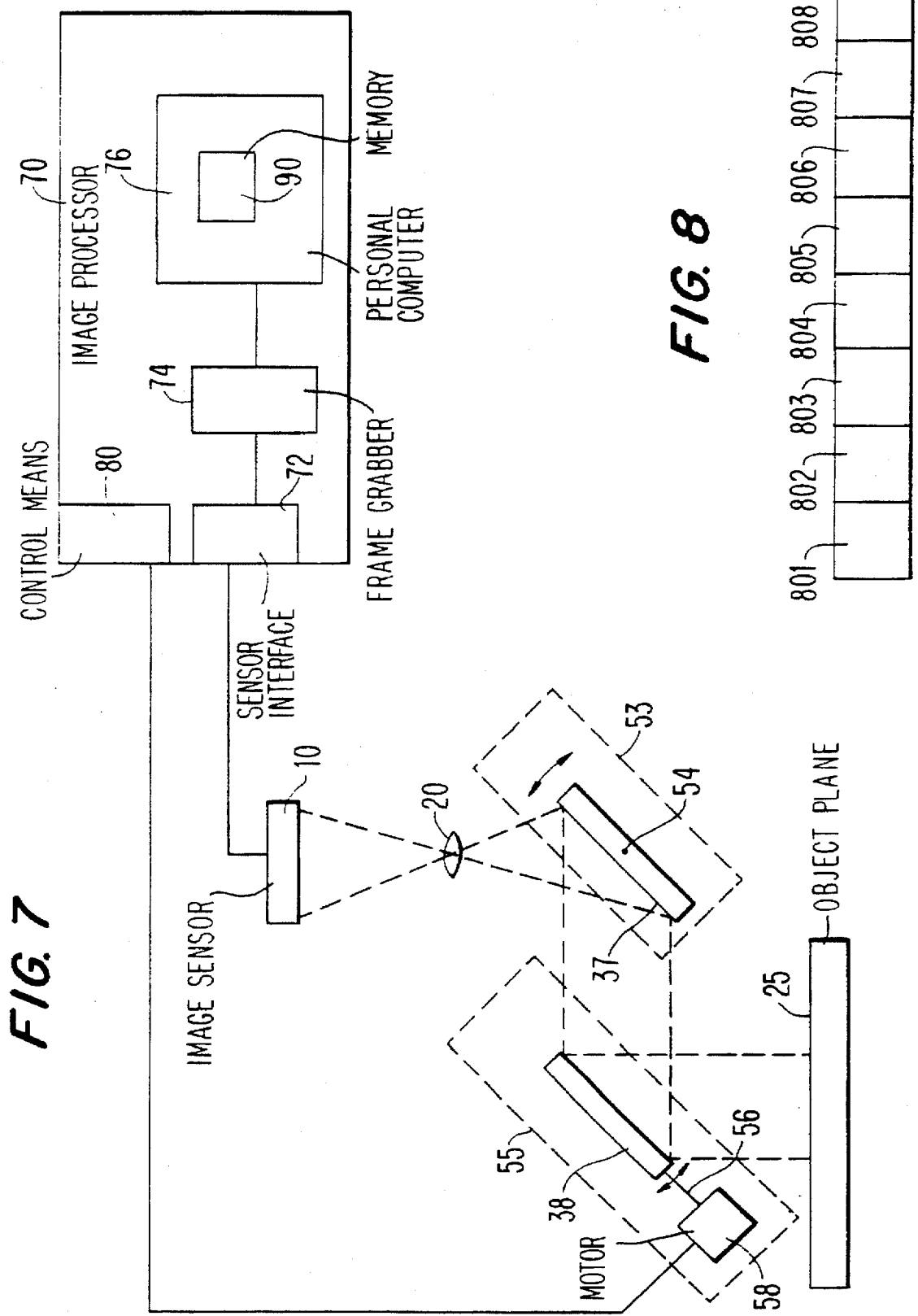

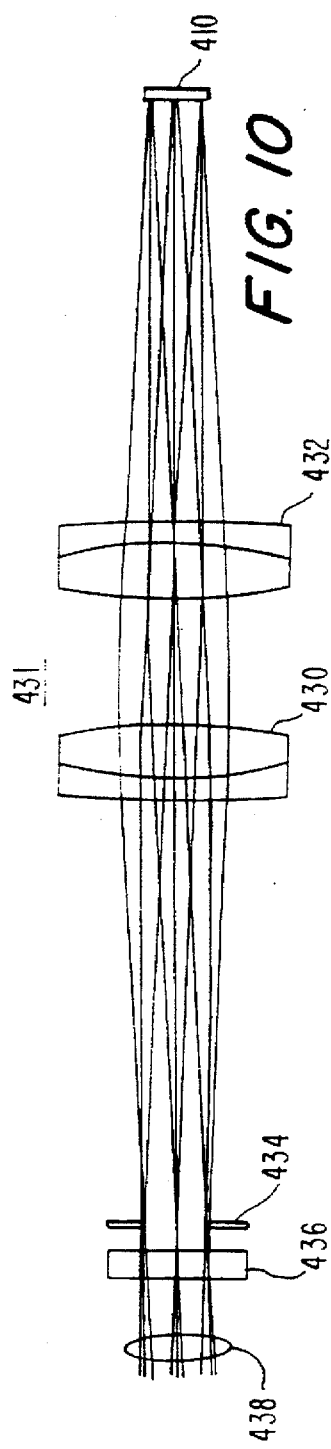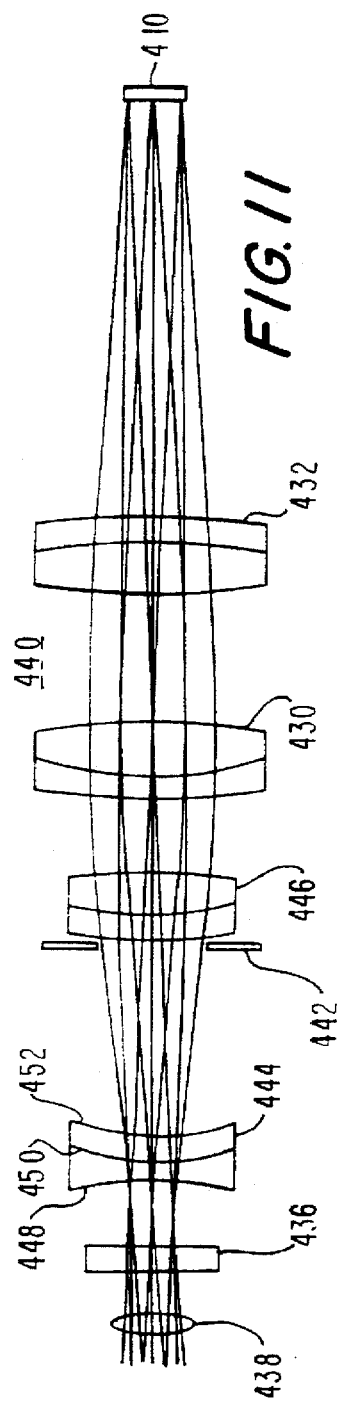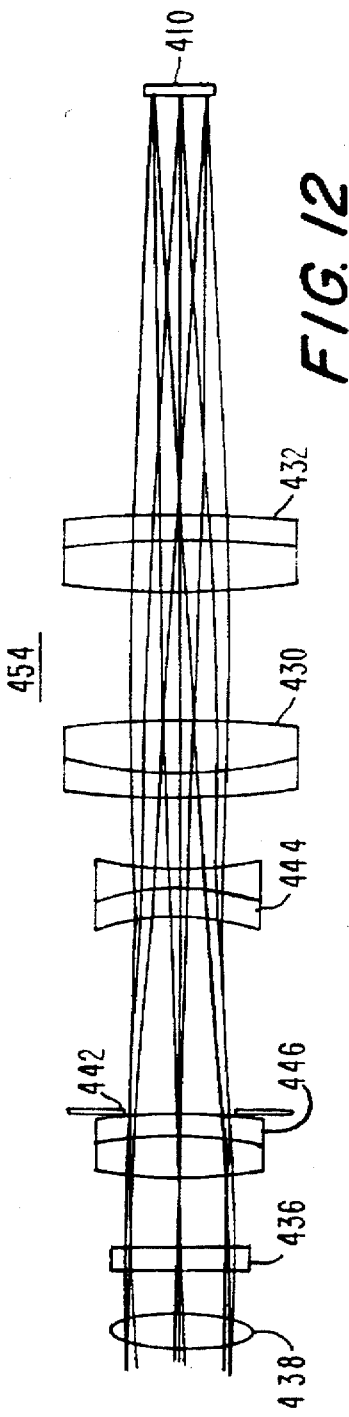

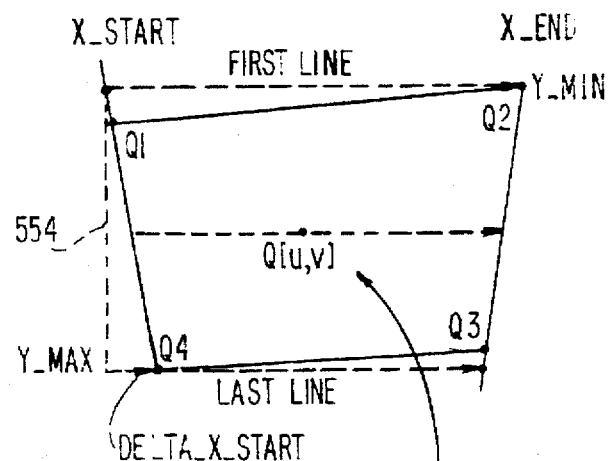
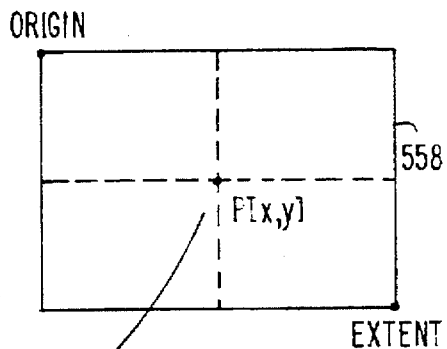
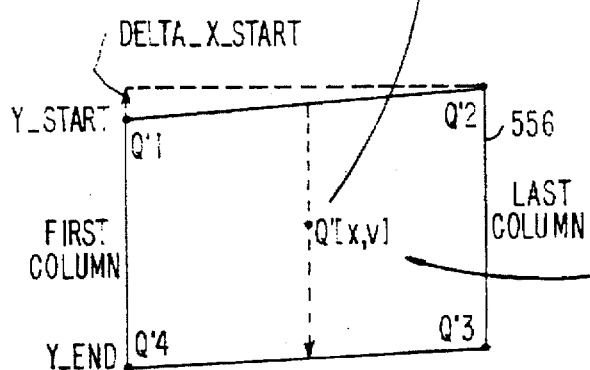
FIG. 20

566

The ups and downs is of multiple sclerosis

Contrary to the longstanding notion that patients diagnosed with chronic, progressive multiple sclerosis (MS) face a relentless downhill course, new research shows that 30 percent of such cases stabilize after a two-year period.

For patients diagnosed with progressive MS, the news is a relief from the grim prognosis of the past. "It gives them something to hope for," says lead researcher Donald E. Goodkin, now at the Cleveland Clinic Foundation. Many MS patients experience day-to-day waxing and waning of symptoms, but those who show steady decline during a six-month period are classified as chronic, progressive patients and until now were not expected to stabilize. Goodkin and Richard A. Rudick, also at the Cleveland Clinic, presented their work in Chicago this week at the annual meeting of the American Academy of Neurology.

For MS researchers, the report raises questions about the way some clinical trials are conducted and their results interpreted. Many researchers assume that patients with progressive MS will continue their steady decline, getting weaker and losing vision as time goes on. They often conduct uncontrolled trials in which all patients are given experimental therapy, attributing any improvement in the progressive MS patients to the new treatment. That assumption is false, according to the new study, which shows some progressive MS patients stabilize spontaneously. "We have to be more careful to perform studies that are properly blinded and controlled before drawing any conclusions," Goodkin says.

Multiple sclerosis is a neurological disorder of unknown origin caused when immune system cells destroy the myelin steady decline, he says. Longer studies must be done to find o' happens to such patients over a l he adds.

Many doctors give chronic, p sive patients experimental treatn a last-ditch attempt to stave off progression. Patients with the prognosis often receive methotre cyclophosphamide, which suppr immune system and cause seve effects such as vomiting. But F report suggests MS patients may wait and see if their symptoms :

Mir's pause in perman

The Soviet announcement las that the three cosmonauts on t space station will return to Eart 27 represents not just a planned coming but a major change in When Mir entered Earth orbit i Soviet officials said it would serv basis for assembling a "perma operating complex" in orbit (SN: p.136). Two cosmonauts spent : months on board checking out th The following February, anothe occupied Mir. Western observer preted their arrival (in part fro versations with other cosmonau sign that permanent occupan indeed begun (SN: 2/14/87, p.10 station has since been inhabi more than two years.

Now, however, the Soviet news Tass has announced the present imminent return to Earth. Reutei agency quotes Tass as adding tl will remain unoccupied "for : months." Tass made no ment

The ups and downs of multiple sclerosi

Contrary to the longstanding notion that patients diagnosed with chronic, progressive multiple sclerosis (MS) face a relentless downhill course, new research shows that 30 percent of such cases stabilize after a two-year period.

For patients diagnosed with progressive MS, the news is a relief from the grim prognosis of the past. "It gives them something to hope for," says lead researcher Donald E. Goodkin, now at the Cleveland Clinic Foundation. Many MS patients experience day-to-day waxing and waning of symptoms, but those who show steady decline during a six-month period are classified as chronic, progressive patients and until now were not expected to stabilize. Goodkin and Richard A. Rudick, also at the Cleveland Clinic, presented their work in Chicago this week at the annual meeting of the American Academy of Neurology.

For MS researchers, the report raises questions about the way some clinical trials are conducted and their results interpreted. Many researchers assume that patients with progressive MS will continue their steady decline, getting weaker and losing vision as time goes on. They often conduct uncontrolled trials in which all patients are given experimental therapy, attributing any improvement in the progressive MS patients to the new treatment. That assumption is false, according to the new study, which shows some progressive MS patients stabilize spontaneously. "We have to be more careful to perform studies that are properly blinded and controlled before drawing any conclusions," Goodkin says.

Multiple sclerosis is a neurological disorder of unknown origin caused when immune system cells destroy the myelin steady decline, he says. Longer f studies must be done to find c happens to such patients over a he adds.

Many doctors give chronic, sive patients experimental treati a last-ditch attempt to stave off progression. Patients with th prognosis often receive methotr cyclophosphamide, which supp immune system and cause sev effects such as vomiting. But report suggests MS patients ma) wait and see if their symptoms

Mir's pause in perman

The Soviet announcement la that the three cosmonauts on space station will return to Ear 27 represents not just a plannec coming but a major change ir When Mir entered Earth orbit Soviet officials said it would serv basis for assembling a "perm operating complex" in orbit (SN: p.136). Two cosmonauts spent months on board checking out tl The following February, anoth occupied Mir. Western observei preted their arrival (in part frc versations with other cosmonau sign that permanent occupan indeed begun (SN: 2/14/87, p.10 station has since been inhabi more than two years.

Now, however, the Soviet news Tass has announced the presen imminent return to Earth. Reute agency quotes Tass as adding tl will remain unoccupied "for months." Tass made no men

FIG. 28

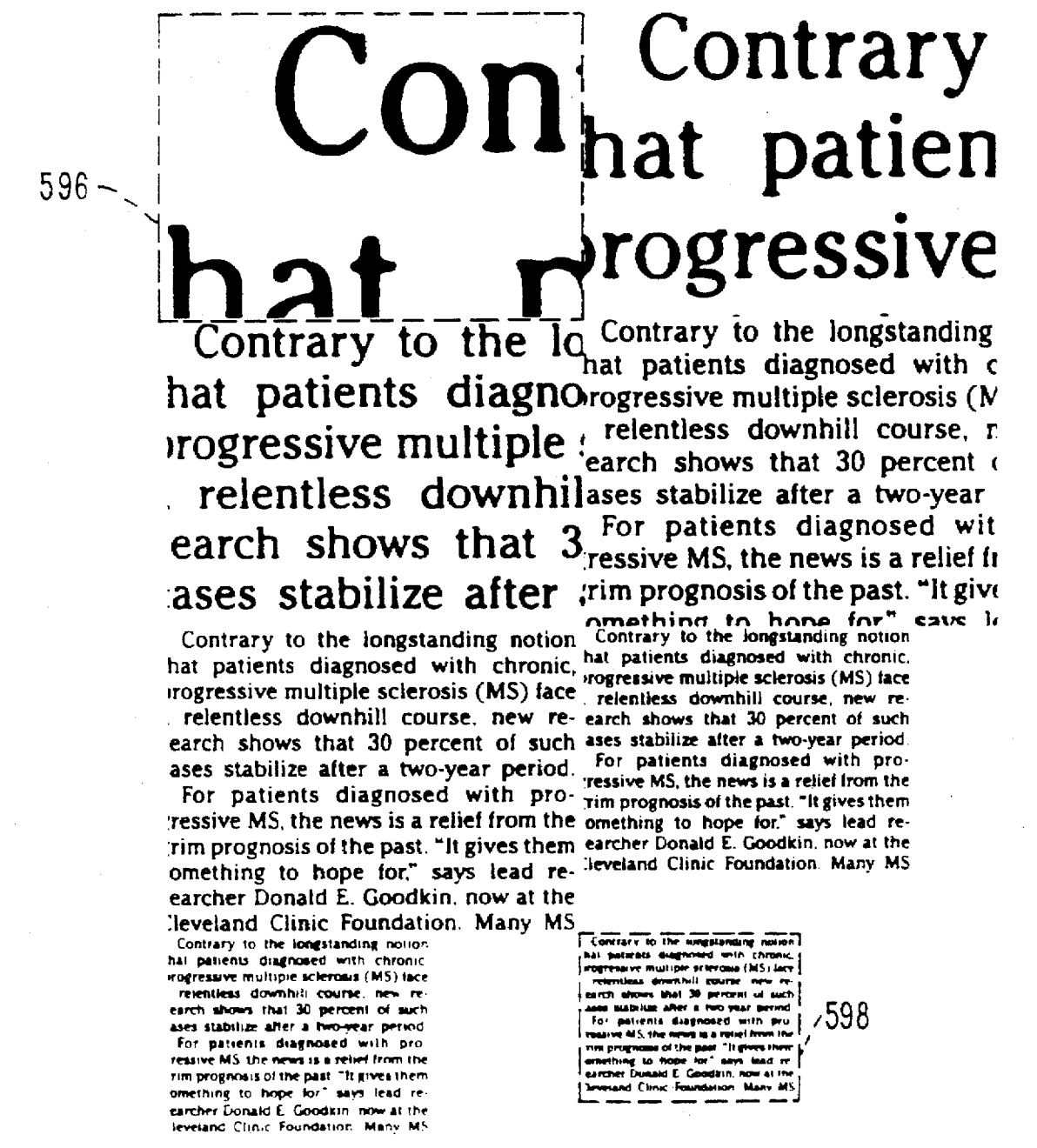

Contrary to the longstanding notion that patients diagnosed with chronic progressive multiple sclerosis (MS) face a relentless downhill course, new research shows that 30 percent of such cases stabilize after a two-year period.

For patients diagnosed with progressive MS, the news is a relief from the grim prognosis of the past. "It gives them something to hope for," says lead researcher Donald E. Goodkin, now at the Cleveland Clinic Foundation. Many MS

FIG. 31

PARAMETER FRAME

X START [10.6]  XS[15:0]

| XS15 | XS14 | XS13 | XS12 | XS11 | XS10 | XS9 | XS8 | XS7 | XS6 | XS5 | XS4 | XS3 | XS2 | XS1 | XS0 |
|------|------|------|------|------|------|-----|-----|-----|-----|-----|-----|-----|-----|-----|-----|

15  0

DELTA X START [2.12]  DXS[13:0]

| DX13 | DX13 | DX13 | DX12 | DX11 | DX10 | DX9 | DX8 | DX7 | DX6 | DX5 | DX4 | DX3 | DX2 | DX1 | DX0 |
|------|------|------|------|------|------|-----|-----|-----|-----|-----|-----|-----|-----|-----|-----|

15  14  13  0

X INVERSE SCALE [2.12]  XIS[13:0]

| XIS13 | XIS12 | XIS11 | XIS10 | XIS9 | XIS8 | XIS7 | XIS6 | XIS5 | XIS4 | XIS3 | XIS2 | XIS1 | XIS0 | 0 | 0 |
|-------|-------|-------|-------|------|------|------|------|------|------|------|------|------|------|---|---|

15  2  1  0

DELTA X INVERSE SCALE [0.16]  DXIS[11:0]

| DX11 | DX11 | DX11 | DX11 | DX11 | DX10 | DX9 | DX8 | DX7 | DX6 | DX5 | DX4 | DX3 | DX2 | DX1 | DX0 |
|------|------|------|------|------|------|-----|-----|-----|-----|-----|-----|-----|-----|-----|-----|

15  12  11  0

Y START [6.6]  YS[11:0]

| YS11 | YS10 | YS9 | YS8 | YS7 | YS6 | YS5 | YS4 | YS3 | YS2 | YS1 | YS0 | 0 | 0 | 0 | 0 |
|------|------|-----|-----|-----|-----|-----|-----|-----|-----|-----|-----|---|---|---|---|

15  4  3  0

DELTA Y START [2.12]  DYS[13:0]

| DY13 | DY13 | DY13 | DY12 | DY11 | DY10 | DY9 | DY8 | DY7 | DY6 | DY5 | DY4 | DY3 | DY2 | DY1 | DY0 |
|------|------|------|------|------|------|-----|-----|-----|-----|-----|-----|-----|-----|-----|-----|

15  14  13  0

Y INVERSE SCALE [2.12]  YIS[13:0]

| YS13 | YS12 | YS11 | YS10 | YS9 | YS8 | YS7 | YS6 | YS5 | YS4 | YS3 | YS2 | YS1 | YS0 | 0 | 0 |
|------|------|------|------|-----|-----|-----|-----|-----|-----|-----|-----|-----|-----|---|---|

15  2  1  0

DELTA Y INVERSE [0.16]  DYIS[11:0]

| DYS11 | DYS11 | DYS11 | DYS11 | DYS11 | DYS10 | DYS9 | DYS8 | DYS7 | DYS6 | DYS5 | DYS4 | DYS3 | DYS2 | DYS1 | DYS0 |
|-------|-------|-------|-------|-------|-------|------|------|------|------|------|------|------|------|------|------|

15  12  11  0

Y MIN [9]  YM[8:0]

| 0 | 0 | 0 | 0 | 0 | 0 | 0 | YM8 | YM7 | YM6 | YM5 | YM4 | YM3 | YM2 | YM1 | YM0 |
|---|---|---|---|---|---|---|-----|-----|-----|-----|-----|-----|-----|-----|-----|

15  9  8  0

Y EXTENT [7]  YE[6:0]
NEXT FRAME POINTER [3]  NP[18:16]

| 0 | YE6 | YE5 | YE4 | YE3 | YE2 | YE1 | YE0 | 0 | 0 | 0 | 0 | 0 | NP18 | NP17 | NP16 |
|---|-----|-----|-----|-----|-----|-----|-----|---|---|---|---|---|------|------|------|

15  14  8  7  3  2  0

NEXT FRAME POINTER [16]  NP[15:0]

| NP15 | NP14 | NP13 | NP12 | NP11 | NP10 | NP9 | NP8 | NP7 | NP6 | NP5 | NP4 | NP3 | NP2 | NP1 | NP0 |
|------|------|------|------|------|------|-----|-----|-----|-----|-----|-----|-----|-----|-----|-----|

|          | COL[2:1]=0 | | COL[2:1]=1 | | COL[2:1]=2 | | COL[2:1]=3 | | |
|---|---|---|---|---|---|---|---|---|---|
| ROW[2:1]=0 | (0,0) | (0,1) | (0,2) | (0,3) | (0,4) | (0,5) | (0,6) | (0,7) | ADDR0 = 0 |
|            | (1,0) | (1,1) | (1,2) | (1,3) | (1,4) | (1,5) | (1,6) | (1,7) | ADDR0 = 1 |
| ROW[2:1]=1 | (2,0) | (2,1) | (2,2) | (2,3) | (2,4) | (2,5) | (2,6) | (2,7) | ADDR0 = 0 |
|            | (3,0) | (3,1) | (3,2) | (3,3) | (3,4) | (3,5) | (3,6) | (3,7) | ADDR0 = 1 |
| ROW[2:1]=2 | (4,0) | (4,1) | (4,2) | (4,3) | (4,4) | (4,5) | (4,6) | (4,7) | ADDR0 = 0 |
|            | (5,0) | (5,1) | (5,2) | (5,3) | (5,4) | (5,5) | (5,6) | (5,7) | ADDR0 = 1 |
| ROW[2:1]=3 | (6,0) | (6,1) | (6,2) | (6,3) | (6,4) | (6,5) | (6,6) | (6,7) | ADDR0 = 0 |
|            | (7,0) | (7,1) | (7,2) | (7,3) | (7,4) | (7,5) | (7,6) | (7,7) | ADDR0 = 1 |

PATCH PIXEL MAP
MATRIX ELEMENT ADDRESS ADDR[4:1]=ROW[2:1],COL[4:1]

FIG. 43

| ACCESS | LOW MEMORY ADDRESS | HIGH MEMORY ADDRESS | PIXEL SWAP |
|---|---|---|---|
| ROW | ROW[2:1],COL[2:1],ROW0 | ROW[2:1],COL[2:1],!ROW0 | ROW0==1 |
| COLUMN | ROW[2:1],COL[2:1],COL0 | ROW[2:1],COL[2:1],!COL0 | COL0==1 |

```
         ┌ (7,7)  0x1F
         │ (6,6)
         │ (7,5)
         │ (6,4)
ROW[2:1]=3
         │ (7,3)
         │ (6,2)
         │ (7,1)
         └ (6,0)  0x18
         ┌ (5,7)  0x17
         │ (4,6)
         │ (5,5)
         │ (4,4)
ROW[2:1]=2
         │ (5,3)
         │ (4,2)
         │ (5,1)
         └ (4,0)  0x10
         ┌ (3,7)  0x0F
         │ (2,6)
         │ (3,5)
         │ (2,4)
ROW[2:1]=1
         │ (3,3)
         │ (2,2)
         │ (3,1)
         └ (2,0)  0x08
         ┌ (1,7)  0x7
         │ (0,6)
         │ (1,5)
         │ (0,4)
ROW[2:1]=0
         │ (1,3)
         │ (0,2)
         │ (1,1)
         └ (0,0)  0x00
```

LOW MEMORY PIXEL MAP
ADDRESS=ADDR[4:1], ADDR0 LOW

FIG. 45

```
         ┌ (7,6)  0x1F
         │ (6,7)
         │ (7,4)
         │ (6,5)
ROW[2:1]=3
         │ (7,2)
         │ (6,3)
         │ (7,0)
         └ (6,1)  0x18
         ┌ (5,6)  0x17
         │ (4,7)
         │ (5,4)
         │ (4,5)
ROW[2:1]=2
         │ (4,3)
         │ (5,0)
         │ (4,1)  0x10
         ┌ (3,6)  0x0F
         │ (2,7)
         │ (3,4)
         │ (2,5)
ROW[2:1]=1
         │ (3,2)
         │ (2,3)
         │ (3,0)
         └ (2,1)  0x08
         ┌ (1,6)  0x7
         │ (0,7)
         │ (1,4)
         │ (0,5)
ROW[2:1]=0
         │ (1,2)
         │ (0,3)
         │ (1,0)
         └ (0,1)  0x00
```

HIGH MEMORY PIXEL MAP
ADDRESS=ADDR[4:1], ADDR0 HIGH

IMAGE INPUT DEVICE HAVING OPTICAL DEFLECTION ELEMENTS FOR CAPTURING MULTIPLE SUB-IMAGES

This is a continuation-in-part of application Ser. No. 07/820,568, filed Jan. 14, 1992 now abandoned.

BACKGROUND OF THE INVENTION

The present invention relates to an imaging system for selectively providing either a low resolution real-time image or a high resolution scanned image. More particularly, the invention relates to a camera-like imaging system in which high resolution digital capture of an image is provided by combining a series of sequentially obtained sub-images.

It is known to increase the resolution of a video camera either by increasing the number of pixels in the image sensor or by increasing the number of image sensors. Either approach typically increases the cost of the camera.

An alternative method of increasing resolution uses just one image sensor, but uses that image sensor to capture only a portion (sub-image) of the desired image. A series of sub-images called "tiles" are sequentially captured and stored in the memory of an image processor. The image processor combines ("stitches") the tiles together to form a composite ("mosaic") image. Tiling systems, however, present a number of problems involving the capture of the sub-images. The sub-images should fit together tightly, avoiding both overlap of tiles or gaps between tiles. A high degree of repeatability in the tile capture process is desirable, because repeatable (characterizable) errors can be corrected. Because of the complexity involved in acquiring the tiles, known tiling systems have been limited to highly sophisticated and costly applications, such as satellite imaging of the earth. The present invention uses tiling to provide a low cost scanner for commercial applications. A low cost tiling system, incorporated as part of a scanning camera, could find application, for example, as an aid to the visually impaired, as the imaging component of a face-up copying system for books, as an x-ray film scanner, as a variable resolution desktop scanner, as a microfilm copying system, or as a video teleconferencing input device.

It would be desirable to provide a scanning camera with both a real-time mode and a high resolution mode.

It would also be desirable to provide a scanning camera with a highly repeatable, low cost tiling system.

It would further be desirable to provide a tiling mechanism with minimal settling time.

It would still further be desirable to provide a scanning camera with zoom and prescan capabilities.

It would also be desirable to provide a hybrid zoom arrangement that allows the magnification of an image on a display to be adjusted both mechanically—by automatically switching between lenses with different magnifications—and electronically, using electronic image processing to magnify the image.

It would also be desirable to provide techniques and circuitry for image processing that allow a user to remove undesirable motion blur from the real time image that would otherwise result from the relative displacement of the two interlaced video fields in a video frame.

It would also be desirable to provide techniques and circuitry for image processing that allow an input image to be patch-wise warped to form an output image.

It would also be desirable to provide an optical encoder for accurately determining the position of a deflector such as a mirror that images a target pattern onto a split photodiode to generate position feedback signals that can be used to precisely position the mirror.

SUMMARY OF THE INVENTION

It is therefore an object of the present invention to provide a scanning camera with both a real-time mode and a high resolution mode.

It is also an object of the present invention to provide a highly repeatable, low cost tiling system.

It is further an object of the present invention to provide a tiling mechanism with minimal settling time.

It is still further an object of the present invention to provide a scanning camera with zoom and prescan capabilities.

It is also an object of the present invention to provide a hybrid zoom arrangement that allows the magnification of an image on a display to be adjusted both mechanically—by automatically switching between lenses with different magnifications—and electronically, using electronic image processing to magnify the image.

It is also an object of the present invention to provide techniques and circuitry for image processing that allow a user to remove undesirable motion blur from the real time image that would otherwise result from the relative displacement of the two interlaced video fields in a video frame.

It is also an object of the present invention to provide techniques and circuitry for image processing that allow an input image to be patch-wise warped to form an output image.

It is also an object of the present invention to provide an optical encoder for accurately determining the position of a deflector such as a mirror that images a target pattern onto a split photodiode to generate position feedback signals that can be used to precisely position the mirror.

In accordance with the present invention, an image input device is provided that generates a composite image of an object from a plurality of sub-images of the object. The system comprises an image sensor for receiving a sub-image, a lens for focusing the sub-image on the image sensor, an optical deflecting means positioned between the lens and the object, the deflecting means having a plurality of optical settings, each such setting for deflecting one of a plurality of sub-images to the lens, and control means for causing the optical deflection means to sequence through the sub-images comprising the composite image to form a composite image. A hybrid zoom arrangement has also been provided that allows the magnification of an image on a display to be adjusted both mechanically—by automatically switching between lenses with different magnifications—and electronically, using electronic image processing to magnify the image. Either a shuttle mechanism or a rotatable cube may be used to provide the needed mechanical structure for switching between lenses. Real time electronic magnification is provided by image processing circuitry. Techniques and circuitry for image processing have been provided that further allow a user to remove undesirable motion blur from the real time image that would otherwise result from the relative displacement of the two interlaced video fields in a video frame. These techniques and circuitry for image processing also allow an input image to be patch-wise warped to form an output image at a desired magnification. Patch-wise warping is superior to previously-known techniques in which a large intermediate image buffer was required. Further, an optical encoder for accurately determining the position of a deflector such as a mirror has been provided that images a target pattern onto a split photodiode to generate position feedback signals that can be used to precisely position the mirror. With one encoder arrangement a target pattern is placed adjacent to the backside of the imaging mirror. A lens is used to image this pattern onto the photodiode. Another arrangement involves illuminating a holographic pattern on the backside of the mirror with a laser diode. The holographic pattern directs the laser illumination onto the photodetector.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 3A is an illustration of a tiling pattern used in the first embodiment of the invention;

FIG. 4 is a schematic illustration of a second embodiment of the invention;

FIG. 5 is a schematic illustration of a third embodiment of the invention;

FIG. 7 is a schematic illustration of a fifth embodiment of the invention;

FIG. 8 is a schematic embodiment of a linear slide of optical deflectors;

FIG. 10 is an illustrative embodiment of a lens for use in an image input device;

FIG. 11 is a further illustrative embodiment of a lens for use in an image input device;

FIG. 12 is an illustrative embodiment of a lens for use in an image input device that is similar to the lens shown in FIG. 11, but which demagnifies rather than magnifies the image;

FIG. 20 is a further graphical representation of the process of image warping, illustrating separable processing of the image axes;

FIG. 26 is an assembled image of an illustrative magnified portion of text prior to calibrating the image input device with the fiducial pattern of FIG. 25;

FIG. 28 is an assembled image of an illustrative magnified portion of text after the image input device of the present invention has been calibrated;

FIG. 31 is an image of portions of text that have been enlarged to varying degrees using the image processing technique of the present invention;

FIG. 33 is a schematic representation of the various parameters used in accordance with a preferred hardware embodiment of the image processor of the present invention;

FIG. 43 is an schematic representation of the patch memory map of the image processor circuitry of the present invention;

FIG. 44 is a schematic representation of the low memory map of the patch memory of the image processor circuitry of the present invention;

FIG. 45 is a schematic representation of the high memory map of the patch memory of the image processor circuitry of the present invention;

FIG. 46 is a table showing address formation for the patch memory of the image processor circuitry of the present invention;

DETAILED DESCRIPTION OF THE INVENTION

The imaging system of the present invention provides both a real-time (television-frame rate) camera and a high resolution scanning camera. The camera uses an area array charge-coupled device ("CCD") sensor to provide the real-time imaging capability.

The high resolution scanning mode of the camera is implemented by stepping the point of gaze of the CCD sensor over an object image, such as an 8.5 by 12.5 inch document, so that the document image is acquired as a series of tiles. In a first embodiment, a 32-element disk functions as an optical deflector. Step-wise rotation of the optical deflection disk steps the point of gaze of the CCD array over an object plane so that 32 image "tiles" are acquired. The tiles are "stitched" together in the scanner's memory to form a complete composite image. In a preferred embodiment discussed below, a sampling resolution of 300 dots per inch can be achieved over an 8.5 by 12.5 inch area, with a time to scan from 2 to 4 seconds, based on photometric calculations for the optics and CCD, and including the predicted settling time for disk motion.

Figure 1:
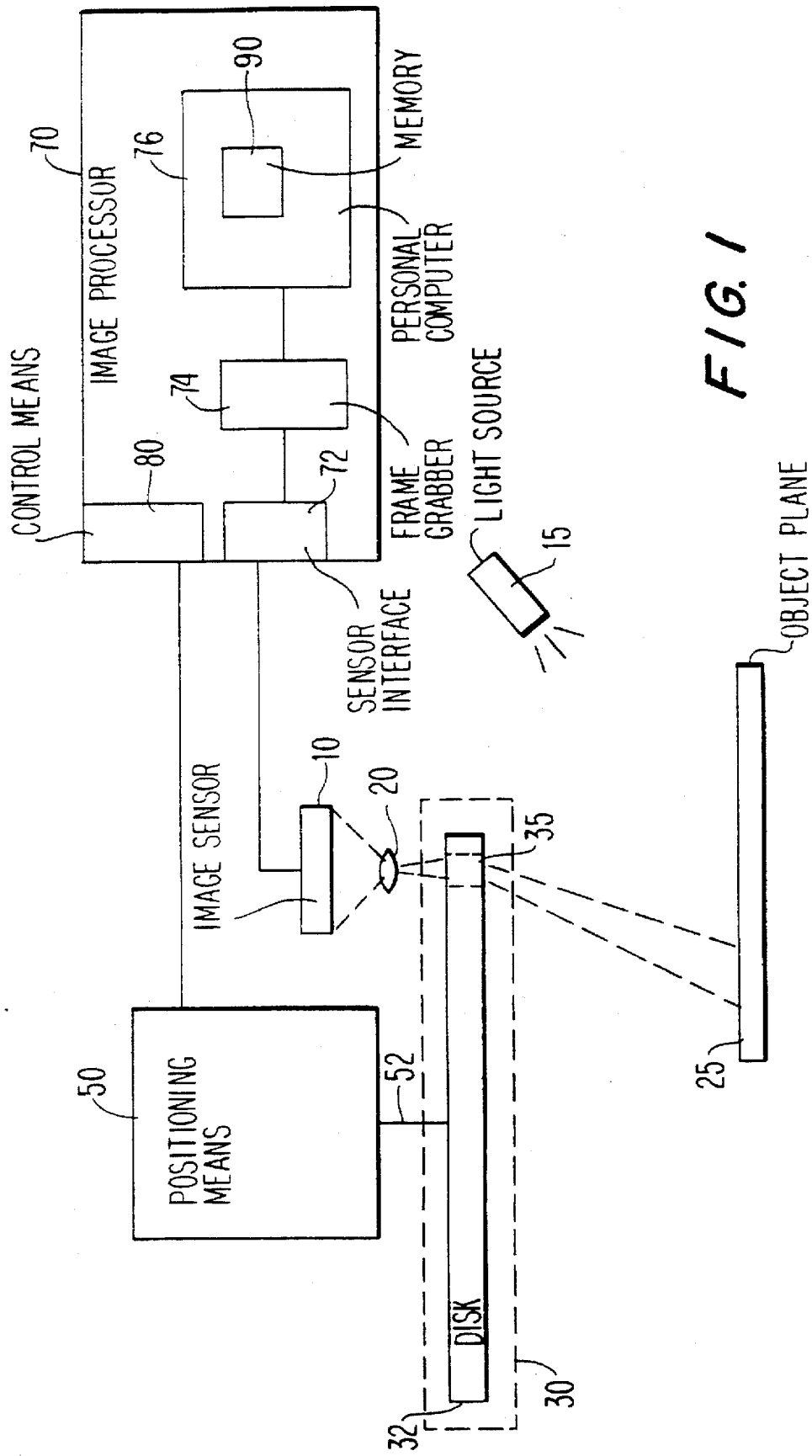
FIG. 1 is a schematic illustration of a first embodiment of the invention.

A first preferred embodiment of the imaging system of the present invention, as shown in FIG. 1, comprises an image sensor 10, a lens 20, an optical deflection means 30, a positioning means 50 having a shaft 52, and an image processor 70. Object plane 25, which is not a part of the invention, indicates the location of the image to be scanned.

Image sensor 10 receives an optical image and provides an electrical representation of the image as an output. Image sensors are well known in the art. An illuminator or monochromatic light source 15 may be used to improve the signal-to-noise ratio of image sensor 10. Image sensor 10 is preferably an area array CCD, such as the ICX058AL array available from Sony Corporation of Tokyo, Japan. The ICX058AL has 379,392 pixels arranged as 494 lines of 768 pixels. The ICX058AL generates an NTSC interlaced video format. A frame is therefore made up of two fields, one comprising odd-numbered scanlines and one comprising even-numbered scanlines. Because each of the two fields is transferred at a 60 Hz rate, the frame transfer rate is 30 Hz.

The output frames from image sensor 10 are coupled to sensor interface 72, which is shown in FIG. 1 as part of image processor 70. Sensor interface 72 is preferably a CCBM37 card camera, available from Sony Corporation, or may be constructed from an integrated circuit chip set, also available from Sony Corporation for driving the ICX058AL. Sensor interface 72 receives frame information from image sensor 10 and passes it to frame grabber 74. Frame grabber 74 is preferably model number Bt81295, available from Brooktree Corporation of San Diego, Calif. The Bt81295 frame grabber is representative of a type of "media adapter" card that provides both frame-capture and real-time non-interlaced computer display of interlaced video sources on a personal computer.

Frame grabber 74 stores and formats the frame information from sensor interface 72, and provides the frame information to personal computer 76. Although it is shown outside personal computer 76, frame grabber 74 is available as a circuit card which plugs into personal computer 76. Personal computer 76, which is an IBM PC in the first preferred embodiment, executes known software algorithms to combine the frames into a composite image stored in memory 90, which is shown as part of personal computer 76 in the first preferred embodiment. One skilled in the art will appreciate that a wide variety of commercially available products may be substituted for image sensor 10, sensor interface 72, frame grabber 74 and personal computer 76 without departing from the scope of the present invention. For example, a dedicated image processor may be used with a personal computer 76, so that multiple frames can be assembled into a composite image more quickly.

Figure 2A:
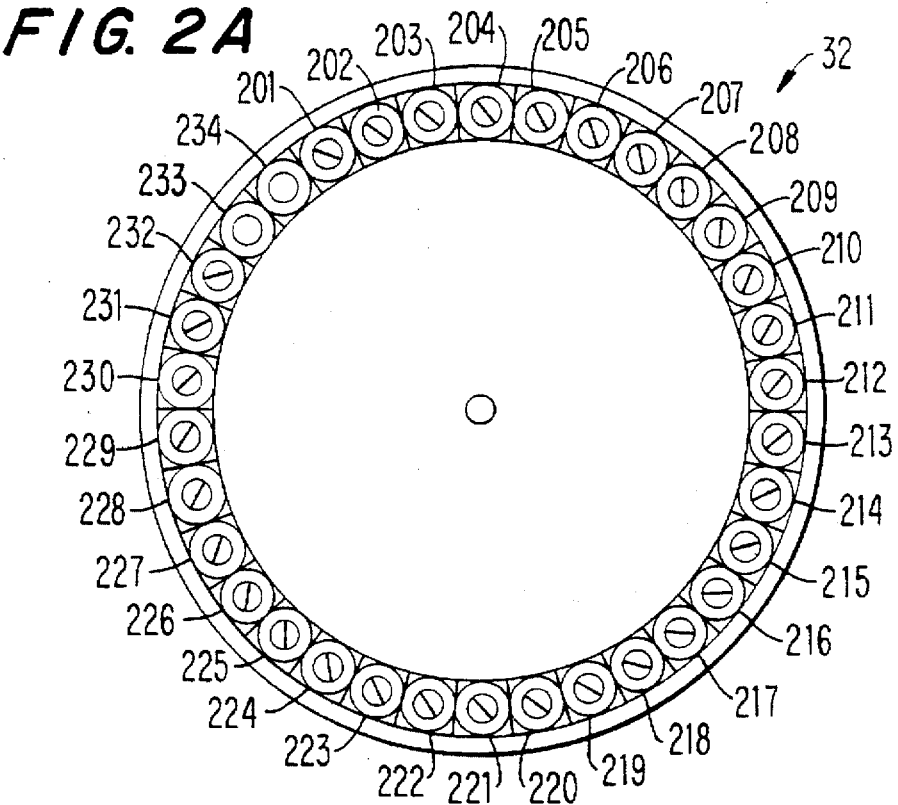
FIG. 2A is a bottom view of the disk of holographic optical elements of the first embodiment of the invention.

Deflection means 30 comprises a moveable array of fixed optical deflection elements 35 for dividing the object image into a plurality of image tiles. One embodiment of deflection means 30 comprises a disk 32, rotatable about its central axis, having 32 holographic optical elements 201–232 disposed about its circumference as shown in FIG. 2A. For clarity, only one of the 32 holographic optical elements is shown in FIG. 1; however, it is to be understood that element 35 represents one of a plurality of elements. It is further to be understood that the deflection means of the present invention is not limited to 32 elements. More or fewer elements may be selected depending on the application. Disk 32 serves as an optical deflector, with each element 201–232 along its circumference corresponding to a tile position. Positioning means 50 causes disk 32 to rotate, thereby bringing each of the holographic optical elements 201–232 sequentially into the optical path to deflect its corresponding sub-image to image sensor 10. Holographic optical elements 201–232 are manufactured, according to known methods, to incorporate microscopic ridges to serve as a diffraction grating on a portion of disk 32, which is preferably a molded plastic material.

Imaging lens 20 is provided in the optical path between deflection element 35 and image sensor 10 to project the object onto image sensor 10. Deflection element 35 is positioned in front of lens 20 (between lens 20 and the object to be imaged on object plane 25) to avoid off-axis image distortion. The angle subtended by the image from deflection element 35 is much smaller than the angle subtended by the image on object plane 25. Positioning lens 20 in front of deflection element 35 is undesirable, because lens 20 would then have to subtend a much larger angle. A larger angle would require lens 20 to be a much more costly wide-angle lens, and such a lens would be more prone to aberrations.

In the first embodiment, disk 32 is mounted on shaft 52 of a stepping motor, which serves as positioning means 50. After moving to a new position, a stepping mechanical scanning mechanism requires a settling time in which to stop vibrating, in order to capture a sub-image. The settling time of the tiling scanning mechanism determines, in part, the rate at which images may be captured. If the image capture rate does not allow the tiling scanning mechanism to settle, the captured images will be distorted; allowing too great a time between capturing images unduly slows the image acquisition process. Accordingly, it is preferable to provide a scanning mechanism with minimal settling time. Disk 32 should preferably be constructed of a thin, lightweight material such as plastic in order to minimize its settling time. For each tile to be acquired, the disk is positioned and allowed to settle. Alignment of disk 32 is not critical on any axis. Moreover, disk 32 has a low mass. From these considerations it follows that positioning will be possible within one frame time of image sensor 10 per tile, and that disk 32 may be supported by shaft 52 alone.

Positioning means 50 is electrically coupled to control means 80. In response to signals from control means 80, positioning means 50 positions disk 32 in one of the 32 angular positions occupied by holographic optical elements 201–232 shown in FIG. 2. Each position corresponds to one setting of deflection means 30.

Because alignment of holographic element 35 is not critical, positioning means 50 may comprise an open-loop positioning mechanism. Open-loop systems are generally less costly than closed-loop systems, because open-loop systems do not require position sensing mechanisms.

Figure 2B:
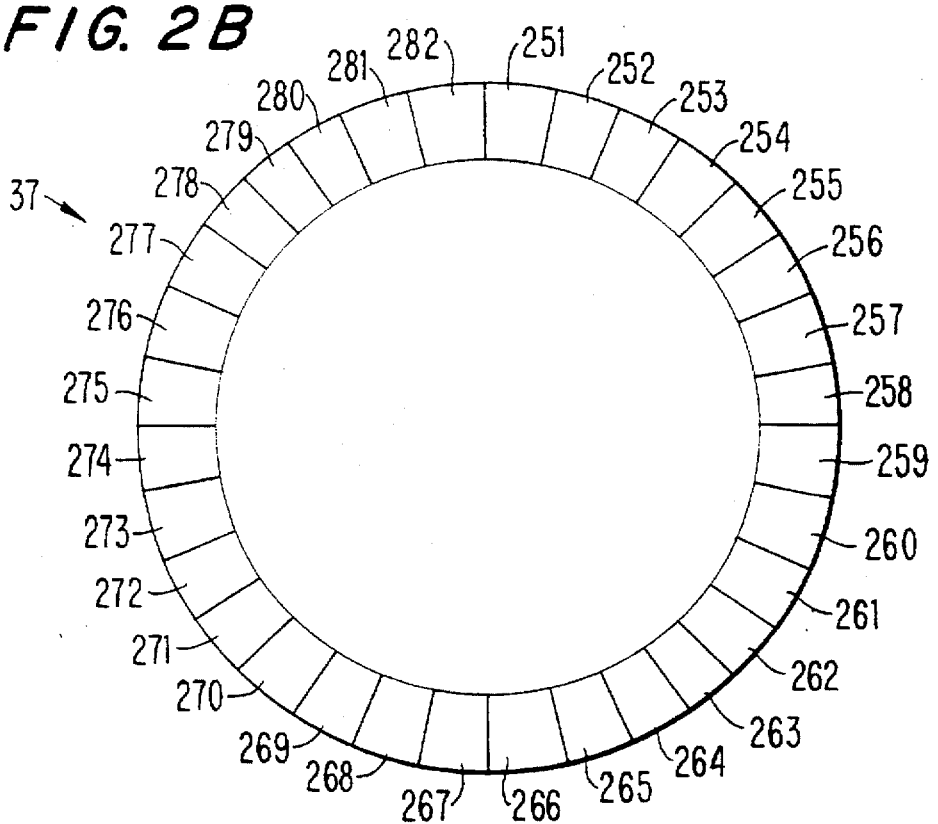
FIG. 2B is a bottom view of an alternate embodiment of the disk of FIG. 2A.

Disk 37, shown in FIG. 2B, comprises a disk encircled by a band of holographic elements 251–282 disposed along its circumference. Because elements 251–282 provide a continuum of deflectors, positioning means 50 can comprise a continually rotating motor instead of a stepping motor. A further benefit of the deflection continuum provided by elements 251–282 is that minor defects in the holographic material average out. An image is acquired when the boundaries of an element, such as element 251, are in alignment with a desired tile. Each element 251–282 corresponds to a frame transfer from image sensor 10. Accordingly, disk 37 should rotate at a speed that allows image sensor 10 to transfer both fields comprising a frame at a single deflection setting.

Control means 80 may be a conventional stand-alone computer or microprocessor, or may be part of image processor 70 as shown in FIG. 1. Control means 80 causes positioning means 50 to stop deflection means 30 at known positions or settings. Control means 80 further directs memory 90 to store the images received from image sensor 10 at appropriate times, allowing for the settling time of deflection means 30.

In an exemplary embodiment of the system of the present invention lens 20 would be 15 inches (26.67 cm) from an object on object plane 25, and would have a minimum depth of focus of 10 mm. Based on the pixel dimensions of the ICX058 image sensor and the desired 300 dot per inch resolution, a demagnification of 8.41× is required from object plane 25 to sensor 10. Using these parameters and basic lens equations, expected working values for the optical path are that lens 20 have a 40 mm focal length and f#10, 4.5 mm aperture, working distance of 380 mm, and depth of field of 14 mm. Assuming 800 lux room level illumination and 50% page reflectivity yields sensor illumination of 1.0 lux. This corresponds to 4 times the dark current of the ICX058 sensor when operated at television frame rates (16.6 ms integration time per frame). An illuminator 15 can improve the signal-to-noise ratio for sensor 10. An optical band-pass filter may be included in the optical path to compensate for the chromaticity of holographic elements 201–232. Scanning time is expected to be limited by the sum of the tile stepping times (assumed to be 33.3 ms per tile) and frame acquisition times; therefore, the minimum time to acquire all 32 tiles is expected to be 2.13 seconds.

FIG. 3A illustrates the tiling scheme adopted in the first preferred embodiment of the invention. Tiles 301–332 correspond to the 32 tiling elements 201–232 shown in FIG. 2A. Tiles 301–332 comprise the object, for example a page of printed text, located on object plane 25. A 4×8 array of tiles is shown, based on the layout of the ICX058 sensor, with the horizontal scanning axis of the sensor aligned with the short dimension of the page. This alignment is preferred for a page of printed text, because page images can be properly displayed without image rotation. FIG. 3A shows the optical path of tile 312 from object plane 25, through holographic optical element 35 and lens 20, to image sensor 10. Line 350 indicates the uncorrected focal surface and its relation to object plane 25. It is to be understood that line 350 is a cross-section of the focal surface, which is spherical.

Figure 3B:
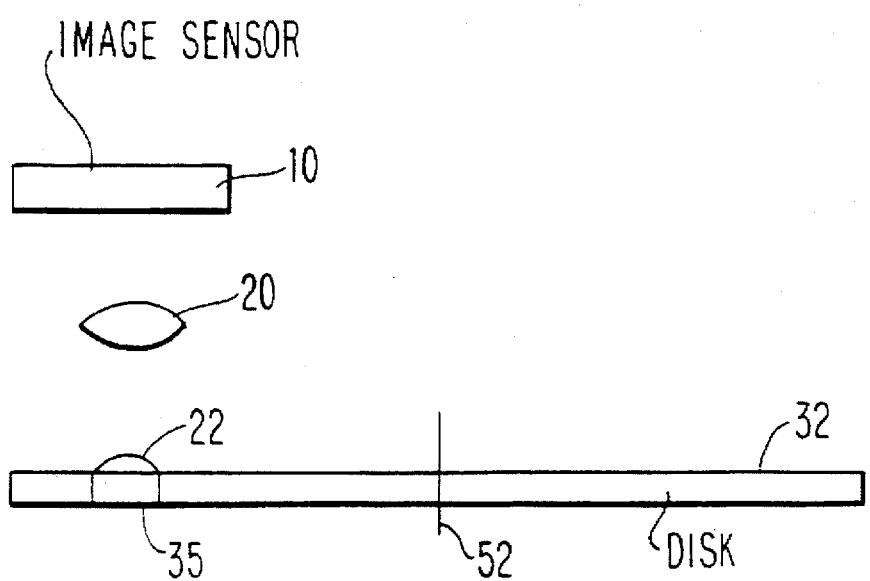
FIG. 3B is an illustration of an embodiment of the invention including a focal correction lens.

As shown in FIG. 3A, uncorrected focal surface 350 curves through object plane 25. If optimum focus is obtained at a point falling on tile 310, then tile 301 will be out of focus. Lens 22, shown in FIG. 3B, corrects the disparity between object plane 25 and uncorrected focal surface 350. Lens 22 is mounted on the upper surface of disk 32, above representative holographic optical element 35. It is to be understood that a lens corresponding to lens 22 would be provided, as needed, for each optical element 201–232, and each such lens 22 would correct for the particular focal length disparity of each corresponding optical element 201–232. Some tiles intersect the focal surface and therefore, require no correction. Lens 22 will slightly alter the size of its corresponding tile as seen by image sensor 10. Correction for this scaling, as well as distortion imposed by the angle of view, may take place in software and hardware.

Because holographic optical elements 201–232 are diffractive optics, the diffraction rulings can be arranged to include both a lens and a prism by appropriate micromachining or molding operations. Therefore, holographic optical elements 201–232 can incorporate lens 22, instead of adding a plano-convex lens to the upper surface of disk 32.

The 32 tiles acquired must adjoin each other perfectly in order to assemble a single composite image from the 32 acquired sub-images. Although disk 32 may not yield perfect alignment accuracy, it will provide highly repeatable alignment for any disk, and from disk to disk. Errors in the master disk may be characterized and modeled in software. The magnification changes created by focal length correction, the angle-of-view distortion and errors in deflection angle produced by individual deflection elements also can be modeled. Alternatively, the aggregate tile registration and geometric distortion errors may be characterized using a fiducial pattern and known software image metrology methods. Post-scan electronic correction may then be applied using image warping to correct for the aggregate error. If desired, such warping methods can be implemented using a pipelined image processor. It is only necessary to ensure that HOE deflection errors create an overlap of tiles, rather than gaps between tile regions.

Figure 3C:
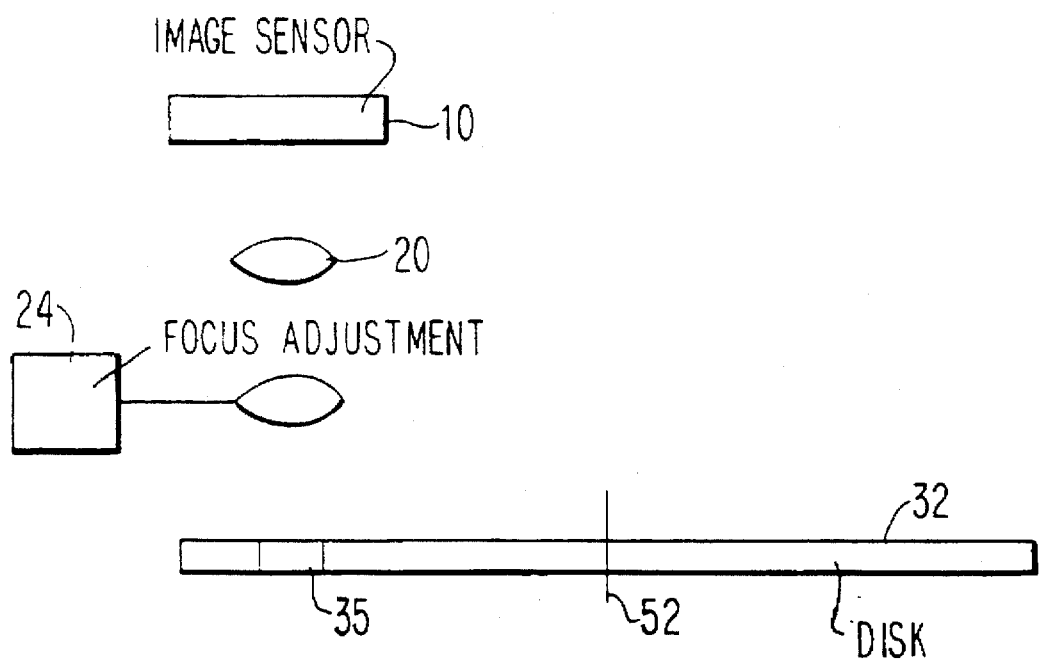
FIG. 3C is an illustration of an embodiment of the invention including a motor-driven focus adjustment.

Element 233, shown in FIG. 2A, provides for a real-time zoom function. Element 233 is an optically neutral element (such as a hole) that allows light to pass through undeflected. One skilled in the art will recognize that additional known optical elements can be inserted into the optical path between disk 32 and lens 20 to fully implement a zoom function and also to provide an extra motor-driven focus adjustment 24, shown in FIG. 3C. Focus adjustment 24 brings into optimum focus objects on object plane 25 that stand higher than the depth of field or which are not flat, such as books or household objects. Both focus adjustment 24 and optical zoom may be implemented using standard optical techniques.

The scanning camera of the present invention can also obtain a pre-scan image in the time required by one extra step of the deflection means, by adding an additional optical focusing element, which, in conjunction with motor-driven focus adjustment 24, focuses the entire object image onto image sensor 10. The low resolution gray-scale image so obtained can be analyzed in software by an area-histogram to produce a thresholding map. This map may then be used dynamically to vary the binarizing threshold applied to incoming pixels during high resolution scanning. This permits the acquisition of accurate text images over tinted backgrounds, even on the multicolor pages commonly found in periodicals.

A second preferred embodiment of the system of the present invention is shown in FIG. 4. In the second embodiment, mirror 36 serves as the optical deflection element. Wedge support 34 is used to affix mirror 36 to disk 32. Only one mirror 36 is depicted in FIG. 4, however, it is to be understood that a plurality of mirrors are disposed around the circumference of disk 32, similar to the holographic optical elements encircling disk 32 in FIG. 2. Each mirror 36 is affixed to disk 32 at a different angle, so that a two-dimensional tiling pattern is obtained as in the first embodiment.

Mirrors, in contrast to transmissive deflection elements such as prisms and holographic optical elements, tend to provide blurred images if the settling time of disk 32 is inadequate. Moreover, even with adequate settling time, mirrors require absolute positional accuracy. Accordingly, positioning means 50 preferably uses a closed-loop system to avoid the image distortion problem with mirrors.

A third preferred embodiment of the system of the present invention is shown in FIG. 5. In the third embodiment, a plurality of offset plano-convex lens pairs 44, 45 are disposed around the circumference of transparent disk 42. Lens 20 is not required in this embodiment, because the offset lens pair 44, 45 can adequately focus the sub-image onto image sensor 10.

Figure 6:
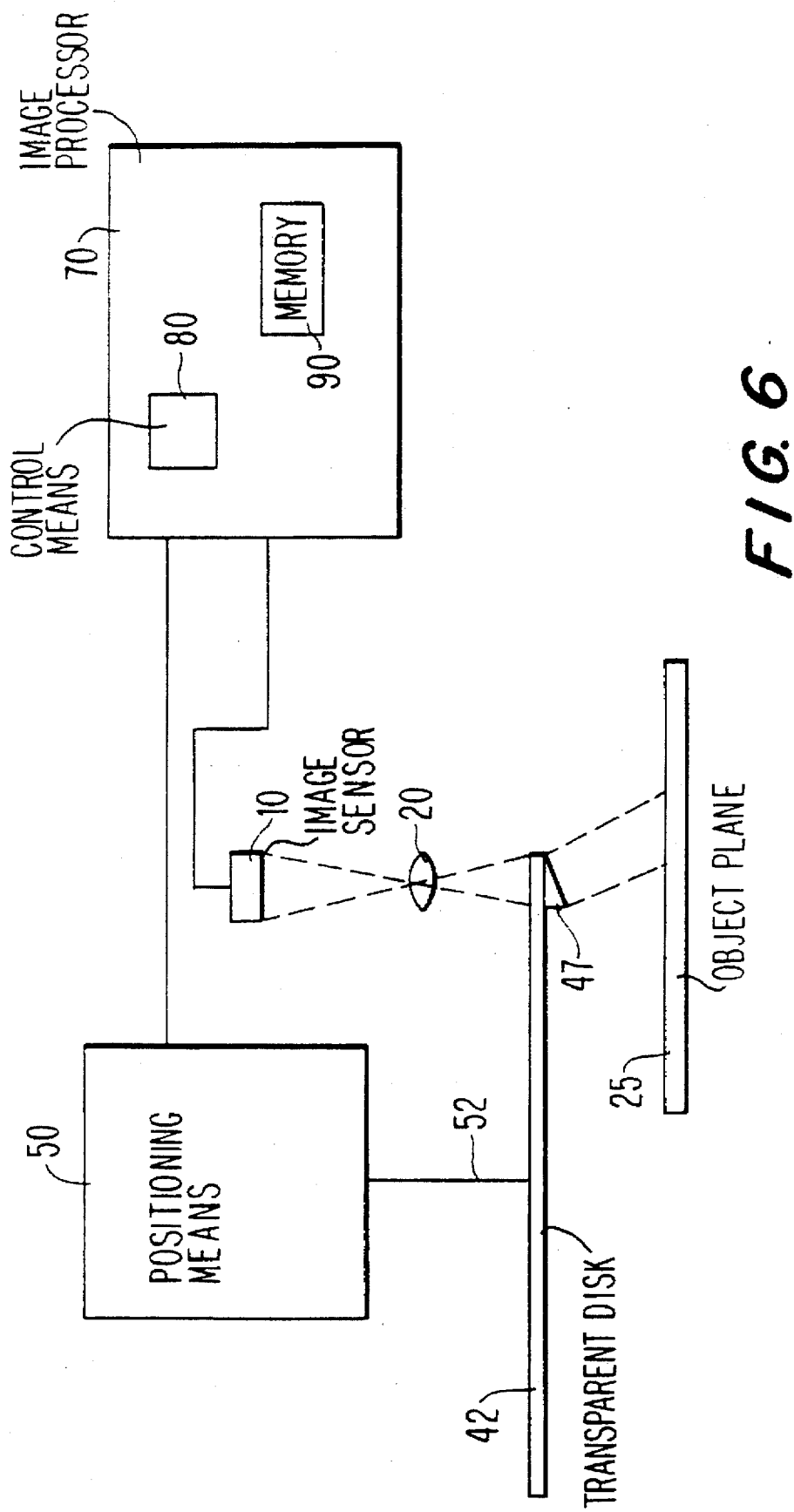
FIG. 6 is a schematic illustration of a fourth embodiment of the invention.

A fourth preferred embodiment is shown in FIG. 6, wherein wedge prisms 47 act as optical deflection means, disposed around the circumference of transparent disk 42. As in the previous figures, prism 47 represents one of a plurality of optical deflectors. A correction lens, such as lens 22 shown in FIG. 3B, may also be used in conjunction with prism 47.

In a fifth preferred embodiment of the invention, shown in FIG. 7, deflection means 30 comprises a pair of mirror galvanometers 53, 55. Mirror galvanometers are available from General Scanning, Inc., Watertown, Mass. Mirror galvanometer 55 comprises mirror 38, shaft 56 and motor 58. Mirror 38 rotates on shaft 56 of motor 58, in response to signals from control 80. Mirror 37 rotates on axis 54, which is the shaft of the motor (not shown) of mirror galvanometer 53. Mirrors 38 and 37 have mutually perpendicular axes of rotation, an X-axis and a Y-axis, thereby allowing scanning of object plane 25 in two directions. Each tile setting for mirror galvanometers 53, 55, comprises an X-coordinate, corresponding to rotation about axis 56 and a Y-coordinate corresponding to rotation about axis 54. One skilled in the art will appreciate that circular, cylindrical or spherical coordinates could be substituted for the X-Y coordinate system, and that a single gimbal-mounted mirror could provide a scanning means as well. The X-Y mirror arrangement is preferred, however, because deflection along more than one axis using a single mirror rotates the deflected image. Although this rotation can be removed via image processing during the tile assembly process, the object field size would need to be increased for each tile to ensure that overlapping tile areas are obtained. Image sampling resolution would therefore be correspondingly reduced. In contrast to previous embodiments comprising a plurality of fixed optical deflectors, mirror galvanometers 53, 55 provide a variable number of scanning settings. Therefore, mirror galvanometers 53, 55 provide a variable scanning means, capable of scanning either a discrete series or a continuum of sub-images. In accordance with a preferred embodiment of the present invention, galvanometer-type motors are replaced with inexpensive stepper motors with closed-loop position correction.

The variable scanning capability of a mirror-based deflector systems can be used advantageously, for example, in low-vision aids. Closed circuit television (CCTV) magnifiers, for use by the visually impaired, use a conventional analog video camera equipped with a manually focused zoom lens and mounted above a movable stage to present magnified images on a CRT monitor. Documents may be read using a CCTV magnifier by manually moving the reading material back and forth using the sliding stage. This technique is often difficult for the user, because materials must be positioned precisely. Tracking across a line of print and returning to the start of the next line is particularly difficult. To alleviate this problem, some sliding stages are provided with motors that may be controlled by foot-pedals. However, this arrangement is cumbersome, especially because bound materials must be restrained to prevent them from being dislodged as the stage is moved. Further, CCTV systems are prone to motion blurring effects due to misregistration of the two interlaced fields comprising a video frame, which are acquired with a time displacement of 16.66 ms.

In contrast, the mirror-based deflectors of the present invention can be used in real-time to smoothly move the magnified field of view over a document without requiring any motion of the document itself. The user can position the mirrors using any convenient user interface, such as a trackball, a joystick, a mouse or other control mechanism. Because the position of the mirrors is known when each of the two interlaced video fields is acquired, the relative displacement between the two fields of an interlaced frame may precisely calculated. Blurring can therefore be eliminated by electronically compensating for the displacement of the fields. The personal computer or dedicated image processing hardware calculates the relative displacement between the fields using the known position and velocity information. Blurring is compensated for by adjusting the relative addressing between the fields during as the fields are written into the buffer. A preferred embodiment of a video frame buffer arrangement is described in more detail below.

Prisms are suitable deflection elements, because they are inexpensive, relatively position insensitive and are easily manufactured in arrays, with each array in a manufacturing run exhibiting the same characteristics as the other arrays in the batch. Thus, if several deflector arrays are manufactured from the same mold, element 231 in each array will exhibit the same characteristics. Any minor optical deviation in element 231 can therefore be corrected either by image processing or by additional optical elements. Holographic optical elements also provide highly consistent characteristics within a manufacturing batch, however, holographic optical elements are more highly chromatic than prisms. Prisms have far less chromaticity than holographic optical elements for a given amount of deflection. In either case, chromaticity can be overcome by using a monochromatic light source 15, shown in FIG. 1A, or by adding an optical band-pass filter, or both. For applications requiring color imaging, mirror-based deflection elements are preferred due to the absence of chromatic effects.

Other embodiments of the invention will be apparent to those skilled in the art. For example, disk 32 could easily be replaced by an array of image deflectors disposed on linear slide 33 as shown in FIG. 8, or on a loop or a cylinder. Similarly, image deflectors other than mirrors, prisms, offset lens pairs, mirror galvanometers and holographic optical elements can be used without departing from the spirit of the invention.

Dual-axis Scanning Mirror System

Figure 9:
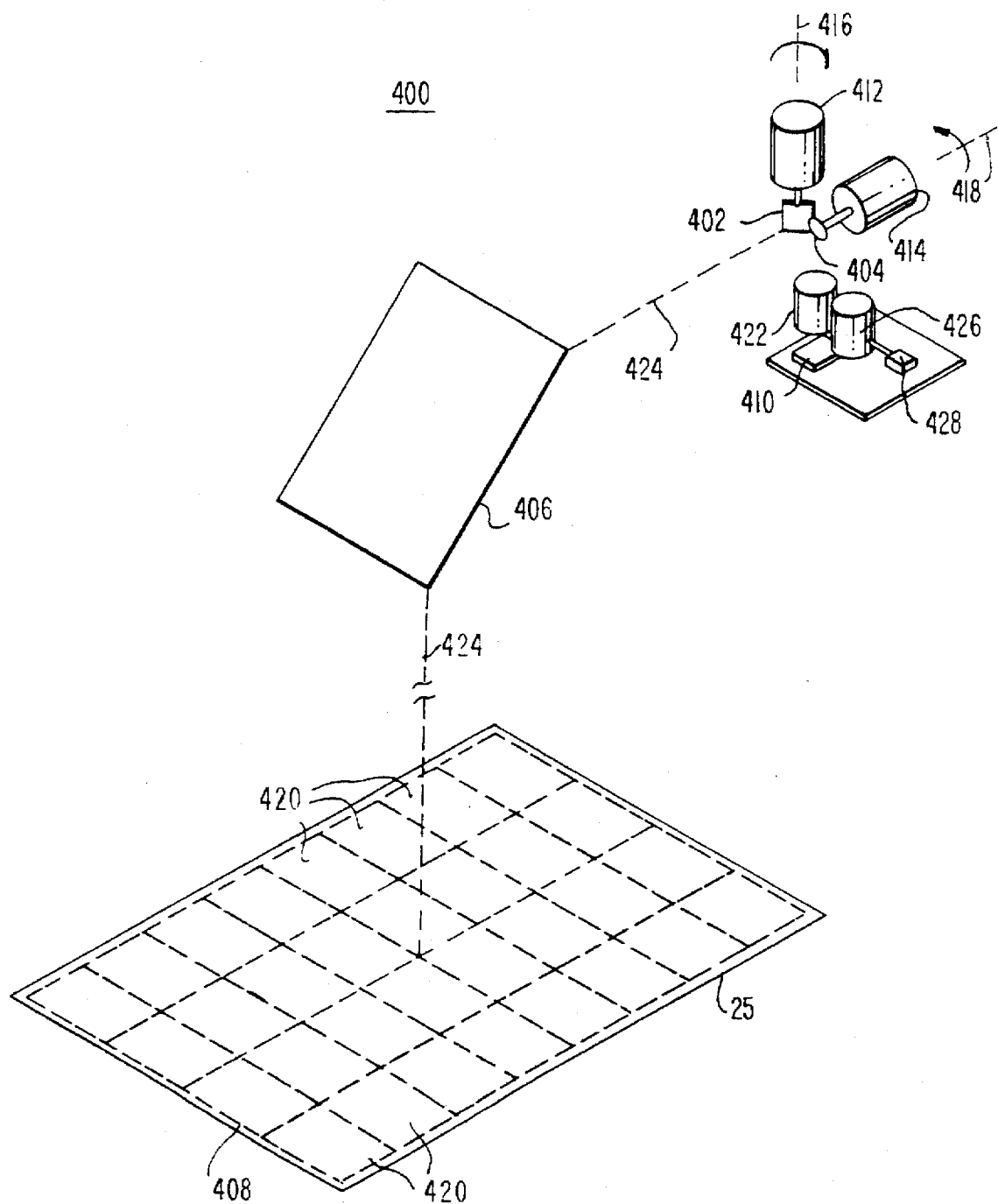
FIG. 9 is a perspective view of an illustrative embodiment of an image input device constructed in accordance with the present invention.

An illustrative embodiment of a preferred dual-axis scanning mirror system 400 is shown in FIG. 9. A pair of small orthogonally-mounted scanning mirrors 402 and 404 are used in conjunction with mirror 406 to deflect the image 408 in object plane 25 onto sensor 410. Preferably sensor 410 is a charge-coupled device array, such as model No. ICX058AL, available from Sony Corporation. Scanning mirror 402 is preferably a square mirror with 12 mm sides, whereas scanning mirror 404 is preferably elliptical, having a minor axis of 6.6 mm and a major axis of 10.3 mm. Scanning mirror 404 defines the aperture of system 400.

The scanning mirrors 402 and 404 are mounted on the shafts of motors 412 and 414, respectively. Motor 412 rotates scanning mirror 402 about axis 416 and motor 414 rotates scanning mirror 404 about axis 418. Motors 412 and 414 may be of either the galvanometer or the stepping motor type. Preferably, mirrors 412 and 414 are stepping motors, which can be accurately positioned with appropriate control circuitry.

By controlling the position of scanning mirrors 402 and 404, each of the image tiles 420 of image 408 can be selectively focused onto sensor 410 with lens 422. Lens 422 preferably contains multiple elements, and may contain an aperture. Preferably, system 400 can digitize an image over an approximately 8.5 by 12.8 inch area with a resolution of 300 dots per inch. Mirror 406 directs light along optical path 424, so that system 400 can be constructed compactly. Because there are an odd number of mirrors in optical path 424, image 408 will be reversed at sensor 410. Image 408 is therefore electronically reversed to compensate for the image reversal due to the odd number of mirrors.

If desired, a user can position mirrors 402 and 404 with motors 412 and 414 so that the user can view various portions of image 408 in real time. If image 408 contains text, for example, the user can smoothly scan image 408 to read the text in real time, without using an unwieldy sliding document stage.

Lens 422 preferably is designed to provide a field of view of 2.233"×1.675" near the center of image 408, which is slightly larger than the theoretically exact field of view of 2.133"×1.600". The slightly larger field of view ensures that the image tiles 420 that are captured by sensor 410 will overlap one another. Due to perspective, the field of view varies somewhat with the position of each image tile 420 relative to the center of image 408. This angle-of-view distortion is preferably compensated for during the process of digitally stitching together image tiles 420 to form a final composite image.

In order to vary the system magnification, system 400 may contain a shuttle mechanism 428 that allows lens 426 to be automatically switched into use in place of lens 422. By switching between lenses, it is possible to mechanically alter the magnification of the system 400. The magnification of system 400 may also be altered electronically, by electronically processing the image received by sensor 410. Further, mechanical and electronic control of the system magnification can be combined to form a hybrid optical/electronic zoom system for real-time imaging that is less expensive than a fully optical continuous zoom mechanism.

The mirror 404 forms a round aperture approximately 6.6 mm in diameter, which defines the system aperture. The optical arrangement of lens 422 and mirror 404 give the system 400 an f-number of 11 and depth of focus exceeding 20 mm. In order to focus the image 408 onto sensor 410, sensor 410 is preferably moved axially along the optical axis of lens 422 or lens 426. In order to prevent the axial movement of sensor 410 from affecting the size of the image formed at sensor 410, which would adversely affect system calibration, a telecentric optical arrangement is used. Using this optical arrangement, axial movement of sensor 410 allows the system to be focused properly, but does not affect the size of the image formed at sensor 410.

A preferred lens 431 is shown in FIG. 10. The arrangement shown in FIG. 10 provides a demagnification of approximately 11.7×, which images the 2.133 inch×1.600 inch image tiles 420 onto the ⅓ inch format of sensor 410 with a margin for tile overlap. Lenses 430 and 432 are preferably achromatic doublets, such as part Nos. 32,327 and 32,492, available from Edmund Scientific Company of Barrington, N.J. Aperture stop 434 has a diameter of 7.5 mm, which results in a system f-number of 7.9. Collimator element 436 weakly collimates the rays 438 that are received from mirrors 402, 404, and 406 (FIG. 9). Because aperture stop 434 is separate and distinct from mirror 404, mirror 404 need not be elliptical. If desired, mirror 404 may be rectangular.

Preferably, the distance between the image tiles 420 in object plane 225 and mirror 402 is approximately 652.2 mm. The distance between mirror 402 and 404 is preferably 30.5 mm and, when operated in this mode, the distance between mirror 404 and collimator element 436 is approximately 16.6 mm. The aperture stop 434 is located approximately 2.2 mm behind the collimator element 436. Lens 430 is preferably located 47.8 mm from aperture stop 434 in this mode, and lens 432 is located 14 mm from lens 430. The sensor 410 is preferably located 45.8 mm from lens 432. The total distance between object plane 25 and sensor 410 is therefore approximately 809.1 mm.

Preferably, the arrangement of lens 431 can be automatically switched to the arrangement of lens 440, shown in FIG. 11. Lenses 430 and 432, collimator 436, and sensor 410 each remain in the same locations as in lens 431. In lens 440, however, aperture 442 has a diameter slightly larger than aperture 434, although the f-number of the system remains constant at 7.9. Lens 440 also has lenses 444 and 446, which lower the magnification of lens 440 by 1.5× relative to lens 431. Lenses 444 and 446 are spaced approximately 21.7 mm from one another. In the arrangement shown in FIG. 11, lens 446 is located 8.3 mm from lens 430. Lens 444 is preferably an achromatic lens having front and rear sections with axial center thicknesses of 3.5 mm and 22 mm, respectively. Lens 444 preferably has a front concave surface 448 with a radius of curvature of approximately 50.22 mm, a central surface 450 with a radius of curvature of approximately 24.3 mm, and a rear concave surface 452 with a radius of curvature of approximately 45.2 mm. The diameter of lens 444 is approximately 18 mm. Lens 446 is preferably an achromatic doublet such as part No. 32,915, available from Edmund Scientific Company. Collimator element 436 preferably has one flat surface and one surface with a radius of curvature of approximately 365.7 mm. The clear aperture of collimator element 436 is 10 mm and the overall aperture of collimator element 436 is preferably 15 mm.

In addition to lowering the magnification of lens 431 by automatically switching to the lens 440, the magnification of the system 400 can be increased by 1.5× relative to lens 431 by automatically switching to the lens 454, shown in FIG. 12. The arrangement of lens 454 is identical to that of lens 440 (FIG. 11), with the exception that the position of lens 446, aperture 442, and lens 444 are reversed with respect to the position of these elements in lens 440.

Figure 13:
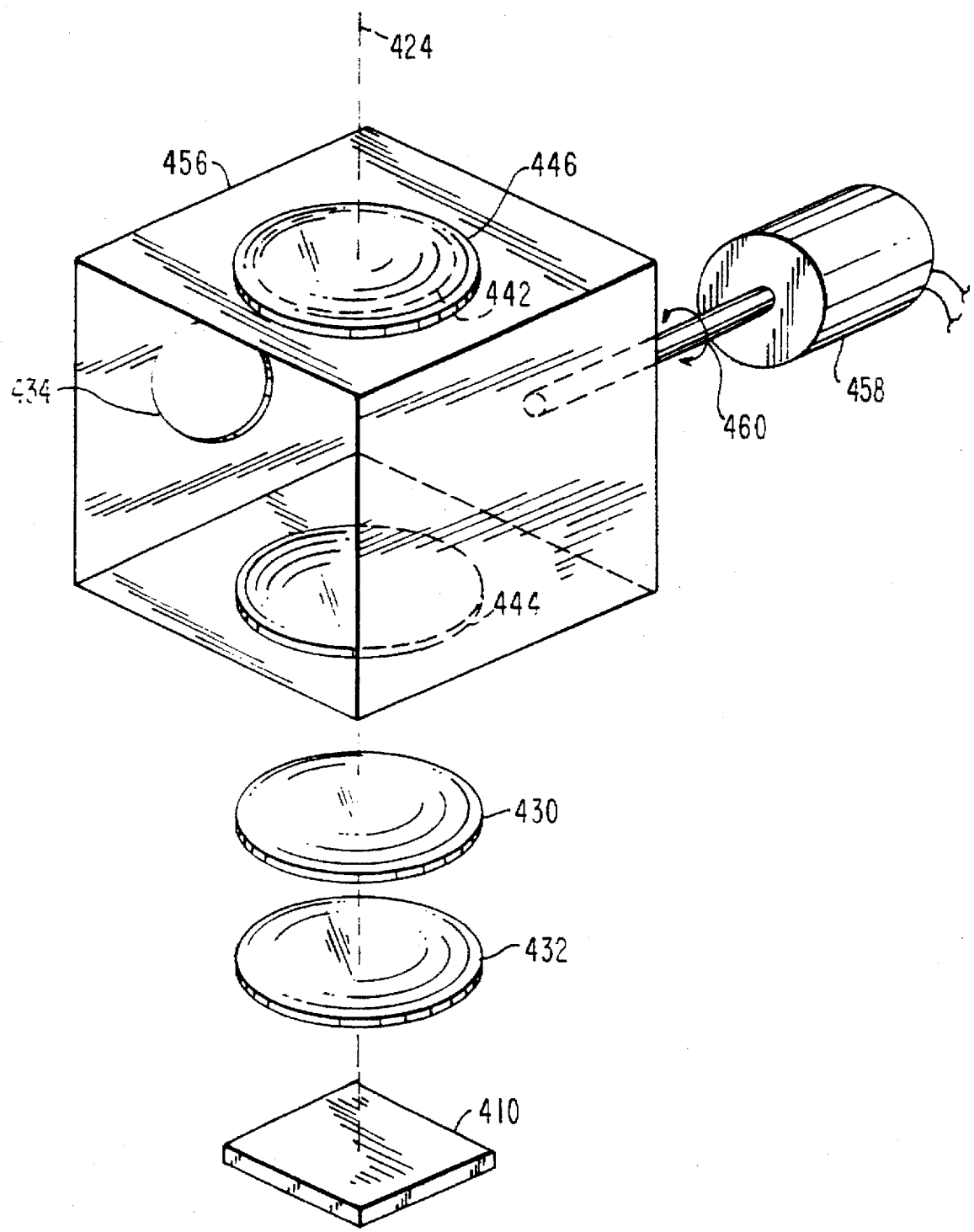
FIG. 13 is an illustrative embodiment of a rotatable cube in which the lens arrangements of FIGS. 10–12 have been mounted.

Preferably, lenses 444 and 446 and apertures 434 and 442 are mounted in rotatable cube 456, as shown in FIG. 13. Cube 456 can be rotated into position by motor 458, which drives shaft 460. When it is desired to use the lens 454 (FIG. 12), the cube 456 is positioned as shown in FIG. 13. If the nominal optical lens arrangement of lens 431 that is shown in FIG. 10 is desired, the motor 458 rotates cube 456 by 90°, so that aperture 434 is switched into use in place of aperture 442 and lenses 446 and 444. If the lens 440 is desired (FIG. 11), motor 458 rotates cube 456 an additional 90°, so that lens 446 faces lens 430 and lens 444 accepts incoming light from the image tiles 420 (FIG. 9).

By switching between these three positions, the system 400 can selectively image at demagnifications of approximately 11.7× (the nominal system demagnification), 7.8× (the nominal system demagnification of 11.7× further demagnified 1.5× by lens 440), and 17.6× (the nominal system demagnification of 11.7× magnified 1.5× by lens 454). In real time mode, the various lens arrangements for system 400 demagnify one of image tiles 420 so that it can be imaged properly by sensor 410, which is smaller than the image tiles 420 in object plane 25. However, when the image tile is displayed on the monitor in real time, the contents of the image tile will be enlarged.

The three demagnifications possible using the lenses and apertures mounted in cube 456 provide field widths of 3.20", 2.13", and 1.42" at object plane 25. The image size at the video display may be digitally increased in smooth steps using video frame grabber 74 (FIG. 7) and known electronic magnification techniques. If desired, dedicated image processor circuitry can be used to increase the image size. Combining digital magnification with the mechanical magnification adjustment possible using cube 456 creates a hybrid zoom arrangement. If a standard 14" display is used, the user can adjust the effective image-to-screen magnification between approximately 3.1× to 10.5×, using up to 1.5× electronic magnification to maintain good image definition. An advantage of the hybrid zoom scheme is that a few fixed magnification imaging lenses can be used in place of a complex fully mechanical zoom lens. Further, because a highly repeatable fixed magnification is required for scanning, a mechanical zoom lens would need to be highly repeatable, which is difficult to achieve in practice.

Stepper Motor Positioning

In order to acquire the separate image tiles 420 that make up image 408, mirrors 402 and 404 must be accurately positioned so that each image tile is deflected onto sensor 410 in succession. Preferably, stepper motors are used to control the position of mirrors 402 and 404. Stepper motors are preferred over mirror galvanometers, because the cost of commercial mirror galvanometer units is high and the construction of the motor used in can-stack stepping motors is similar to that of mirror galvanometers.

Stepper motors typically use a permanent-magnet rotor, which is enclosed by stator poles that are magnetically energized using solenoidal windings. Two stator windings and two sets of multi-pole stator plates enclose a single multi-pole rotor. The stator pole-pieces are arranged so that opposing torques can be induced by currents flowing through the two stator windings. A smoothly setable rotational displacement can be obtained from such a stepper motor by varying the proportion of currents flowing through the two windings. Preferably, a stepper motor with ball bearings such as model No. 36540-05-004, available from Haydon Switch and Instrument Corporation of Waterbury Conn., which has a cardinal step angle of 15° is used. The displacement of the stepper motor is continuously variable over the angle of a single step.

Although the displacement of stepper motors can be directly controlled in this way, stepper motors typically exhibit hysteresis in the angle of their displacement on the order of 0.75°. If a resolution of 300 dots per inch is desired for a distance between the object plane 25 and sensor 410 of approximately 81 cm, one pixel in the object plane 25 will subtend approximately 28 arc seconds at mirrors 402 and 404. To move the camera's field of view by one pixel, the mirror must move by half of this angle, or 14 arc seconds. Thus, to register multiple image tiles 420 using a fixed calibration and within one pixel accuracy, the incremental tile position must have a long term repeatability of better than ±7 arc seconds (±½ pixel).

Position Feedback

In accordance with the present invention, the deflection system incorporates position feedback, which allows the mirrors 402 and 404 to be positioned with sub-pixel accuracy. Conventional rotary encoders having this level of resolution are large and very expensive. Further, continuous absolute position readout is not required, only a repeatable readout relative to the desired tile center positions for each axis.

Figure 14:
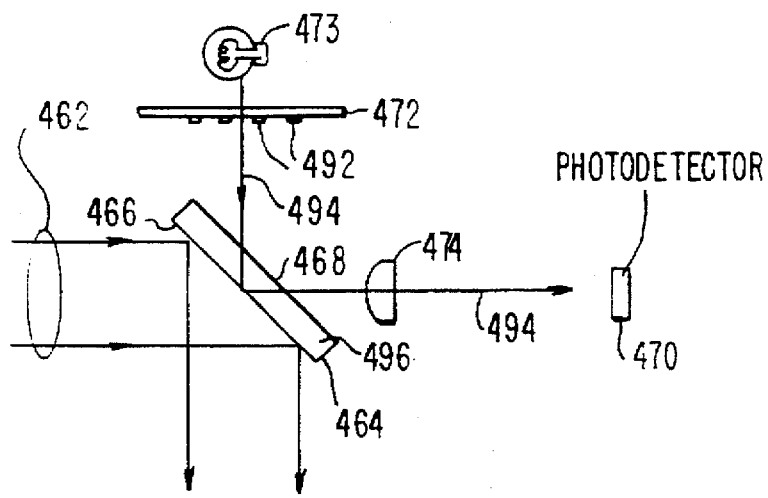
FIG. 14 is an illustrative embodiment of a lamp-based optical encoder constructed in accordance with the present invention.

A preferred position feedback system 463 is shown in FIG. 14. Mirror 464 is used to illustrate the position feedback scheme preferably used for each of the mirrors 402 and 404 in FIG. 9. Light rays 462 from the object plane 25 are deflected by the front silvered face 466 of mirror 464 toward cube 456 and sensor 410 (FIG. 13). Preferably mirror 464 is mounted so that back face 468 is unobstructed. A split diode photodetector 470 is arranged so that target pattern 472 is reflected off of the back side of the front silvered face 466 of mirror 464 and imaged onto photodetector 470 via lens 474. Preferably, lens 474 is a plano convex lens such as part No. 31,854, available from Edmund Scientific Company. A lens of this type may be used for both axis 416 and axis 418. The distance between target pattern 472 and mirror 464 is approximately 23.5 mm. Mirror 464 is approximately 3.5 mm thick. Lens 474 is preferably located 10.6 mm from mirror 464 and 31.6 mm from detector 470.

Figure 15:
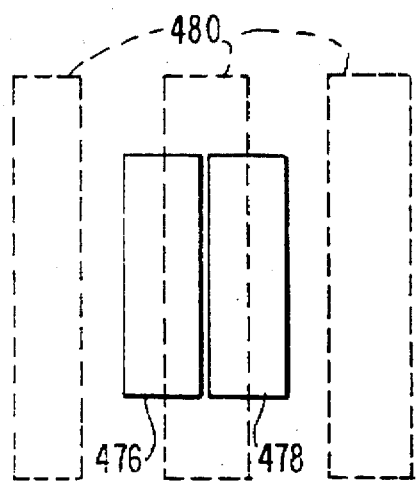
FIG. 15 is an illustrative embodiment of a split photodiode for use in an optical encoder.

Photodetector 470 is preferably a split photodiode photodetector such as part No. BPX48, available from Siemens Components Corporation, Cupertino, Calif. As shown in FIG. 15, photodetector 470 consists of two adjacent silicon photodiodes 476 and 478 formed on a common substrate, each 2.2 mm high and 0.7 mm wide, and separated by a gap of 0.1 mm. Also shown in FIG. 15 is the target image 480 of target pattern 472 (FIG. 14). The target pattern 472, which is preferably transmissive, is illuminated by a simple incandescent lamp 473 (FIG. 14). Preferably, target pattern 472 has a stripe for each image tile position along the corresponding tile axis. Thus, for the 32 image tile arrangement depicted in FIG. 9, in which there are 8 rows and 4 columns of image tiles 420, there are a corresponding 8 stripes on one target pattern and 4 stripes on the other target pattern.

In FIG. 14, a strip of target image 480 overlaps each of photodiodes 476 and 478 equally. At this point, the outputs of photodiodes 476 and 478 are equal. If, however, the mirror 464 is not properly positioned to deflect one of the image tiles 420 toward the sensor 410, the target strip would fall on photodiodes 476 and 478 unequally.

Figure 16:
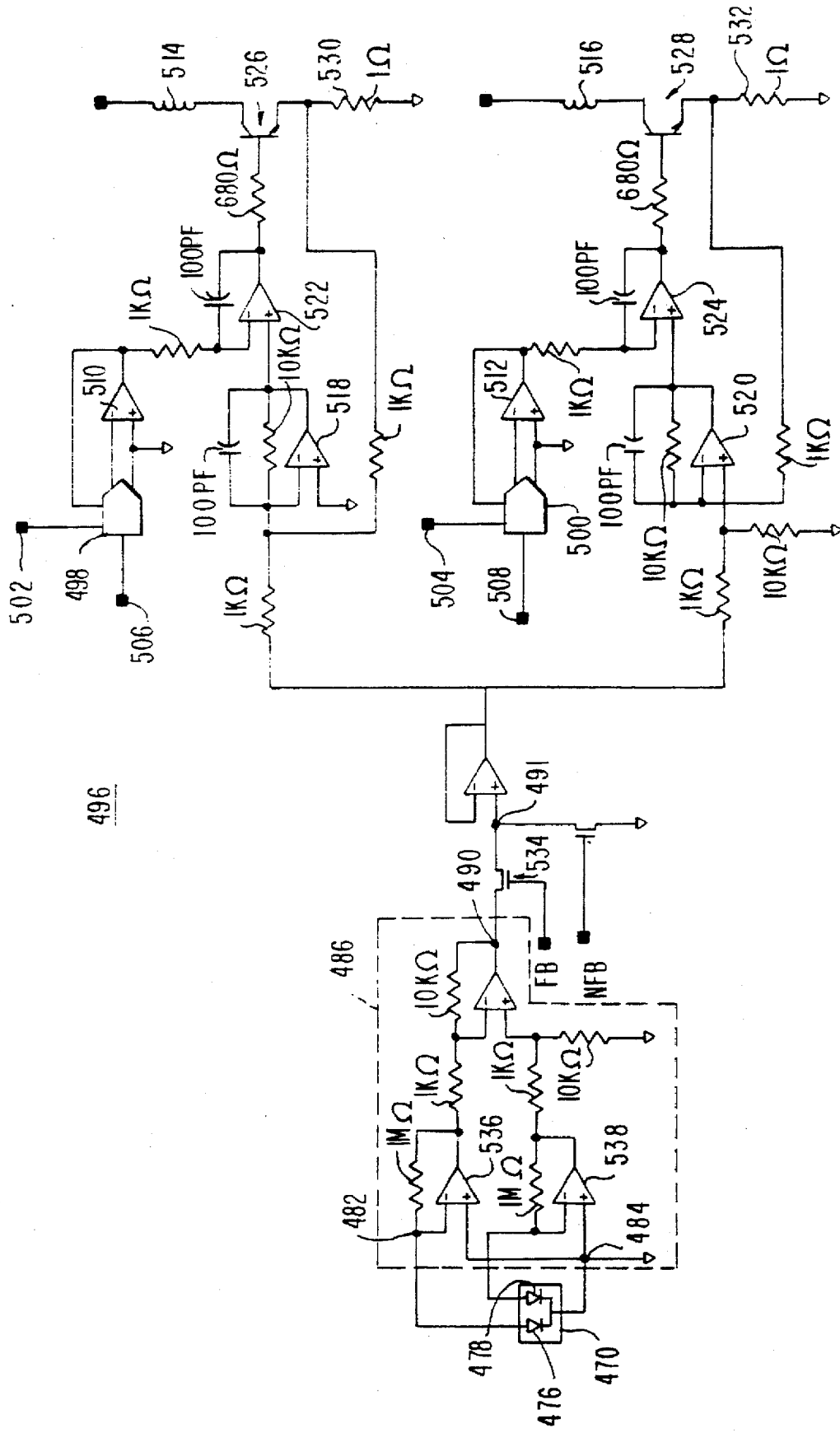
FIG. 16 is a schematic diagram of an illustrative embodiment of stepper motor control circuitry constructed in accordance with the present invention.

The output signals of photodiodes 476 and 478 are preferably provided to inputs 482 and 484 of difference amplifier 486, as shown in FIG. 16. Difference amplifier 486 generates a position feedback signal at output 490 when photodiodes 476 and 478 are illuminated unequally. The position feedback signal can be used to position the mirror precisely at each image tile position.

The appropriate spacing for the lines 492 of target pattern 472 that are shown in FIG. 14 is determined by the angles needed to reach the center positions of each of the image tiles 420 in object plane 25. As shown in FIG. 15, each of the stripes of target image 480 preferably covers one-half of each of the photodiodes 476 and 478 when the mirror 464 is properly aligned, which optimizes the dynamic range of the feedback system. The target pattern for one axis preferably has lines 492 (FIG. 14) that are approximately 0.83 mm wide at lateral positions of approximately ±1.03 mm and ±3.09 mm. The target pattern 472 for the other axis has lines 492 that are approximately 0.83 mm wide at lateral positions of approximately ±0.82 mm, ±2.45 mm, ±4.08 mm, and ±5.71 mm. The target-to-detector optical path 494 passes through the mirror glass 496, so that a refractive image shift is induced which varies with the angular position of mirror 464. Target pattern 472 can be adjusted to compensate for this shift or this small effect can be considered to be a component of the geometric distortion of image tiles 420, which can be compensated for electrically to ensure the image tiles 420 register properly.

The motor control circuitry 496 shown in FIG. 16 is used to control the motors 412 and 414 that position mirrors 402 and 404 (FIG. 9). A dual channel digital-to-analog converter, preferably part No. AD7537, available from Analog Devices Corporation of Norwood, Mass., is used to position the motors with 12 bit resolution. A 12 bit resolution is sufficient to provide smooth mirror positioning for continuously variable deflection, for example, for real time viewing in low-vision magnifier applications. Digital-to-analog converters with lower resolutions can be used for applications which only require that the mirrors 402 and 404 be coarsely positioned.

The digital-to-analog converter has first and second channels 498 and 500, which are provided with a reference voltage at terminals 502 and 504. Digital control signals received from SIN and COS lookup tables in a control unit such as personal computer 76 (FIG. 7) are provided to first and second control terminals 506 and 508, so that the analog outputs of the first and second channels 498 and 500 can be generated. The output signals of the first and second channels 498 and 500 are provided to buffers 510 and 512, respectively. If desired, a single channel digital-to-analog converter configured for differential output can be used instead of a dual channel digital-to-analog converter.

Motor coils 514 and 516 are driven by controlled-current circuits consisting of error preamplifiers 518 and 520, error amplifiers 522 and 524, drive transistors 526 and 528, and sense resistors 530 and 532. The error preamplifier inputs are configured so that the signals from the photodetector 470 acts differentially on the two channels when enabled by feedback switch 534. Feedback switch 534 is preferably arranged so that the digital feedback enable signals FB (feedback) and NFB (not feedback) either enable or disable the feedback path between output 490 and node 491.

In order to capture image 408, mirrors 402 and 404 are moved into the appropriate positions to sequentially acquire image tiles 420 (FIG. 9). When the mirror is being positioned to acquire a tile, the feedback path between output 490 and node 491 is disabled and software routines generate the digital control signals to set digital-to-analog converters 498 and 500 to the appropriate settings. The values stored in the lookup tables and used by the software routines are preferably determined during factory calibration. After placing the mirrors 402 and 404 in the basic position to acquire an image tile 420, the feedback path between output 490 and node 491 is enabled to precisely place the mirror in its final position. The feedback signal from output 490 will actively damp ringing, providing a settling time of less than 33 ms, as required. Although the optical feedback signal creates a differential proportioning of current between the two motor coils, as opposed to a SIN/COS relationship, any non-linearity induced is unimportant, because the motion produced is a small fraction of the total step angle.

The output of the buffers 510 and 512 are inverted, so that if a positive reference voltage, $V_{REF}$, is supplied to terminals 502 and 504, the outputs of digital-to-analog converter channels 498 and 500 will range between 0 and −(VREF/ 4096)*4095. The inputs to error amplifiers 522 and 524 re-invert the outputs from buffers 510 and 512. A VREF voltage of 4.00098 V results in a −4.00000 V DAC full-scale output and maximum current in motor coils 514 and 516 of 400 mA.

The photodiodes 476 and 478 are operated in the photovoltaic mode, which results in negligible dark current and a dynamic range of nine orders of magnitude. The operational amplifiers 536 and 538 are preferably of the low-bias current junction field-effect transistor (JFET) type, such as part No. LT1057, available from Linear Technology Corporation of Milpitas Calif. Part No. LT1057 is a monolithic dual-channel device, which insures that offset and drift effects cancel, providing long-term stability at the output of difference amplifier 486. Part No. LT1057 is preferably also used for all other amplifier stages shown in FIG. 16. The motor control arrangement of the present invention, including motor control circuitry 496, provides a long-term tile positioning repeatability of ±⅛ of a pixel.

Figure 17:
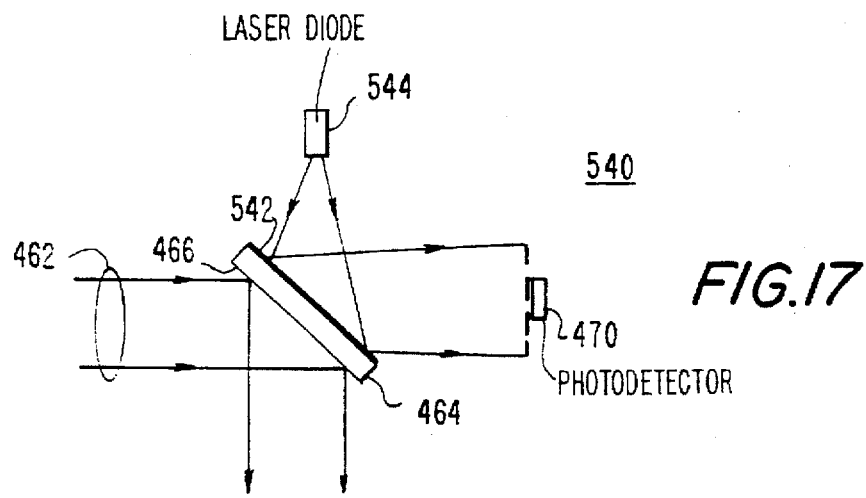
FIG. 17 is an illustrative embodiment of a laser-diode-based optical encoder constructed in accordance with the present invention.

An alternative to the position feedback system 463 of FIG. 14 is shown in FIG. 17. In position feedback system 540, mirror 464 still reflects light rays 462 from front silvered surface 466. However, rather than imaging target pattern 472 with lens 474, as in FIG. 14, target 542 is provided on the rear surface of mirror 464. Preferably target 542 is a reflective hologram pattern generator, which is mastered so that a set of bright stripes are projected onto the split-diode photodetector 470 when target 542 is illuminated with laser diode 544. The pattern produced at photodetector 470 is preferably similar to the target pattern image that is projected onto photodetector 470 by lens 474 (FIG. 14). The pattern is offset by mirror motion, which produces the required position feedback signal. An advantage of the position feedback system of FIG. 17 is that no lens is required, provided that photodetector 470 is properly positioned.

It will be understood that the particular embodiments described above are only illustrative of the principles of the present invention, and that various modifications could be made by those skilled in the art without departing from the scope and spirit of the present invention. For example, other motor drive circuit arrangements may be employed. A motor drive circuit could use a chopper-drive configuration in which the error amplifier is followed with a pulse-width modulator consisting of a triangle ramp generator and comparator. The drive transistor topology can be altered in this configuration to use a high-side PNP transistor switch with a schottky diode clamp connected across the motor coil and sense resistor pair, so that continuous sensing of current flowing in the motor coil is provided to the error amplifiers, regardless of the switching action of the drive transistor.

The target projection optics may also take other forms. For example, the fixed target and incandescent illuminator may simply be replaced by a fixed transmissive holographic line generator illuminated by a laser diode or by a non-coherent narrow-band illuminator such as an LED. A simple diffraction grating could also be substituted for the holographic line generator.

Image Warping

Regardless of the particular hardware that is used to sequentially deflect each of the image tiles 420 of image 408, the image tiles received at the sensor 410, will suffer from angle-of-view distortion. This type of distortion arises because the object plane 25 is flat and the position of the optical deflector arrangement is fixed. As the deflectors (e.g., mirrors 402 and 404) direct the point-of-gaze of the system 400 (FIG. 9) to various locations in the object plane 25, the distance from the mirrors 402 and 404 to the object plane 25 vary. The variation in the distance between the mirrors 402 and 404 and the object plane 25 causes the length of the optical path 424 to vary as a function of the location of an image tile 20 in object plane 25. For large deflection angles, the lengths of path 424 varies appreciably, so different tiles are viewed with different magnifications. The length of the path 424 also varies within each image tile 420 itself, so that the images of the image tiles 420 that are received at sensor 410, are no longer rectangular, and will not properly register when assembled in a mosaic image unless they are first geometrically corrected.

Figure 18:
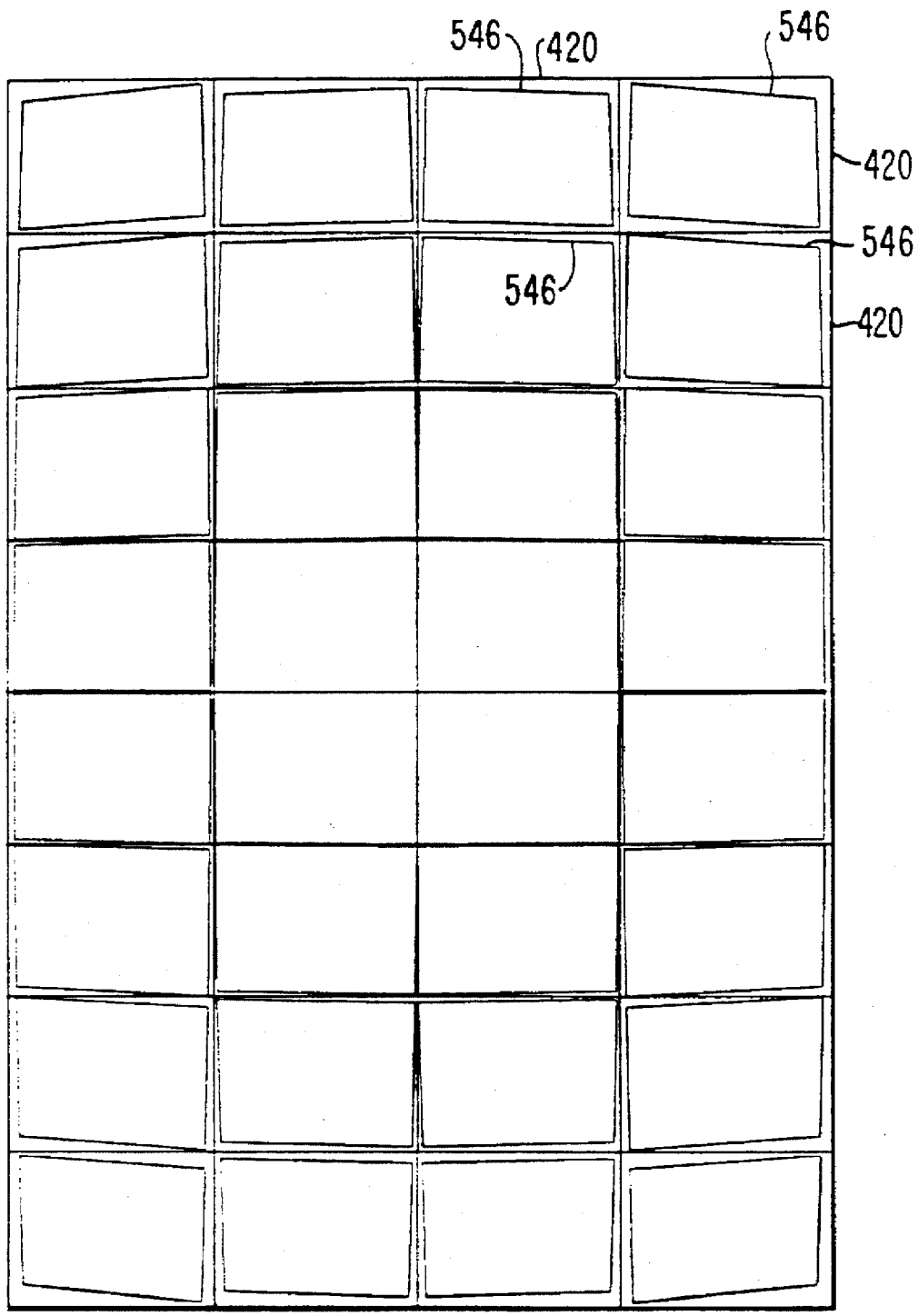
FIG. 18 is a diagram that illustrates the effect of angle-of-view distortion on image tiles.

The shape of the image tiles 420 as they are received by sensor 410 is shown in FIG. 18. The shapes of the received image tiles 546 are shown inside undistorted image tiles 420, as those tiles appear in the object plane 25. The received image tiles 546 corresponding to image tiles 420 farthest from the center of the image 408 are smaller than the received image tiles corresponding to image tiles 420 near the center, because magnification is reduced as the optical path length increases. The reduced magnification for the outlying image tiles causes the field of view to overlap neighboring tiles. Scaling and translation alone cannot be used to register the tile image since distortion is not equal along neighboring tile edges.

In order to accurately register the tiles for assembly into the final image, a geometric transformation of the tile images is required to remove distortion in the images by re-spacing the image pixels. Spatial transformations such as these are known as image warps. In accordance with the present invention, received image tiles 546, which suffer from angle-of-view distortion, are transformed into image tiles with the same regularly fixed spacing that image tiles 420 had in the object plane 25. This type of spatial transformation is known as a reverse mapping, and may be expressed as:

$$[u,v]=[U[x,y], V[x,y]]$$

where [u,v] are the pixel coordinates in the input image that correspond to the regularly spaced pixels [x,y] in the output image. The square brackets enclosing the coordinates denote discrete coordinates of finite precision. The functions U and V are mapping functions which describe the spatial transformation from output to input coordinates. Given these mapping functions, it is possible to determine the value of each regularly spaced output pixel P[x,y] by computing the corresponding input pixel coordinate [u,v] and resampling the input image at that point. That is, coordinate [u,v] will include a fractional portion which expresses an offset of the input pixel position (corresponding to [x,y]) from the original sampling grid (the array of pixels in sensor 410). During the process of resampling, interpolation can be used to reconstruct the intensity of the pixel at [u,v] by appropriately weighting neighboring pixels in the input image. The resampling process may be implemented as a filtering operation, using filter weights for neighboring pixels.

In addition to the angle-of-view distortion shown in FIG. 18, errors related to positioning inaccuracies can also be corrected for electronically. The slight distortions introduced by lenses and deflectors may also be compensated for electronically. Further, television-type sensors, such as sensor 410, have unequal sampling frequencies in the horizontal and vertical directions. As a result the pixels of sensor 410 are rectangular, an effect that can be compensated for during transformation of the image.

Although the mapping functions U and V could be determined analytically by modelling these distortion and translation effects, analytical modeling of such effects is not straightforward. A calibration process may therefore be used. Tile images taken by scanning a fiducial test pattern placed in the object plane 25 are analyzed, so that the system 400 can compensate for the effects of distortion. The calibration process results in the determination of the coordinates of fiducial spots, which can be located by the personal computer 76 by executing analysis routines. Personal computer 76 can then specify the reverse mapping transform for warping and assembly of the received image tiles 546. If desired, dedicated image processing hardware can be used to implement the desired warping function.

The warping process involves generating coordinates [u,v] in the tile image that specify input pixel locations for spatial transformation to pixel locations [x,y] in the final image and resampling of input data at [u,v] to determine the intensity of the pixels in the final image.

Figure 19:
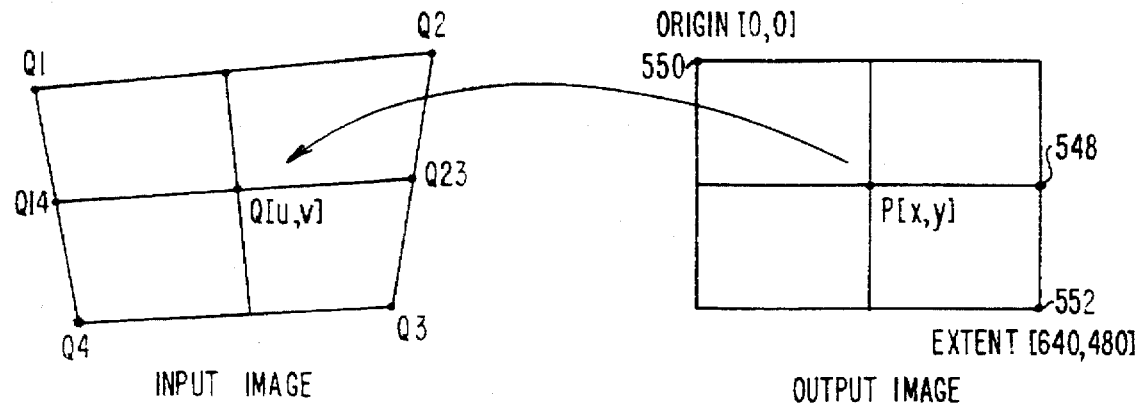
FIG. 19 is a graphical representation of the process of image warping.

The use of a calibration fiducial pattern to specify the mapping functions U and V involves the mapping of a quadrilateral to a rectangle, as shown schematically in FIG. 19. Given the four corner coordinates of a quadrilateral in the input image Q1–Q4[u,v] which correspond exactly to the four corners of a rectangle in the output image P1–P4[x,y], all input coordinates [u,v] corresponding to output pixel coordinates [x,y] may be found using interpolation. This technique known as four corner mapping.

The fiducial pattern has spots located exactly at the points in the object plane where the corners of the image tiles 420 are to be placed to obtain a specified sampling frequency, for example, 300 dots per inch. To generate the needed calibration data, the fiducial pattern image is captured and the spot coordinates are located. The spot coordinates correspond to the corners of the desired output image rectangle of 640×480 pixels (a 2.133 inch×1.600 inch portion of the image at 300 DPI). Interpolation between the fiducial coordinates that are obtained yields a complete mapping of the input coordinates [u,v] to the output pixel coordinates [x,y]. The [u,v] coordinates are then used to drive resampling of the captured tile image with each resulting pixel being stored in the output image. This two-part mapping and resampling process accomplishes the necessary spatial transformation of the image tiles.

The process of interpolating an input coordinate [u,v] that corresponds to output coordinate [x,y] from the fiducial quadrilateral bounded by points Q1 through Q4, using interpolation, is shown in FIG. 19. In the figure, the output tile image rectangle 548 is bounded by ORIGIN 550 and EXTENT 552 using normalized coordinates (the coordinates of ORIGIN 550 are [0,0]). For the point P[x,y] in the output image, two fractional interpolation intervals, x' and y' can be defined, where:

$$x'=x/\text{EXTENT}[x]$$

$$y'=y/\text{EXTENT}[y]$$

In this case, EXTENT[x]=640, EXTENT[y]=480.

In finding input point Q[u,v], point Q14 on the left side of the quadrilateral in the figure is first calculated:

$$Q14[u]=Q1[u]+(Q4[u]-Q1[u])*y'$$

$$Q14[v]=Q1[v]+(Q4[v]-Q1[v])*y'$$

using the same method point Q23 on the right side is calculated. Finally, point Q[u,v] is calculated on the line Q14,Q23:

$$Q[u]=Q14[u]+(Q23[u]-Q14[u])*x'$$

$$Q[v]=Q14[v]+(Q23[v]-Q14[v])*x'$$

The output pixel P[x,y] is therefore reverse mapped into the input data at Q[u,v], as shown by the arrow in the figure.

Although this interpolation technique is workable, it is somewhat inefficient, because two divisions and six multiplications are required. Preferably, the input data can be resampled using, for example, bilinear interpolation of the intensity values of the four input pixels that bound each input coordinate [u,v]. This requires that the four pixel neighborhood nearest each [u,v] in the input image be located and input data fetched for each output pixel to be generated.

Coordinate generation and image resampling can be simplified by using the principal of separability. Both the generation of input coordinates [u,v] and the interpolation of output pixel intensities (resampling) can be performed in separate passes for the x image axis and y image axis. Separable interpolation produces the same result at the output as methods which transform both the x and y axis in one operation. The input coordinates can therefore be generated using a continuous incremental method requiring only addition. Further, the input pixels can be used in 1-dimensional sequential order during each pass, so that neighboring pixels may be stored in a simple software or hardware pipeline for interpolation of intensity. This greatly reduces the rate at which pixels are retrieved from memory and simplifies memory addressing. Additional efficiency is obtained by generating the input pixel ordinate and performing the resampling interpolation concurrently, as each pixel is processed. Fixed-point mathematical operations are preferably used for all calculations.

The two-pass method for generating input pixel coordinates from the fiducial quadrilateral is shown in FIG. 20. FIG. 20 shows the region in input image 554 that is bounded by the fiducial calibration quadrilateral Q1–Q4. FIG. 20 also shows the intermediate image data 556, after resampling in the x dimension, where the fiducial quadrilateral has been transformed into the trapezoid Q1'–Q4'. The output image rectangle 558 is shown bounded by points ORIGIN and EXTENT.

The generation of input sampling coordinates uses a set of pre-computed parameters to improve efficiency. The first image transformation pass resamples the input image in the x direction. Although this pass could process the entire y extent of the input image, it is more efficient to restrict the x transformation to a region of interest in the y dimension. A Y_MIN parameter is calculated by comparing Q1[v] and Q2[v] and taking the smaller (uppermost) value. Similarly, Q4[v] and Q3[v] are compared to find the Y_MAX parameter as the lowermost value.

In contrast to the technique of FIG. 19, which may require image data to be fetched along diagonals, the x pass does not transform the y-component of image geometry, so this pass can proceed in scanline order. In order to locate the starting point and ending points for the first scanline in the vertical region of interest (Y_MIN to Y_MAX), it is necessary to extrapolate the left and right sides of the quadrilateral shown in FIG. 20. To do this, two parameters are first computed, DELTA_X_START and DELTA_X_END, where:

$$\text{DELTA\_X\_START}=(Q4[u]-Q1[u])/(Q4[v]-Q1[v])$$

$$\text{DELTA\_X\_END}=(Q2[u]-Q3[u])/(Q2[v]-Q3[v])$$

End points for the first scanline are then extrapolated as follows:

$$\text{X\_START}=Q1[u]-(\text{DELTA\_X\_START}*(Q1[v]-\text{Y\_MIN}))$$

$$\text{X\_END}=Q2[u]-(\text{DELTA\_X\_END}*(Q2[v]-\text{Y\_MIN}))$$

At this point, the end points have been located for the first scanline to be processed in the x transformation. It is next desired to generate a continuous set of resampling coordinates along the u axis of the scanline. The distance between adjacent input points mapping to the output grid along the u axis is equal to the inverse of the scale factor from input to output. This follows directly from the definition of the transform as an inverse mapping. Given a fixed output tile dimension of 640 pixels, the factor X_INVERSE_SCALE is calculated:

$$\text{X\_INVERSE\_SCALE}=(\text{X\_END}-\text{X\_START})/640$$

When traversing a scanline in the input image during the x transformation, successive values of the u ordinate are produced by successively incrementing the u ordinate by X_INVERSE_SCALE. Addition of X_INVERSE_SCALE to the current value of the u ordinate advances the input data position by a distance corresponding to one pixel on the output image grid. The scale factor is computed with finite precision, so that repetitive addition of X_INVERSE_SCALE will create a cumulative error in the u ordinate. The precision of the scale factor and of the u accumulator are preferably chosen so that this error will never exceed 1/16 of an output pixel.

The x transformation specified by the four-corner mapping requires that different starting points and scale factors be used for each scanline processed, as shown in FIG. 20. The initial input pixel ordinate, u, for each successive scanline may be found by adding the DELTA_X_START parameter that was calculated above to the starting u ordinate of the previous line. Precision of the parameter and accumulator must allow for error accumulation within the total 1/16 output pixel criterion mentioned above. In order to adjust the X_INVERSE_SCALE parameter for each line, DELTA_X_INVERSE SCALE is calculated:

DELTA_X_INVERSE SCALE=(DELTA_X_END−DELTA_X_START)/480

Successive addition of DELTA_X_INVERSE SCALE to the X_INVERSE_SCALE factor for each scanline produces u ordinates with spacing that varies in the v direction, as needed by the x warping transformation and depicted in FIG. 20. The precision of the parameter and accumulator must be chosen to appropriately limit overall error.

The above parameters require an adjustment for pixel center location. A pixel coordinate may be defined to correspond to the upper left-hand corner of the area of the sampling grid covered by a pixel. To properly compute resampling positions this must be taken into account. Thus, the value of the X_START parameter is adjusted as follows:

X_START=X_START+X_INVERSE_SCALE/2+0.5−1

The addition of X_INVERSE_SCALE/2 positions the input pixel to correspond to the output pixel center. The addition of 0.5 moves the start ordinate to the center of the input pixel. The subtraction then moves the ordinate to the prior input pixel in order to obtain the center location of the first of the pair of input pixels needed to interpolate the intensity of the output pixel. Corresponding adjustments are made to Y_MIN and Y_MAX to ensure that the vertical region of interest includes the neighbors needed for interpolation during the y transformation pass after pixel center locations are accounted for.

The parameters Y_MIN, Y_MAX, X_START, DELTA_X_START, X_INVERSE_SCALE, and DELTA_X_INVERSE SCALE are therefore used to fully specify the x axis warp transformation. The transformation is then carried out in scanline order as follows:

(1) An input scanline, pointer p_inline is set to the start of the first scanline of input data specified by coordinate [X_START, Y_MIN]; p_inline includes the fractional part of X_START.

(2) An integer output pointer p_outpel is initialized to the origin of an intermediate image buffer.

(3) For each scanline in the input image an input pixel pointer p_inpel is set to p_inline.

(4) For each of the 640 output pixels, the fractional part of p_inpel is assigned to interpolation interval variable U. Variable p_inpel is used to retrieve an input pixel if the integer portion of p_inpel has advanced. A new output pixel is interpolated using U as the interpolation interval and p_outpel is advanced. X_INVERSE_SCALE is then added to p_inpel to advance to the next input pixel location.

(5) For each scanline in the input image until Y_MAX has been processed, DELTA_X_START is added to p_inline and DELTA_X_INVERSE_SCALE is added to X_INVERSE_SCALE. The pointer p_outpel is also advanced to the start of the next output line in the intermediate image buffer.

Referring again to FIG. 20, the intermediate image at lower left represents the output of the x transformation. The intermediate image buffer contains image data with scanlines (rows) of exactly 640 pixels. The y transformation pass will warp this image to the desired regular grid of output pixels with columns of exactly 480 pixels. Pixel Q[u,v] in the input image has been transformed to the pixel Q'[x,v] in the intermediate buffer. The y pass will transform this pixel to P[x,y] in the buffer for the final image.

The parameters controlling the second pass are similar to those used for the first, but simplifications result from the normalization and alignment of x ordinates in the intermediate buffer. The x pass requires the Y_MIN and Y_MAX parameters to bound the region of interest of the warp. This is not needed in the y pass since the region to be processed implicitly spans the intermediate image from x=0 to x=639. Thus, no equivalent parameters are supplied. The y transform pass sequentially processes columns of pixels in the intermediate image buffer. Unlike the x transform, it is not necessary to extrapolate the endpoints of the first segment since the bounding sides are now parallel. However, the delta parameters are still needed to find the DELTA_Y_INVERSE_SCALE, and to adjust the starting point of columns after the first. Since all rows of data are now 640 pixels in length:

DELTA_Y_START=(Q'4[v]−Q'1[v])/640

DELTA_Y_END=(Q'3[v]−Q'2[v])/640

As can be seen in figure, the fiducial quadrilateral is now a trapezoid, thus:

Y_START=Q'1[v]

Y_END=Q'2[y]

As before:

Y_INVERSE_SCALE=(Y_END−Y_START)/480

DELTA_Y_INVERSE SCALE=(DELTA_Y_END−DELTA_Y_START)/640

Using these parameters, the intermediate image is transformed to complete the geometrical correction of the tile. The processing algorithm, which is implemented in hardware or software, is identical with the one described above for the x transform, except that exactly 640 columns of data are processed, and the image data is written into a mosaic image buffer with an offset corresponding to the location of the particular tile being processed.

Separable bilinear interpolation of pixel intensities can be accomplished using the operations:

$x = x0+(x1-x0)*u'$ (x warping pass)

Figure 21:
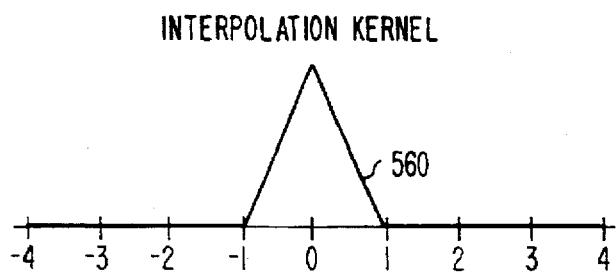
FIG. 21 is a graphical representation of an interpolation kernel that may be used during pixel convolution.
Figure 22:
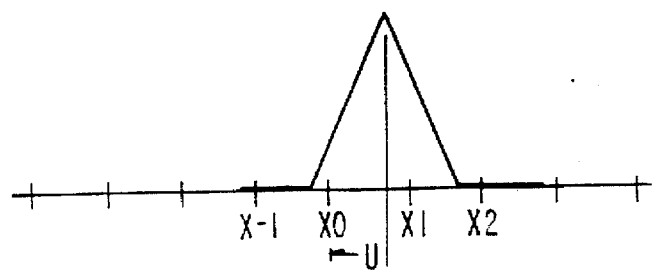
FIG. 22 a graphical representation of the interpolation kernel of FIG. 21, further illustrating the convolution coordinates used during convolution.
Figure 23:
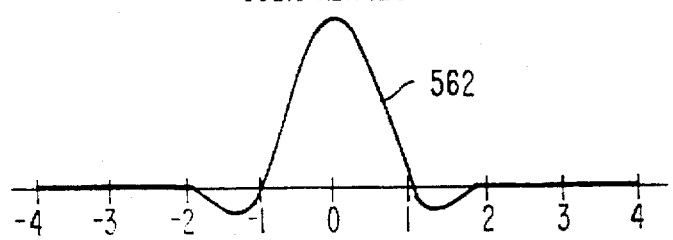
FIG. 23 is a graphical representation of a preferred interpolation kernel that may be used during pixel convolution.

$y = y0+(y1-y0)*v'$ (y warping pass)

where x and y are output pixels intensities; x0, x1 and y0, y1 are the intensities of pixels neighboring the input pixels, and u' and v' are the fractional portions of the reverse mapped u and v coordinates. The quantities u' and v' may be referred to as resampling intervals. This operation involves the convolution of the neighboring input points by the interpolation kernel 560 shown in FIG. 21. During convolution, interpolation kernel 560 is positioned relative to the input samples using the interval u' or v', as shown in FIG. 22. Although this simple interpolation operation may be satisfactory, optimal results are obtained using the interpolation kernel 562, shown in FIG. 23, which is based on a cubic spline shape approximating the function $\sin(x)/x$—the ideal low-pass filter. Images interpolated using kernel 562 show less loss of detail than those using the triangle-shaped kernel. In order to use kernel 562, a minimum of four neighboring points are needed to generate an output pixel in the interval u'.

Figure 24:
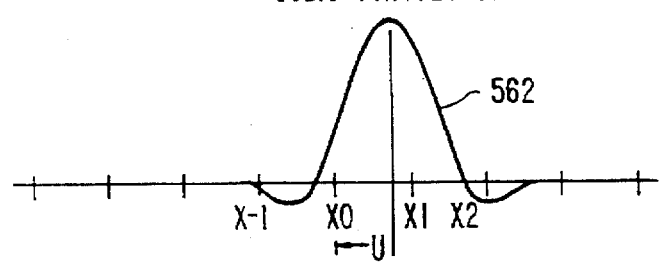
FIG. 24 is a graphical representation of the interpolation kernel of FIG. 23, further illustrating the convolution coordinates used during convolution.

The values for the convolution coefficients at x-1 through x2, shown in FIG. 24, can be generated as needed using a cubic spline function. It is more efficient, however, to generate sampled values along kernel 562, which can be stored in lookup tables using the technique known as "binning." Good performance can be obtained by storing 16 coefficient values for each of the coefficients at points x-1 through x2 in the convolution. The interpolation is therefore carried out by rounding u' to 4 bits of precision and addressing the four kernel lookup tables with this value to access one of 16 bins per lookup table. This yields the four coefficients k-1 through k2 which correspond to the kernel values at x-1 through x2 when the kernel is positioned relative to the input data by the interval u'. The output pixel is then found by convolution as follows:

$$x=(x-1*k-1)+(x0*k0)+(x1*k1)+(x2*k2)$$

The input coordinate generation and resampling procedures described above can be modified to ensure that the region of interest in the input image contains the necessary four pixel neighborhood at the edges of the fiducial quadrilateral. Further, a four pixel pipeline of pixels can be used in the transform inner loops to reduce the frequency of pixel data fetches.

Although kernel 562 is best used for magnification of the input image, other kernels can be generated to achieve demagnification of the input image data. A geometric correction of the input image that requires both stretching and squeezing can therefore be obtained. Optimal demagnification involves using a unique demagnification kernel for each scale factor, although this is generally not the case during magnification. In practice, the demagnification kernels are non-critical, because the effect of the demagnification is to reduce the information content of the image. A single demagnification kernel is generally adequate for the range of mild geometric squeezing needed for tile correction. If desired, other kernel shapes can be used, and additional data points and coefficient bins can be used to further improve the filter characteristics of the system.

Calibration Fiducial Pattern

Figure 27:
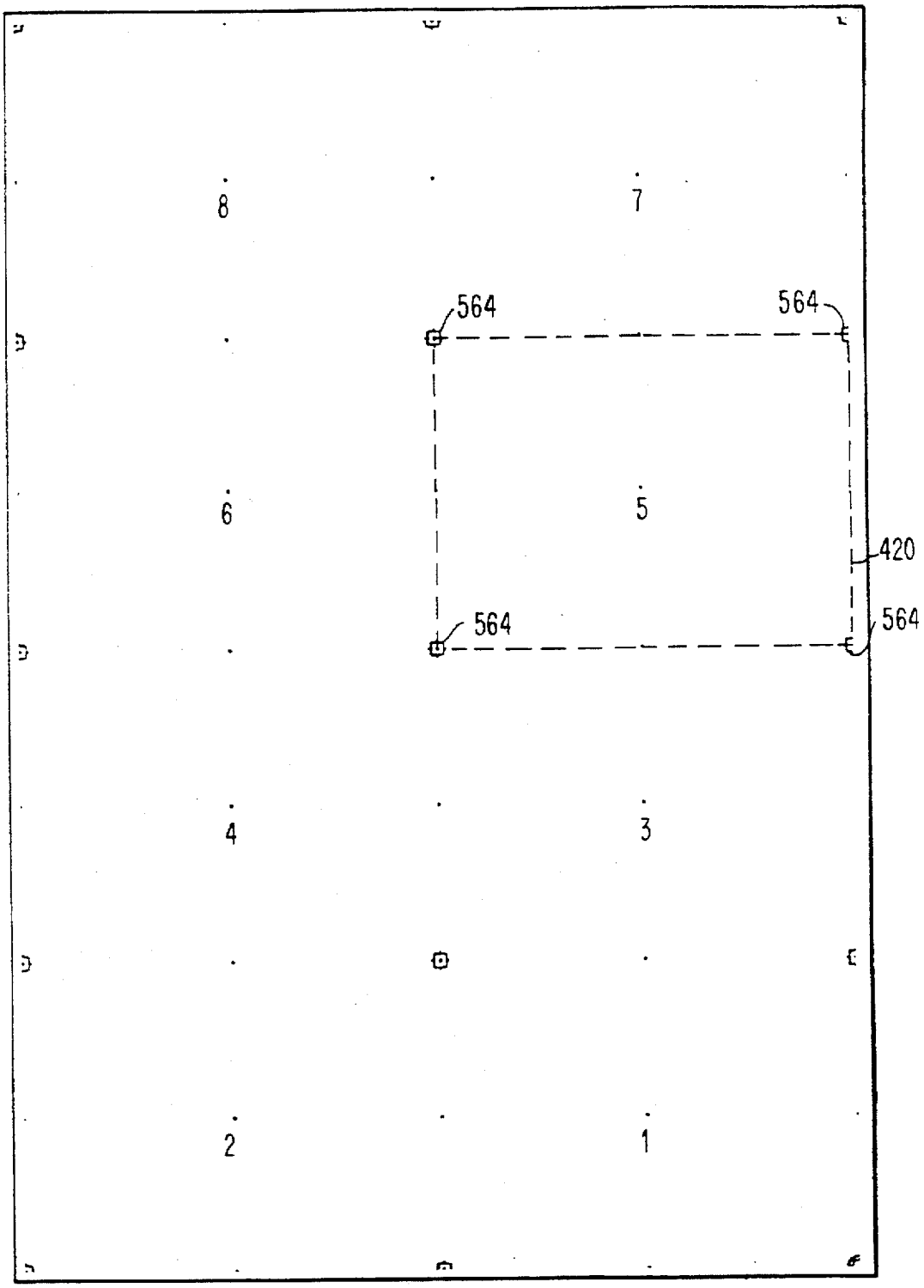
FIG. 27 is an assembled image of an illustrative embodiment of the fiducial pattern of FIG. 25, after the image input device of the present invention has been calibrated using the fiducial pattern.

The results obtained by the geometric correction and tile assembly process of the present invention are shown in FIGS. 25–28. Eight image tiles 420 are shown in FIGS. 25–28, which correspond to the upper-left quadrant of tiles of the 4×8 tile array shown in FIGS. 3A, 9, and 18. Because the lower right-hand corner of the eight-tile quadrant corresponds to the camera pivot point, the image distortions shown in FIGS. 26 and 27 are replicated in the other three quadrants.

Figure 25:
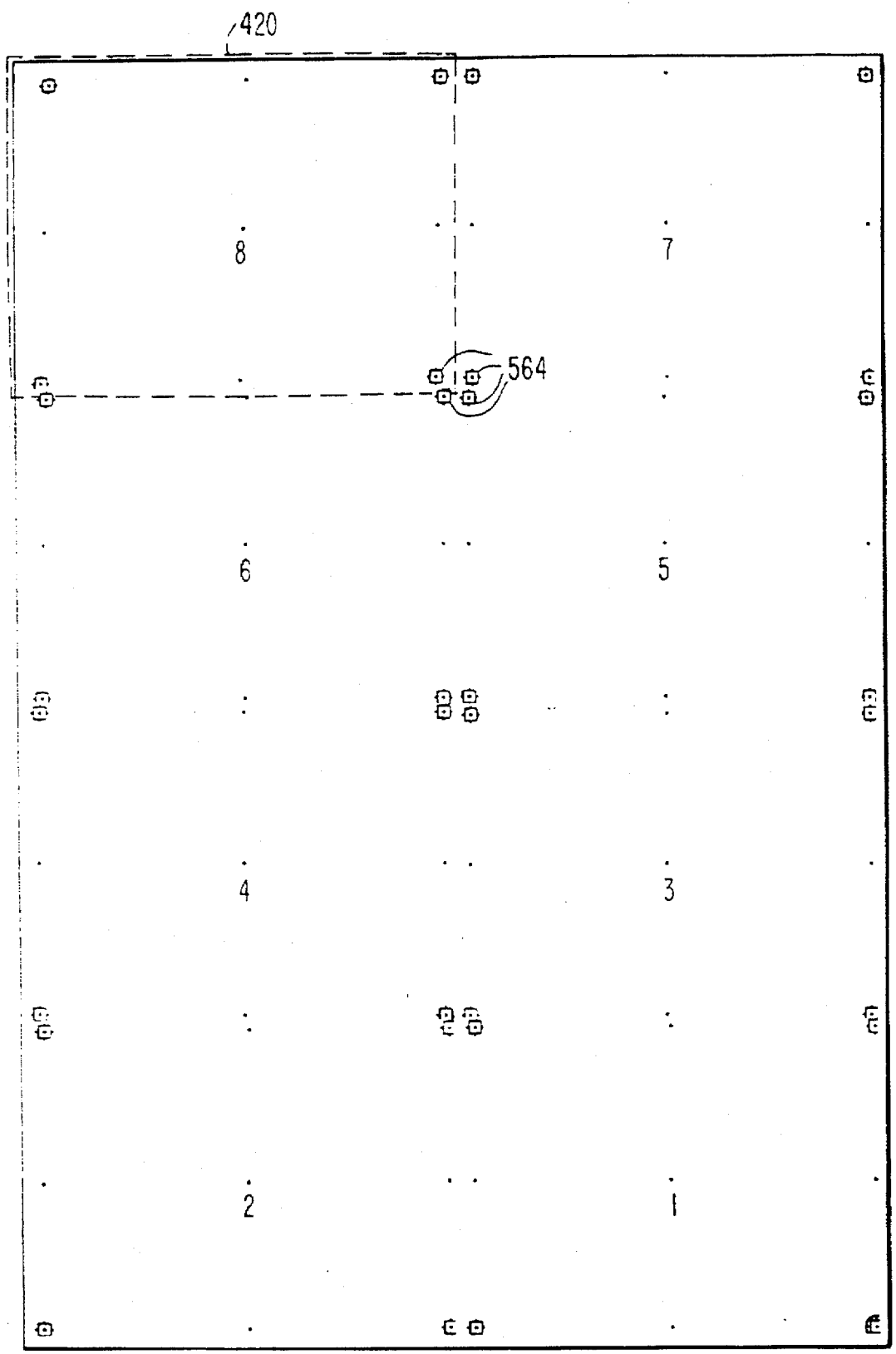
FIG. 25 is an assembled image of an a fiducial pattern prior to calibration of the input device of the present invention showing misregistration of the image tiles due to angle-of-view distortion.

The images taken of the fiducial pattern for the eight tile locations are shown in FIG. 25. The tile images have been processed to convert them to square-pixel format, thresholded for printing and copied into a single image buffer. Each corner point 564 of the fiducial is captured in a neighboring image, because image tiles 420 overlap. As shown in FIG. 26, this results in a disjointed replication of text such as text image 566. Neighboring tiles must therefore be warped to join precisely at corner points 564.

The fiducial tile images of FIG. 25 are used to obtain spot coordinates so that the image tiles 420 can be properly warped. As shown in FIG. 27, when the fiducial pattern is warped, it may be stitched together to form an undistorted pattern 568. The warp of each tile image is driven by the [u,v] coordinates obtained via the four-point mapping procedure in which the tile images are resampled via interpolation of neighboring pixel intensities. Each of the three internal target box patterns in FIG. 27 is made up of four sections that have been warped from each of the four adjoining tile images to coincide exactly at the fiducial spot enclosed by the target box. As shown in FIG. 28, text images such as image 570 register precisely and do not exhibit the geometric distortion shown in FIGS. 25 and 26. The boundary of adjoining image tiles 420 is shown by small crosshairs.

The corners of each tile image 420 are adjusted so that the tiles 420 register precisely at the corners 564, as shown in FIG. 27. Although the tiles 420 are smoothly stitched together, internal non-linear distortions of the tile images 420, such as angle-of-view distortion, are not completely removed by this process. Piecewise processing of the images tiles 420 can be used, however, to reduce non-linear distortions to imperceptible levels.

To implement a piecewise approximation, additional fiducial points are added to characterize the interior of the tile image 420. For example, an array of 5 (horizontal) by 4 (vertical) fiducial spots can be used to divide the tile into 12 interior regions. Each of these regions corresponds to a square region 160×160 pixels large in the 640×480 pixel output image.

The warp transformation is preferably carried out in this piecewise fashion, through each of the 12 interior regions. Distortion in the interior regions is reduced to one-forth of the distortion that results if no piecewise processing is used. If desired, the image tiles 420 can be subdivided further to reduce non-linear distortions to a greater extent.

Using subdivided image tiles 420 allows the size of the intermediate image buffer that is used to provide separable processing of the rows and columns of pixels in image tiles 420 to be reduced. An intermediate buffer is needed because all rows in the image must be processed before the columns are processed. Because row and column data must be transposed in the intermediate buffer, the fast static column access mode of dynamic random-access memory (DRAM) memories cannot be used. Although faster static random-access memory (SRAM) memories could be used for the intermediate buffer, these memories are considerably more expensive than DRAMs. To permit both row and column access, the buffer memory must be organized in regular fashion and cannot be packed. Thus, for a 640 by 480 pixel image, a 1024 by 512 byte SRAM array is needed for a full-frame intermediate buffer. The intermediate buffer also imposes a one-frame latency in the processing of images, which creates a time lag when used for scaling real-time video to provide, for example, the hybrid-zoom function.

Patch-Wise Processing

In accordance with the present invention, the input image data is processed in subdivided areas so that the size of the intermediate image buffer can be reduced. These smaller areas can correspond to 160×160 pixel areas in the output image. If desired, the intermediate buffer size can be further reduced, by a factor of five, for example, to correspond to areas in the output image of 32×32 pixels, which reduces the size of the intermediate buffer to the level where the entire warp transform, including the buffer memory, can easily be implemented in hardware on a single integrated circuit. This greatly reduces the cost of the hardware implementation of the image warping scheme.

The image sub-areas that correspond to the 32×32 pixel output image areas are called patches. Intermediate memory corresponding to the 32×32 pixel patch is called the x patch cache since it contains the output of the x-axis transformation. Because the output of the y transform pass must be written in column order, a second buffer, called the y patch cache, is used for writing out the fully transformed sub-area.

The contents of the y patch cache are then transposed in reading the y patch cache and writing in row order into an image buffer built from DRAM memory using static-column mode.

The second warp pass (y-pass) can proceed as soon as the x patch cache has been filled with transformed (x-pass) data. Image processing latency is therefore reduced from a frame time to the period of time it takes to process one 32×32 output area. This time period is much less than the video blanking time that separates video frames, which is the usual latency period that is experienced if a full-frame intermediate buffer is used. Thus, patch-wise processing can effectively eliminate latency due to intermediate buffering of real-time video.

In order to provide continuous processing of image data, it is desirable to construct the patch caches as double-buffers. Two intermediate image buffers are provided in the x-cache, so that as the x-warp fills one buffer, the y-warp can process data from the second buffer. When the input buffer is full and the output buffer is empty, the buffers may be swapped. It is not possible to write a single buffer in row order while reading the same buffer in column order, because complete columns are needed by the y-pass. The y patch cache is constructed as a double buffer as well. Double buffers permit the image processing hardware to operate as a pipeline. While the y-warp processes a patch, the x-warp can process the next patch. Thus, the x and y sections operate concurrently for maximum efficiency.

Figure 29:
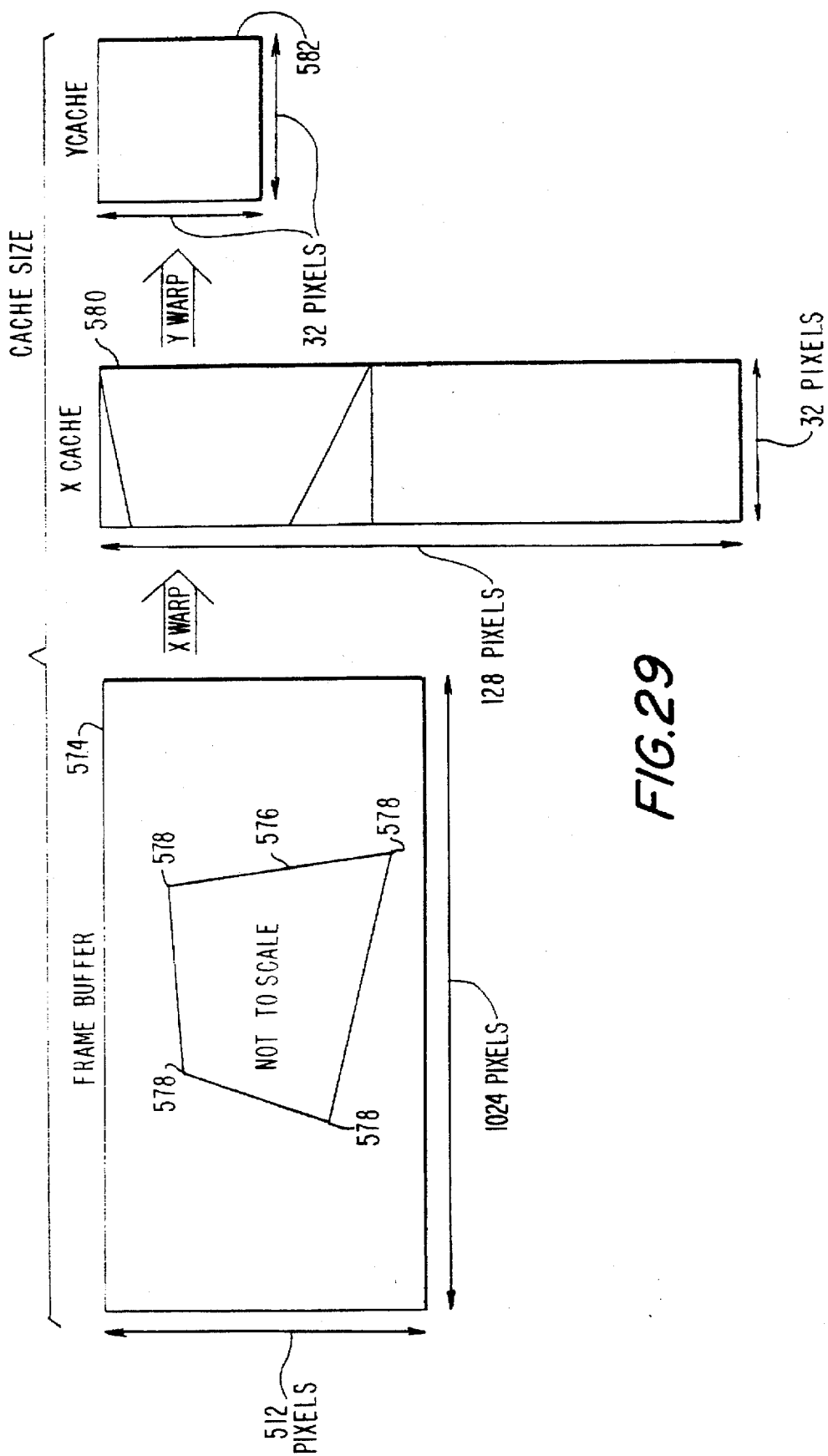
FIG. 29 is schematic representation of the process of patch-wise image warping.

The x and y patch caches are shown schematically in FIG. 29. Frame buffer 574 is shown containing buffered raw input tile image 576, with corners 578 mapping to the 32 pixel square area in the output image. The raw input tile image 576 is processed by the x warp transformation into x cache 580. X-cache 580 has an x extent of 32 pixels and a y extent of 128 pixels. The image data in x-cache 580 has been transformed along the x axis, so that it spans 32 pixels. The y axis has yet to be transformed. The x cache must contain all data required for the y transform. When performing demagnification, the required y input data will have a larger extent than the output data. Thus, the y extent of x cache 580 is preferably large enough to accommodate the data needed for a demagnification of 32/125× (125 pixels represents the height of 128 pixels minus the three neighbors for cubic interpolation). This demagnification is not needed for tile assembly, but is useful in producing reduced size, large field images of scanned data in low vision applications, or for video windowing on a personal computer. An x cache height of 48 pixels is more than adequate for tile correction purposes alone, given the height of input images supplied by sensor 410. The y warp transforms the image data into y cache 582, which is 32×32 pixels large. Double buffering is not shown in FIG. 29 to avoid over-complicating the drawing.

The coordinate generation parameters used in the patch-wise warping process are produced for each patch to be processed. The fiducial coordinates obtained from tile-interior fiducial points, which correspond to 160×160 pixel areas in the output, are used for piecewise approximation of non-linear distortion. The interior quadrilaterals are subdivided into an array of 5×5 sub-quadrilaterals by interpolation. Each of these sub-quadrilaterals generates a parameter frame used to transform one patch. The output image size of 640×480 pixels that is used to compute the parameters is changed to 32×32 pixels when generating patch parameter frames. The division operations used, for example, in finding scale factors, can therefore be replaced by simple binary shift operations. The binary power output patch size simplifies the loop counters and output address generators that are used. The small patch size also reduces the required level of precision that must be maintained for the repetitive addition of the INVERSE_SCALE factors and DELTA factors during coordinate generation.

The degree of warping that is needed to correct the patches for angle-of-view distortion is determined by imaging the fiducial pattern of spots (FIGS. 25 and 27). In order to implement this design, it is necessary to have an accurate method for extracting spot coordinates from tile images captured with a fiducial calibration pattern positioned in object plane 25. As a first analysis step, the gray-scale tile image can be binarized by comparison to a fixed threshold value. The resulting binary (black/white) image represents spots as logical ones and background areas as logical zeros. The binary image is then analyzed using the technique of clustering or boxing. A suitable clustering method involves run-length encoding the binary tile image by finding the first and last pixels of contiguous runs of ones along scanlines in the image data. Vertically overlapping runs are then grouped together into clusters. A rectangle is found which encloses all of the vertically contiguous runs in each cluster. The cluster coordinates are then filtered to eliminate the effects of dust or creases in the original fiducial sheet.

One filtering strategy is to eliminate all clusters that fall outside the expected range of spot size and aspect ratio. An additional filtering strategy is to enclose the fiducial spots using a rectangle on the pattern. Only clusters found properly nested in these larger rectangles will then be identified as fiducial spots.

A second image analysis step involves using the box coordinates found by clustering and filtering to analyze the original gray-scale tile image to obtain spot center coordinates with fractional precision. For each cluster, the coordinates enclosing a spot are enlarged by one, so that the low intensity pixels located at spot edges are included. These pixels may have been rejected by the binarizing threshold used in clustering. Two accumulators, x_accum, y_accum, are initialized to zero. Then, for each pixel p[x,y] enclosed by the enlarged cluster ((x1,y1),(x2,y2)), the values of x_accum and y_accum are calculated as follows:

$$x\_accum = x\_accum + (255 - p[x,y])$$

$$y\_accum = y\_accum + (255 - p[x,y])$$

After all pixels in the cluster are processed, each accumulator holds the sum of intensity-weighted ordinate values for pixels in the fiducial spot. The subtraction is used to invert the 8-bit gray-scale value of the black spot to provide weighting proportional to blackness. The values of x_center and y_center are then calculated as follows:

$$x\_center = x\_accum/(x2-x1)*(y2-y1)$$

$$y\_center = y\_accum/(x2-x1)*(y2-y1)$$

The center values thus found are the average intensity-weighted ordinates for the spot. This is the "moment of intensity," or "centroid" of the spot. This technique is effective in achieving sub-pixel position determination since image sensors such as sensor 410 have extremely regular and stable pixel locations, and because image noise is low in this system.

A third analysis step involves combining the spot center coordinates found for multiple (e.g. 20) calibration runs. A set of complete calibration data are obtained for each of the image tiles 420, by stepping the optical deflector and capturing and analyzing the fiducial images. The mean spot locations for each image tile 420 and the standard deviation of the spot locations for each image tile 420 are then found. With this technique, the effects of system noise and deflector position non-repeatability are reduced. The standard deviation data is available as a diagnostic indicator. A standard deviation greater than approximately ±⅓ pixel may indicates that the deflector positioning system is not operating properly.

Figure 30:
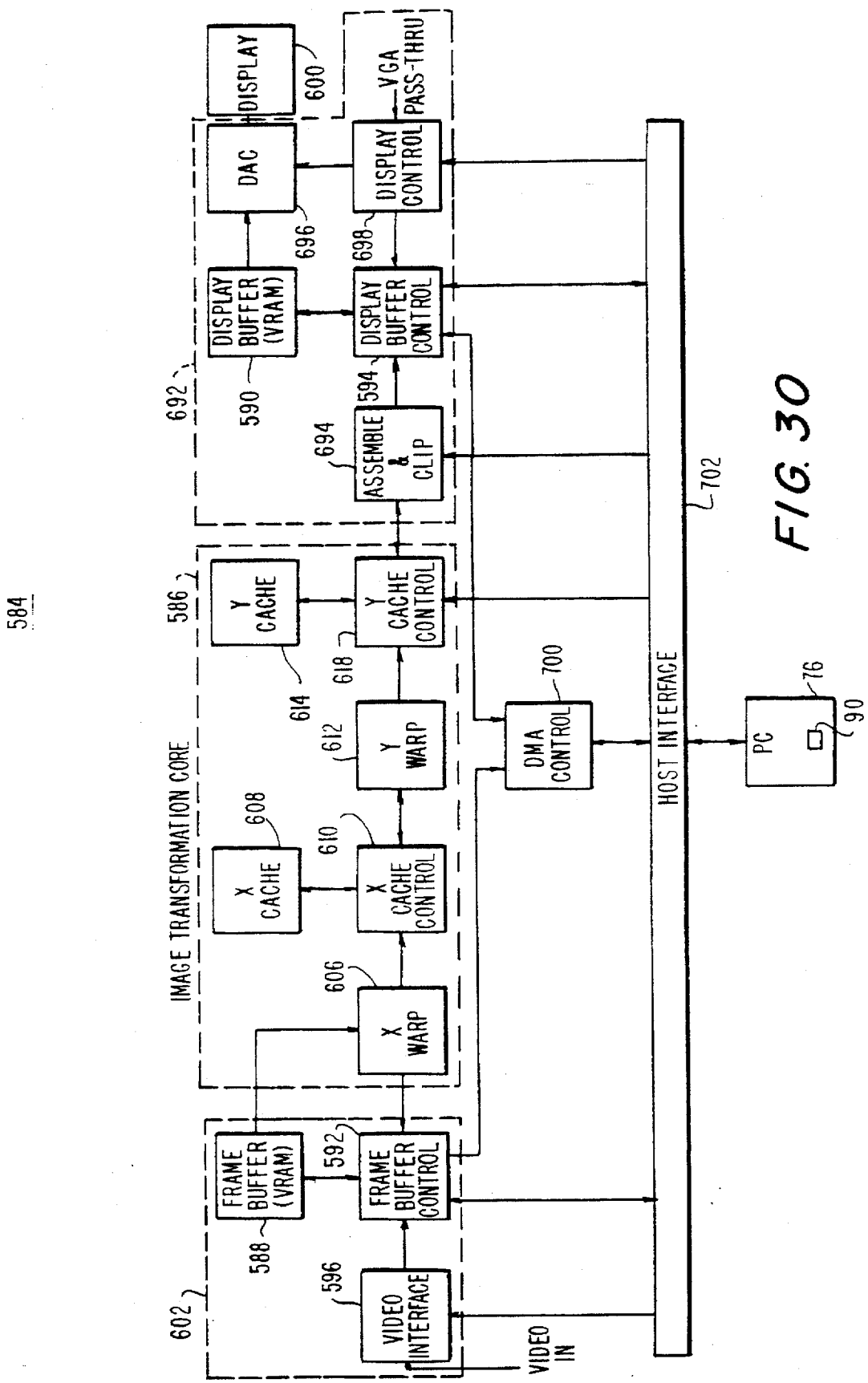
FIG. 30 is a schematic block diagram of an illustrative hardware implementation of an image processor constructed in accordance with the present invention.

Although image tiles 420 can be warped and stitched together using personal computer 76 (FIGS. 1 and 7), a dedicated hardware implementation is also possible. A block diagram of dedicated image processing circuitry is shown in FIG. 30. Image processor 584 may be implemented in the form of an adapter card for a personal computer such as personal computer 76. Image transformation core 586 provides functions used for the geometric transformation of images, such as the coordinate generation, resampling, and patch buffering operations described above. Transformation core 586 may preferably be implemented as a single chip. The remaining circuitry of image processor 584 that is shown in FIG. 30 implements functions such as video capture, image display and image transfer functions, preferably for use with personal computer 76. Image processor 584 preferably contains frame and display buffers 588 and 590, frame buffer controller 592, and display buffer controller 594, as well as various logic interface components for controlling the transfer of images between personal computer 76 and memories 588 and 590 and for general control via dedicated registers. Image processor 584 has four fundamental modes of operation.

Image Processor Modes

In a first mode image processor 584 provides image capturing with transformation and download, which allows the user to scan an image. A video frame containing a tile image 420 is captured in the input frame buffer 588. Parameter frames controlling the transform are placed into a control store region of the frame buffer 588 by personal computer 76 (FIGS. 1 and 7). Additional registers are used to specify the operations of large angle (90 degree step) rotation and mirroring, and to specify the destination address of the tile. The transformation pipeline is then started by personal computer 76. The resulting geometrically corrected tile is transferred to memory 90 of personal computer 76. In this manner, 32 of image tiles 420 are processed and assembled to form the final image.

In a second mode of operation, image processor 584 provides real-time video display with a transformation capability. Video frames are converted to a non-interlaced format and continuously transformed into display buffer 590 at 60 frames/second. The transformation is used to scale the image to implement the hybrid zoom arrangement. The transform is also used to convert the video to a square-pixel format. Display buffer 590 is used to refresh the display of display monitor 600.

A third operating mode for image processor 584 allows image uploading, transformation, and display. The third mode allows scanned images to be displayed on display monitor 600. Image areas are transferred from memory 90 in personal computer 76 to frame buffer 588 for processing. The image transform is then used to provide a wide range electronic zoom. Since the scanned image is much larger than can be displayed, decimation (demagnification) as well as interpolation is useful. Because the image transform operates on gray-scale images, a higher image quality is obtained than would be possible using binary image processing techniques. Display buffer 590 can be updated incrementally and in small regions to produce continuously panning or scrolling images for low-vision reading. An additional function—clipping—is provided by image processor 584 under register control, so that display buffer updates need not be limited to patch-sized increments.

A fourth mode for image processor 584 provides image uploading, transformation, and downloading. This mode is useful for general image scaling and de-skewing. For example, the scanned image of a text document can be analyzed by executing software routines to determine the straightness of text lines. The scanned image can then be reloaded in sections into frame buffer 588 and the image transform used to provide a very high quality small angle rotation, as controlled by appropriate parameter frames. The entire image is thus processed piece-wise. High quality scaling effects are obtained by transforming gray-scale images, and then thresholding the images. This effect is illustrated in FIG. 31. The scale factors used in this figure were chosen at intervals falling on the power series 1.25 to the x power, and range from 7.45× (text 596, at upper left) to 0.512× (text 598, at lower right). As shown in FIG. 31, text, such as text 596, has extremely smooth character contours.

Other modes of operation of image processor 584 (FIG. 30) are also possible. For example, video frames may be captured and downloaded without transformation, or uploaded and displayed without transformation. It should also be understood that the source of video signals for the image processor need not be sensor 410. Any video source may be used, permitting capture, transformation, and display of images from video tape, for example. The transformation can include any operation which can be specified as a series of four corner mappings, mirroring, large angle rotation, transposition, and clipping. For example, video special effects such as warps, continuous smooth rotations, scaling, mirroring, and combinations of these effects, are obtained in real time by updating the parameter frames and register setting of image processor 548 using personal computer 76.

Preferably, in the first operating mode a 32-tile scanning operation is completed in under four seconds. The deflection mechanism preferably has a settling time of 33.3 ms (the period of one frame). During motion of mirrors 402 and 404 (FIG. 9), the integration mode of sensor 410 is preferably disabled to prevent blurring due to image lag effects within a field. After the mirrors 402 and 404 come to rest the charge on sensor 410 is integrated for approximately 33.3 ms. Preferably the frame may be read out of sensor 410 within 33.3 ms, including analog-to-digital (A/D) conversion, and frame buffering. Image warping of image tile 420 for geometric correction may then take place during movement of mirrors 402 and 404 to the next image tile 420. Preferably, the image transform is performed in less than 33.3 ms. The time necessary to integrate the image signals with sensor 410 is approximately 33.3 ms and the time necessary to clock out the acquired image data is approximately 33.3 ms. Thus, a total time of 3.23 seconds is required to scan 32 tiles. For color imaging, the amount of information to be processed may be equivalent to two frames, so that each equivalent tile frame may be processed in less than 16.67 ms.

In the second mode of operation for image processor 584, a non-interlaced display is preferably generated on a computer-type video graphics array (VGA) square-pixel monitor at 60 frames per second. As this rate, the frame processing time must be less than 16.67 ms. For color imaging, the frame rate may be halved, to 30 frames per second, or the transform rate may be doubled to 8.33 ms. The pipeline of transformation core 586 is designed to produce one output pixel per system clock. During interpolation, the output rate will dominate. During decimation, the rate at which pixels can be fetched from frame buffer 588 may dominate instead. Nevertheless, decimation for real-time display is employed for reducing image area on the screen when windowing, so that fewer output pixels need to be generated. The output-limited model therefore provides a useful first approximation of the preferred clock rates. Preferably display monitor 600 is a VGA display having an area of 640×480 and 307,200 pixels, which must be updated each 16.67 ms for monochrome display with a 60 Hz refresh rate. Pixels must therefore be produced at a rate of one pixel each 54 ns, or 18.5 MHz.

If the overhead associated with patch-to-patch pipelining and the fetching of parameter frames are considered, a minimum system rate of 25 MHz is required for monochrome display at a 60 Hz refresh rate. For color, 50 MHz is required, unless the frame rate is lowered.

Video Input Section

Image processor 584 (FIG. 30) contains video input section 602, which contains video interface 596, frame buffer 588, and frame buffer controller 592. Video interface 596 performs image digitization with an A/D converter, line, field, and frame synchronization, clock generation for signal sampling by the A/D converter, color subcarrier regeneration, and color decoding. All of these functions can be provided by a single large scale integration (LSI) decoder chip, such as part No. Bt812 available from Brooktree Corporation of San Diego, Calif.

It is important to note the sampling rate of the A/D converter of video interface 596 need not be identical to the clock rate used to shift pixels out of the image sensor 410. It is only required that a stable orthogonal sampling grid be maintained. This may be accomplished using the technique of line-locking. The video signal from image sensor 410 is low-pass filtered before digitization, as required to prevent aliasing during digitization. Thus, a continuous signal is presented to the A/D converter of video interface 596, which may be digitized at a rate determined by system considerations. Preferably sensor 410 has a clock rate of 14.31818 MHz. The video may be digitized at an identical rate, producing image scanlines of 768 pixels. The standard set forth in Recommendation 601 of the International Radio Consultative Committee of the International Telecommunications Union of Geneva, Switzerland for digital video employs a digitization rate of 13.500 MHz, producing image lines of 724 pixels after digitization with the preferred sensor 410. A rate of 12.272726 MHz may also be used to produce image scanlines of 640 pixels. In this case, conversion to square pixels is performed by resampling in the analog domain. The ability to adjust the sampling rate, and thus the acquired resolution of image scanlines, has significance in the design of frame buffers.

Video interface 596 preferably provides digitized video in a variety of formats. Monochrome operation is automatically detected by the chip, with image data output at a preferred 8 bits/pixel. Color video may be output in red-green-blue (RGB) format for computer compatibility, although this is generally not an efficient use of storage since the color bandwidth of video signals is limited. Alternately, color data may be output in time multiplexed YCrCb formats (luminance plus red and blue color difference signals). The 4:2:2 format specified in CCIR 601 is a preferred YCrCb format. In 4:2:2, the luminance signal is digitized at full bandwidth, while each color difference signal is digitized at ½ bandwidth. Another format may be derived from the imaging characteristics of color charge-coupled device (CCD) sensors, such as part No. ICX058AK, available from Sony Corporation of Tokyo, Japan. The ICX058AK sensor is identical to the monochrome ICX058AL previously mentioned, except that extra processing steps produce a color mosaic filter on the top surface of the chip. The mosaic filter is used to produce the color difference signals Cr and Cb on alternate image lines. When encoding this information on an NTSC standard chroma subcarrier, the missing color component is provided from a CCD delay line, so both components are available simultaneously for encoding. Thus, no information is lost by providing a variant of 4:2:2 coding where the color difference components are supplied at half the spatial frequency of luminance in both horizontal and vertical dimensions. This "4:2:2 ½" coding reduces bandwidth and memory requirements by dropping the duplicated alternate lines of color difference information produced by color matrix CCD cameras.

The organization of memory 604 of frame buffer 588 that is used to store images in the three image formats described above. Frame buffer 588 preferably outputs patch-wise pixel streams for processing by transformation core 586. In order to provide the required bandwidth, video random-access memory (VRAM) memories are preferably used. These memories are dual-ported: conventional dynamic random-access memory (DRAM) access is provided on one port, while pixels lying along image scanlines may be clocked out of a second "shifter" port at high speed and without access contention. In order to eliminate transformation core pipeline delays when making the transition between scanlines in patches, two memory banks and thus two shifter busses are provided. The shifter busses correspond to alternate lines (and thus video fields) in frame buffer 588 and are connected to the input of transformation core 586. Each shifter bus is 16 bits wide to provide the required bandwidth, and to provide a shifter width of 1024 pixels. The two memory banks are labeled BANK A and Bank B in FIG. 32.

Frame buffer 588 may be constructed from four 256 k×8 VRAMs (two memories per bank), such as part No. MT42C8257, or two 256K×16 VRAMs (one memory per bank), such as part No. Micron MT42C265K16, both available from Micron Semiconductor Corporation of Boise, Id. Each bank is organized as 512 lines of 1024 8-bit pixels. Each bank has independent RAS, CAS, address, DRAM port data and serial port data lines. This arrangement allows separate address and data paths into the two banks, as required for image storage in the color modes described below.

Figure 32:
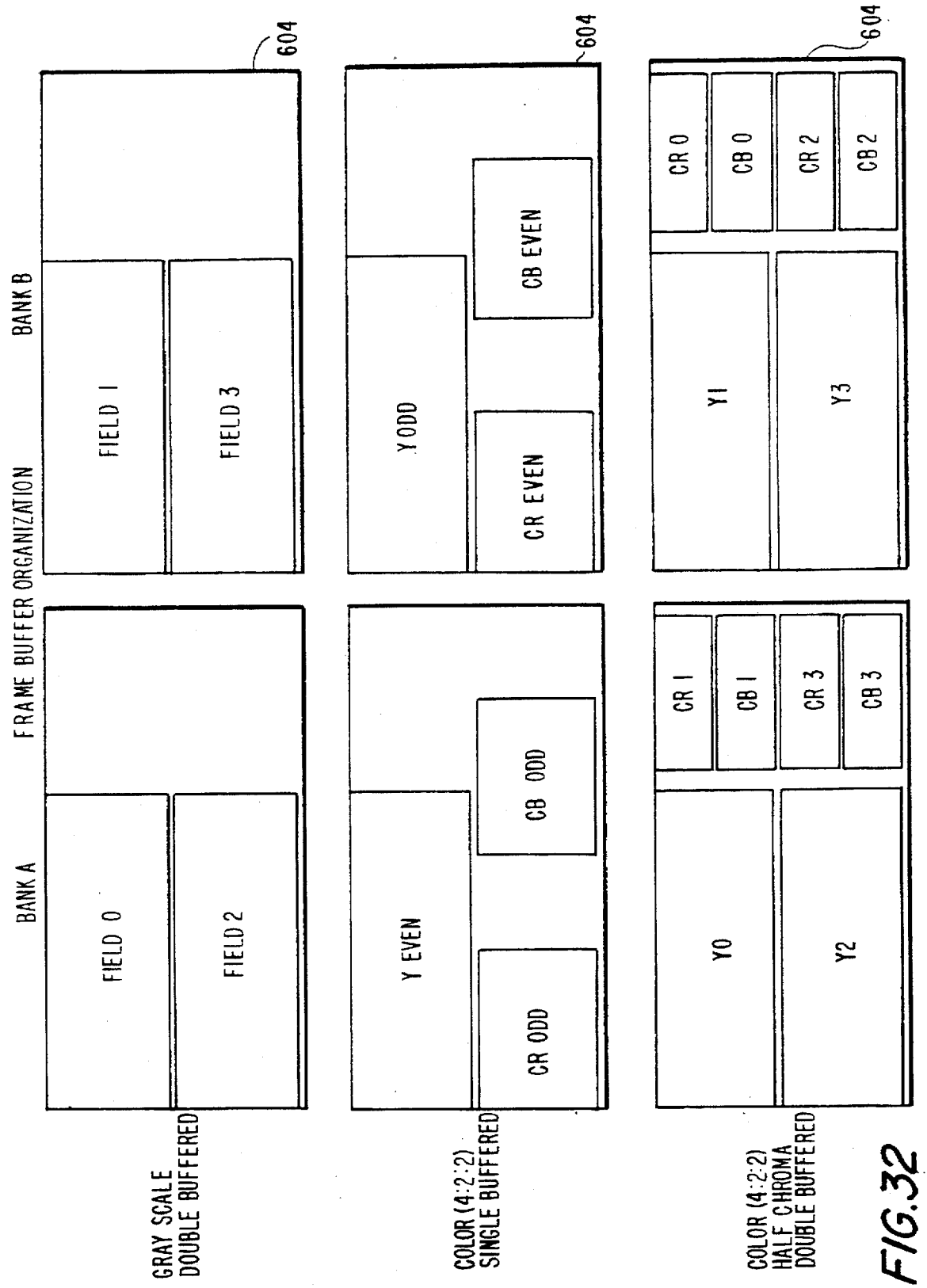
FIG. 32 is a schematic block diagram showing various frame buffer memory organization schemes.

The preferred monochrome (gray-scale) and "4:2:2½" color image formats at top and bottom of FIG. 32 are quad-buffered in the frame buffer. The buffers are updated on a circular basis with incoming video fields. This permits the two most recently completed fields of the frame to be read out on the shifter busses for non-interlaced processing, while a new field is being written. The design simplifies the interface to the transformation core, and eliminates the possibility of "rolling update" artifacts in the image during real-time video display. These artifacts would occur because transformation core 586 could outrun field update and thus cross over from new to old field data during frame processing. The preferred 4:2:2 mode at center in FIG. 32 can accommodate only one video frame, and is thus intended for use at reduced frame rates or in scanning mode.

Gray-scale video is captured, buffered, and written two pixels (16 bits) at a time. Even fields are written into BANK A and odd fields into BANK B as depicted at the top of FIG. 32. Thus, only 1 bank is written at a time.

The 4:2:2 format contains luminance and color difference data in the multiplexed format Y:Cr:Y:Cb. In the two preferred color storage modes, the color components must de-multiplexed and stored in separate buffer areas as contiguous images for processing by transformation core 586.

In the full 4:2:2 storage format shown in the center of FIG. 32, image data is written to both banks in each storage cycle. This 32 bit memory write scheme provides the doubled bandwidth that is needed, and permits storage as three contiguous image components. On an even field, the Y component for two pixels (16 bits) is written to BANK A and the Cr component of two pixels (16 bits) is written to BANK B. This is followed by another 32 bit write of two Y components written to BANK A and two Cb components written to BANK B. For an odd field the process is repeated with the banks switched.

The "4:2:2 ½" color format shown at the bottom of FIG. 32 discards alternate color difference components on alternate lines of each field. Thus, in each odd or even field only Cr is stored on even lines in the field, and Cb stored on odd lines. This requires alternating 16 bit and 32 bit writes. On even lines two Y components are written, then two Y plus two Cb components. On odd lines two Y components are written, then two Y plus two Cr components.

Sufficient image storage is provided in the monochrome and full 4:2:2 modes to buffer 768 pixels per scanline, as produced by A/D clock rates of 14.31818 MHz. For the "4:2:2 ½" mode, there is enough storage to support scanlines of 640 pixels produced by sampling at a rate of 12.272726 MHz. This format is designed specifically to economically support color mosaic CCDs at full frame rates. Since the luminance component is obtained from these CCDs by combining adjacent pixels using a low-pass filter, the lower sample rates are acceptable.

For the two color formats, the transformation core makes three passes through the frame buffer to produce a complete frame. In the "4:2:2 ½" mode, the three passes may be performed in 16.67 ms at system clock rates of 40 MHz. The color components are present in the buffers as odd and even fields, which permits alternate lines to be accessed on alternate VRAM shifter busses, as required by the transformation core design. RGB color (24 bit) scanning may be implemented in this design by treating each of the colors as gray-scale video, and digitizing and processing the video in three separate passes.

The frame buffer memory is also used as a "control store" to hold linked lists of parameter frames specifying warp operations to transformation core 586. The different layouts for memory 604 of frame buffer 588 have unused areas that can be used as control store. As shown in FIG. 33, 22 bytes of storage are required for a parameter frame. For an output patch size of 32×32 pixels and output tile size of 640×480, a total of 300 patches must be processed. For the "4:2:2 ½" buffer format, the color difference components each contain an additional 75 patches. The parameter frames use coordinates normalized to the origin of each field buffer (the shaded areas in FIG. 32), so that only one list of frames is needed to process the Y component, and one list is needed for both color components. Each frame must be contiguous in memory, but the linked list of frames need not be. For example, the "4:2:2 ½" buffer arrangement has a 32 byte by 512 line gap at center. Thus, the required 375 parameter frames can be stacked in this space. The parameter frames are written into the control store by the PC's processor, which also sets a register pointing to the first frame.

The frame buffer controller 592 of FIG. 30 implements the functions of a frame grabber in conjunction with video interface 596. It does so by generating VRAM control signals and addresses, and managing data flow through the DRAM port of the VRAMs. The circuitry in this block may be implemented using a field programmable logic array (FPGA), such as part No. XC4008 available from Xilinx Corporation of San Jose, Calif. The block may also be implemented using other suitable programmable logic chips or a conventional mask-configured gate array chip.

Frame buffer controller 592 provides four fundamental functions. A first function is image data storage for incoming video data. In conjunction with the memory configurations shown in FIG. 32, frame buffer controller 592 and video interface 596 manage data flow through the DRAM port of the VRAMs. Registers are used to assemble the video data stream from the video interface 596 into 16 bit words and demultiplex the color difference components in color modes. A pair of 16 bit wide by 16 word deep first-in-first-out (FIFO) memories are used to buffer the assembled video data words. This permits VRAM shift register transfer (SRT) requests from transformation core 586 to be processed with highest priority, without data loss. The video data is stored in the VRAM of frame buffer 588 using the standard static column mode of the DRAM port. Addresses for storage of the video data are generated by row and column counters and multiplexed onto the address lines of each VRAM bank. The color modes use a pair of such counters to generate the additional addresses for storage of color difference component data. The counters are configured for the desired storage mode by register settings. The address generators are initialized and incremented using the video timing signals derived from the incoming video signal and supplied by the video interface 596, thus synchronizing capture with video timings. Address offsets are maintained and added to the storage addresses to implement circular buffering for artifact free update. VRAM timing sequences are generated using a finite state machine sequencer of conventional design, running at the system clock rate, which is twice the image digitization rate.

Frame buffer controller 592 also provides a shift register port data transfer function. Transformation core 586 accesses image data from frame buffer 588 by requesting that the frame buffer controller 592 initiate a shift register transfer (SRT) cycle in one bank of the VRAMs. The image data is then accessed by transformation core 586 by clocking the shifter port of the appropriate bank. In order to access scanline data in patch-wise fashion, frequent SRT cycles are needed. To maintain bandwidth, SRT requests are made for one VRAM bank, while image data is clocked out of the alternate bank. Thus, the dual shifter-bus interlaced field design of the frame buffers permits access by transformation core 586 to consecutive image lines of a frame on an alternating-bank basis. The SRT cycle latency is kept to an 10 clock maximum, so that scanlines may be continuously processed. The VRAM row and tap address for the SRT cycle is presented to frame buffer controller 592 multiplexed on a row/column (tap) basis. A simple handshake is provided for request and acknowledgement of transfers. The requested row and tap address is computed by transformation core 586 in buffer-normalized coordinates. Frame buffer controller 592 keeps track of rotating buffer status, and adds offsets to the requested SRT address to access the most recently completed fields of the frame. The transformation core 586 also makes SRT requests for parameter frame access, also via the VRAM shifter port. Transformation core 586 obtains an initial frame address from a PC-accessible register. Addresses of subsequent frames are obtained from the NEXT_FRAME pointer supplied as a frame parameter. The parameter frames are accessed using absolute buffer addresses, which is signaled to the frame buffer controller using a control signal in the interface. SRT requests to the frame buffer controller are processed with highest priority, with pixel stores performed as the next highest priority.

A third function provided by frame buffer controller 592 is memory refreshing. Specifically, frame buffer controller 592 provides refresh timings to the VRAMs of frame buffer 588 as the third-highest priority. Timing to initiate refresh cycles is derived from video timing. The refresh cycles are needed because frame buffer 588 is only accessed continuously in the real-time display mode.

A fourth function of frame buffer controller 592 is to provide access to a host personal computer. Access to frame buffer 588 by a host PC is used to load parameter frames, and to load or store image data. PC access cycles are processed at lowest priority through a buffered data interface. Data path multiplexing is provided to share the VRAM random-access data port with the video grab mechanism. The interface uses a PC-accessible address counter which is incremented on reads or writes. Data for the next location is pre-fetched and latched on reads, and latched on writes, providing high bandwidth for transfer of contiguous images. A control bit in a PC accessible register provides the additional function of expanding 4 bit/pixel image data to 8 bit/pixel format in the frame buffer, by duplicating the 4 bit data. This provides capability to reprocess images stored in 4 bit/pixel format to conserve memory.

Transformation Core: X Warp Circuitry

Image transformation core 586 is made up of x warp circuitry 606, x cache memory 608, x cache control circuitry 610, y warp circuitry 612, y cache memory 614, and y cache control circuitry 616, as shown in FIG. 30. This circuitry performs the input image coordinate generation, resampling, and patch buffering operations described more generally above. The transformation core is preferably implemented as a standard-cell custom integrated circuit, which permits the incorporation of the cache memories and all logic on one chip. The core may also be preferably implemented as four XC4008 FPGA chips and eight standard SRAM chips. The standard cell implementation will support system clock rates of 50 MHz, permitting color transformations to be processed at 60 frames/second. The FPGA implementation is presently limited to frequencies less than 30 MHz, so that real-time color imaging is provided at 30 frames/second, and 60 frames/second monochrome.

Transformation core 586 is preferably arranged as a nested image pipeline. Within x warp circuitry 606 and y warp circuitry 608, pixel by pixel pipelining is used to synchronize continuous parallel operations which include the generation of input coordinates, pixel fetching, interpolation kernel lookup, resampling, and patch buffering. At a higher level, the x warp circuitry 606 and y warp circuitry 608 are pipelined on a patch-wise basis, so that the x and y pass operations on patches are performed concurrently.

Figure 34:
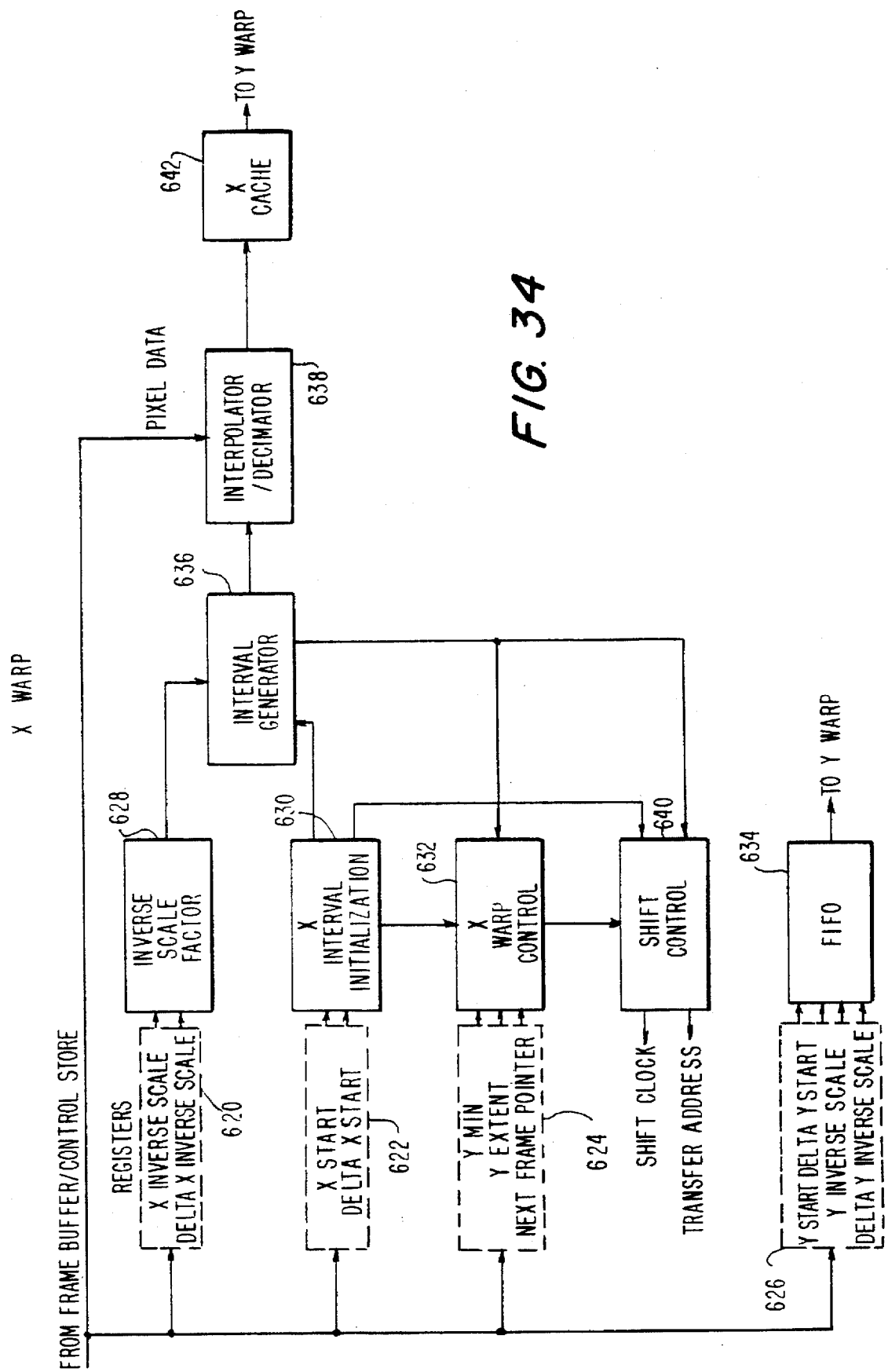
FIG. 34 is an illustrative embodiment of the x warping circuitry of the image processing circuitry of present invention.

X warp circuitry is shown in more detail in FIG. 34. Blocks 620, 622, 624, and 626 represent registers that are loaded with the warp parameters needed to transform one patch. The parameters are loaded at the start of each patch using the dual VRAM shifter access method described above. Although the registers are schematically represented by dashed blocks 620, 622, 624, and 626, they are actually implemented by initializing accumulators located in inverse scale factor circuitry 628, x interval initialization circuitry 630, x warp control circuitry 632, and FIFO circuitry 634. Inverse scale factor circuitry 628 and x interval initialization circuitry 630 are used to produce the inverse scale factor and starting input pixel x ordinate needed to begin each scanline of the patch. Interval generator circuitry 636 is initialized for each scanline with an updated scale factor and starting ordinate. Interval generator 636 then produces interpolation intervals and pixel fetch requests for all input pixels corresponding to the 32 output pixels of a scanline in the patch. The Interpolator/Decimator circuitry 638 receives interpolation intervals and pixel data and generates output pixels by convolution. The x warp control circuitry 632 maintains a count of lines processed, generates requests for parameter frames, and controls the loading of parameters into the registers. The shift control circuitry 640 generates the serial port clock for the VRAM shifters, and also forms the shift register transfer (SRT) cycle addresses for loading of the VRAM shifters. The FIFO circuitry 634 is used pipeline the frame parameters needed by the y warp circuitry by providing a one-patch delay.

Processing by x warp circuitry 606 occurs at three levels, which are roughly analogous to nested loops: patch, line, and pixel.

1) Per-Patch Operations

The x warp control circuitry shown in FIG. 34 controls per-patch operations using a combination finite state machine (FSM) sequencer and microcode sequencer. The FSM determines the phase of patch processing: frame load; scanline; end patch.

Separate microcode instructions are provided for each phase to sequence the data path multiplexers and register clock enables. The x warp circuitry 606 processes a stream of patches, as specified by the linked list of parameter frames loaded into the control store region of the frame buffer. A video-synchronous frame start signal is fed to the x warp control circuitry 632 to initiate processing. In order to begin processing any patch, x cache memory 642 must have an empty buffer available for input. The parameter frame for the first patch is fetched from the VRAMs, as follows. The x warp control circuitry 632 routes the address of the first frame from a FIRST_FRAME register (not shown) through a multiplexer into the shift control circuitry 640, and an SRT cycle is requested from the frame buffer controller 592, using the previously described handshake. At the start of subsequent patches, frames are fetched using the NEXT_FRAME_POINTER field from the previous frame stored in a register, and routed to shift control circuitry 640. For each frame, the least significant bit (LSB) of the row address is used to determine which VRAM shifter port to clock to obtain the frame data. This bit is also used to select one of the two 16 bit shifter data paths, via a multiplexer. The frame parameters are then accessed via the selected shifter port by clocking out successive 16 bit fields in the order shown in FIG. 33.

Figure 35:
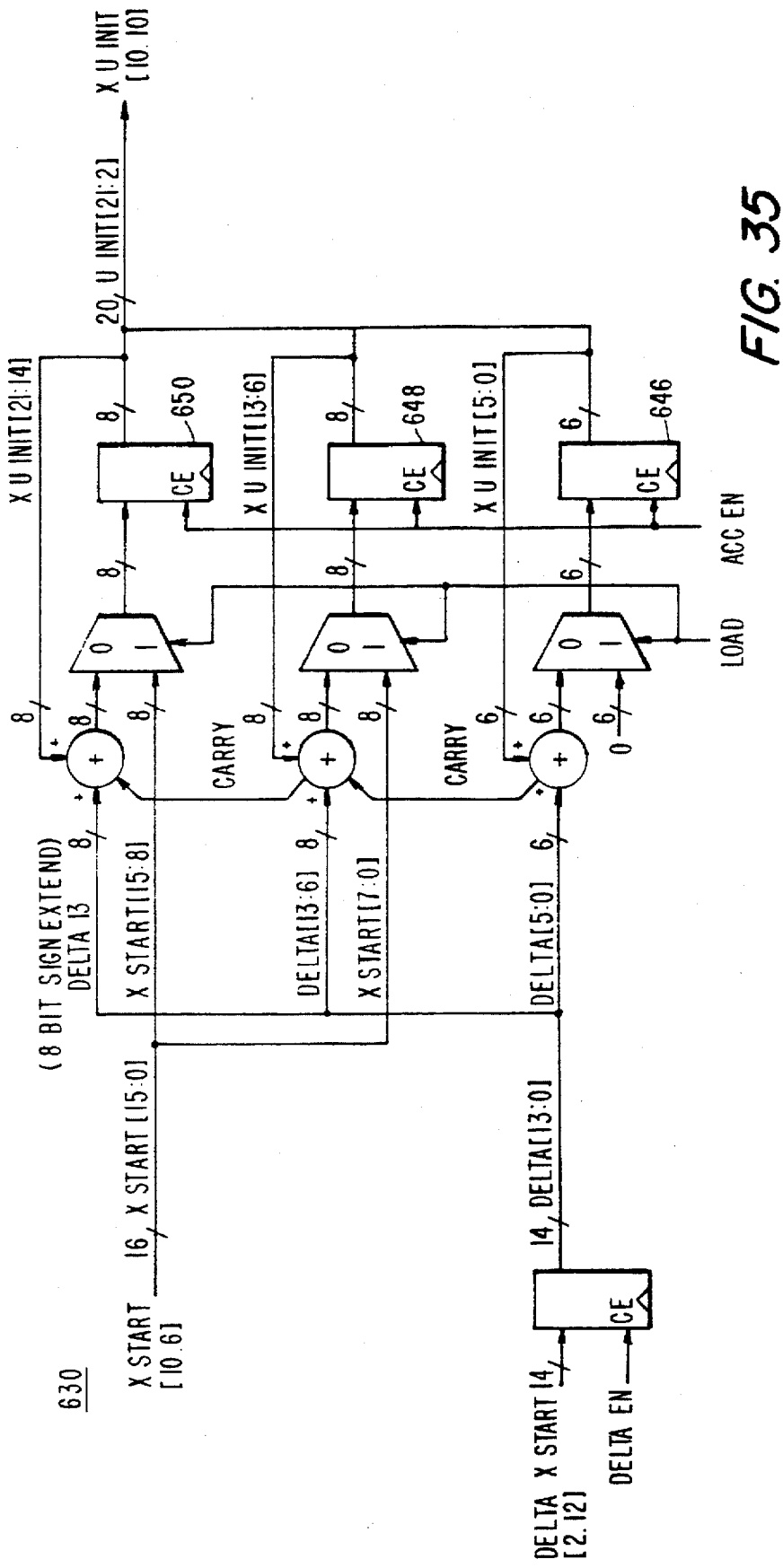
FIG. 35 is an illustrative embodiment of the x interval initialization circuitry of the image processing circuitry of the present invention.
Figure 36:
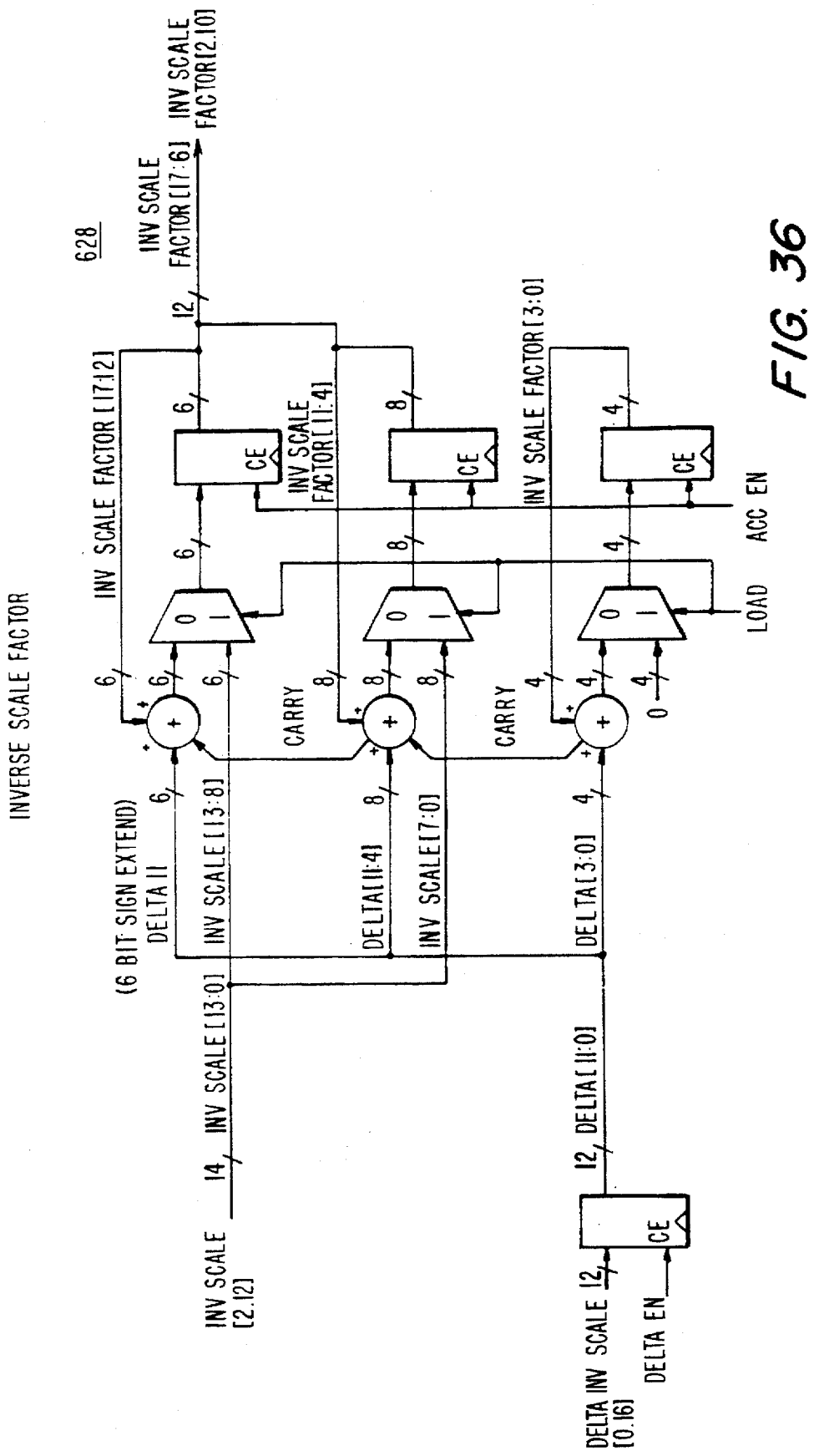
FIG. 36 is an illustrative embodiment of the inverse scale factor circuitry of the image processing circuitry of the present invention.

As shown in FIGS. 33, 34, 35, and 36 the four x-transform parameters are loaded from the VRAM shifter bus into registers. The calculation of the x-transform parameters was described in detail in above. Each parameter in FIG. 33 has a fixed point precision as shown in square brackets after the parameter name. FIG. 35 shows the interval initialization circuitry 630 (FIG. 34) in greater detail. FIG. 36 shows inverse scale factor circuitry 628 (FIG. 34) in greater detail.

The X_START parameter is first loaded. As shown in FIG. 33, X_START has a 6 bit fraction and a 10 bit integer (fixed point) precision. This parameter is aligned to initialize a U_INIT accumulator having 22 bits, shown in FIG. 35. The high 10 bits of U_INIT, are loaded with the integer part of X_START, specifying the normalized input buffer x ordinate for the first scanline of the patch. The 6 bit fraction is loaded into the next 6 bits of the accumulator. The low 6 bits of the accumulator are set to zero. These 6 bits are used for error accumulation in the repeated addition of DELTA_

X_START to U_INIT. The LOAD signal and ACC_EN (accumulator enable) signal in FIG. 35 are brought true for one clock by the x warp control microcode to route and clock the data into the U_INIT accumulator, via multiplexers in FIG. 35.

The DELTA_X_START parameter is next loaded into a DELTA register in FIG. 35 by the microcode, by bringing DELTA_EN true for one clock. DELTA_X_START has a 12 bit fraction and a two bit signed integer portion (2's complement arithmetic). DELTA_X_START is added to the contents of the U_INIT accumulator for each new scanline. The high bit of DELTA_X_START is duplicated in the addition to the 8 high bits of the U_INIT register to correctly sign-extend the 2's-complement addition.

The X_INVERSE_SCALE parameter is next loaded, as shown in FIG. 36. This parameter has a 12 bit fraction and 2 bit integer portion (FIG. 33). The parameter is loaded directly into an INV_SCALE_FACTOR accumulator, using an alignment and multiplexing scheme similar to that used for the U_INIT accumulator, above. In this case, the low 4 bits of the accumulator are used for error accumulation.

The DELTA_INVERSE_SCALE parameter is next loaded. This parameter is a 16 bit signed fraction in 2's complement notation. The parameter is loaded into a register in FIG. 36 for use in the repeated addition to the contents of the INV_SCALE_FACTOR accumulator on a line by line basis.

Referring again to FIGS. 33 and 34, four parameters are next loaded to control the y transform pass of the patch. These y parameters are directly analogous to the four x transform parameters just described. The precision of the x and y transform parameters is identical except for the X_START and Y_START parameters. In this case, X_START must specify an x ordinate in the frame buffer, which is 1024 pixels wide. Y_START specifies a y ordinate in the patch cache, where the y origin is normalized to the top-most y ordinate (Y_MIN) of the input patch area. The 6 bit integer precision is sufficient to specify the y ordinate given a DELTA_Y_START of less than 2 pixels per column for 32 columns. That is, the maximum offset of Y_START will always be less than 64 pixels from the y origin of the x cache memory. The four y parameters are loaded into 16 bit wide by 8 word deep FIFO memory 634 (FIG. 34). When x processing of a patch into the x cache memory 642 is completed, the cache buffer is made available to the y warp circuitry, which initiates processing by fetching the y parameters from this FIFO.

Two additional parameters are loaded to specify the vertical region of interest for the x warp circuitry 606. The Y_MIN parameter specifies the y ordinate of the first scanline of image data in the patch to be transformed by the x warp circuitry 606. Nine bit integer precision specifies this for the 512 line high frame buffer. The Y_EXTENT parameter equals Y_MAX−Y_MIN+1, which is the number of lines to be processed in the x warp circuitry. The x warp control circuitry 632 (FIG. 34) uses Y_MIN to load a ROW_ADDR counter, which is incremented for each new scanline and used to form the SRT address. The x warp control circuitry 632 loads Y_EXTENT into a second Y_LOOP counter which is decremented for each new scanline. When Y_LOOP=0, the end of patch condition is signaled to the x warp control circuitry 632.

Finally, the NEXT_FRAME_POINTER is fetched and stored in a register in the x warp control circuitry 632. This parameter is used to generate a parameter frame request SRT address for the next patch. A null pointer value signals that the end of a patch stream has been reached.

2) Per-Line Operations

Within each patch, the x warp control circuitry 632 executes a separate group of microcode instructions to sequence the operations required to prepare for the processing of each scanline of image data in the patch. These operations include SRT address formation, SRT cycle request, pixel pipe preload, interval initialization, and loop management.

As described in connection with frame buffer controller 592 (FIG. 30), image data is accessed from VRAM in the frame buffer 588 (FIG. 30) by running a shift register transfer (SRT) cycle in the VRAM memories. To do this, the x warp control circuitry 632 must present the row and column (tap point) address to frame buffer controller 592.

The required row address is obtained from the ROW_ADDR counter, which is initialized by the Y_MIN parameter, and incremented for each scanline processed. The column address is obtained from the 10 bit integer portion of the U_INIT registers 646, 648, and 650 of FIG. 35. This address corresponds to the lower order pixel of the two pixel neighborhood used to interpolate the first output pixel of the scanline. However, a four-pixel neighborhood is needed for use with the cubic interpolation kernel of prior discussion. Thus, the x warp control circuitry 632 includes a fixed subtract-by-one section. The integer part of U_INIT−1 thus forms the needed tap address.

The row and tap address thus formed is latched at the inputs of a multiplexer. The output of the multiplexer is routed to the frame buffer controller 592. The frame buffer controller 592 selects the row/tap as needed using a select bit on the interface. An SRT cycle is requested from the frame buffer controller using a simple handshake mechanism. An acknowledge signal on the handshake indicates that the requested scanline of image data is available from the VRAM.

Figure 37:
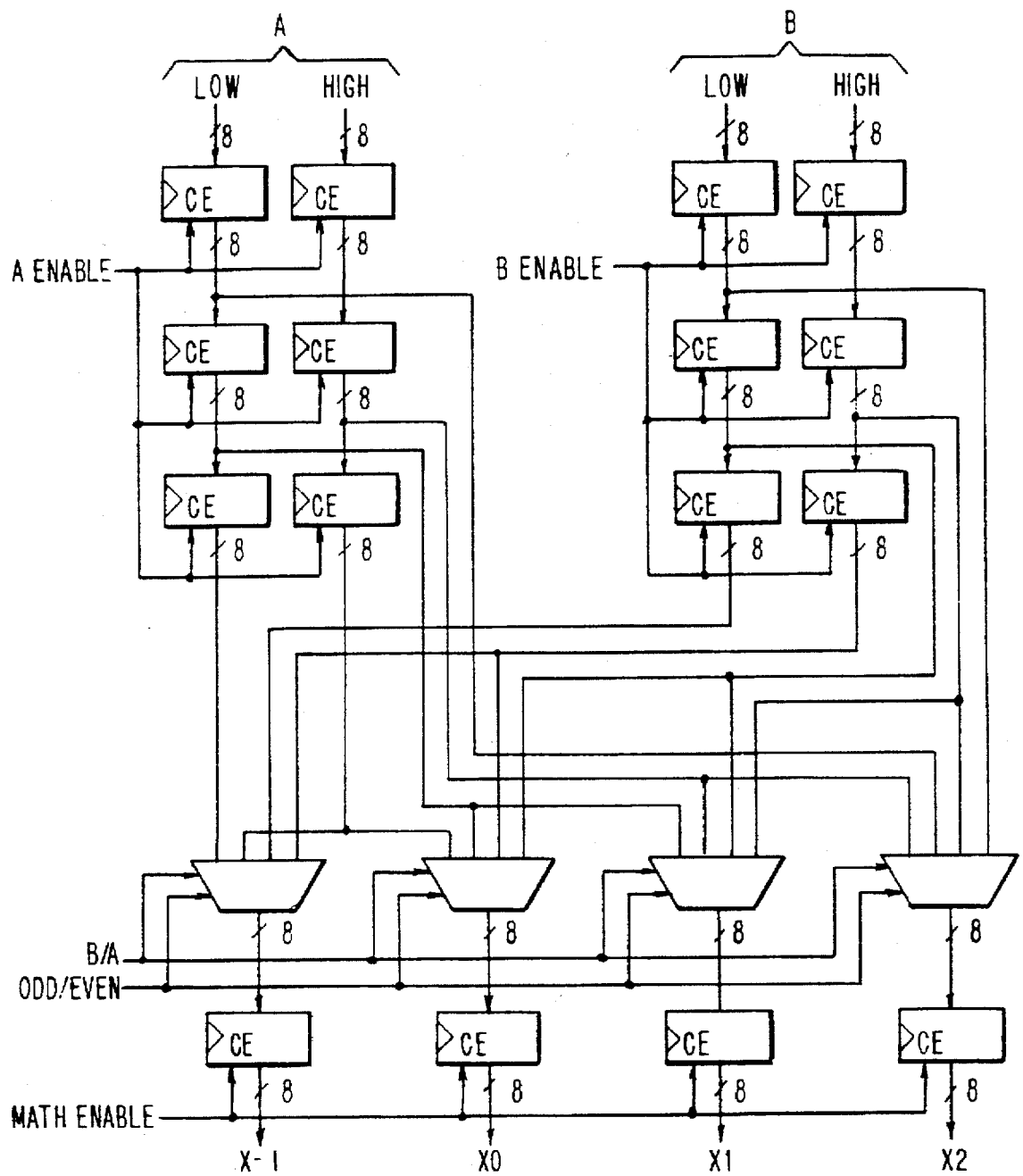
FIG. 37 is an illustrative embodiment of the dual video pixel pipe that is preferably used in the warping circuitry of the image processor of the present invention.

The preferred interpolation by cubic convolution requires that a four pixel neighborhood be available for each output pixel generated. This increases bandwidth required in the x warp circuitry 606, since neighbors must be fetched along each scanline, and because extra scanlines must be processed to provide the neighborhood needed for the y warp. To increase bandwidth, a dual pixel pipe architecture has been devised for the x warp. As shown in FIG. 37, the dual pipe consists of a stack of registers dedicated to each VRAM shifter bus. The registers are followed by multiplexers which select the pixel stream from one of the two shifter pipes (A or B), and which also provide a selectable one-byte offset within each pipe (ODD/EVEN). The dual pipe permits a preload sequence to be used to initialize the contents of one pipe with the initial neighborhood of a scanline while the previous scanline is being processed on the alternate pipe. The byte offset capability permits proper alignment of the four-pixel neighborhood given the 16-bit wide shifter paths which are dictated by performance and memory organization constraints of the VRAM frame memories.

Thus, after an SRT request has been acknowledged by the frame buffer controller 592, the x warp control circuitry 632 sequences the preload of the appropriate pixel pipe, as determined by the LSB of the row address (odd or even bank). Clocking of the VRAM shifters is actually accomplished using one of two small shift clock control FSMs in the shift control circuitry 640. The pixel pipe registers are loaded over six system clock cycles by sequencing the clock enable control lines on the registers.

Figure 38:
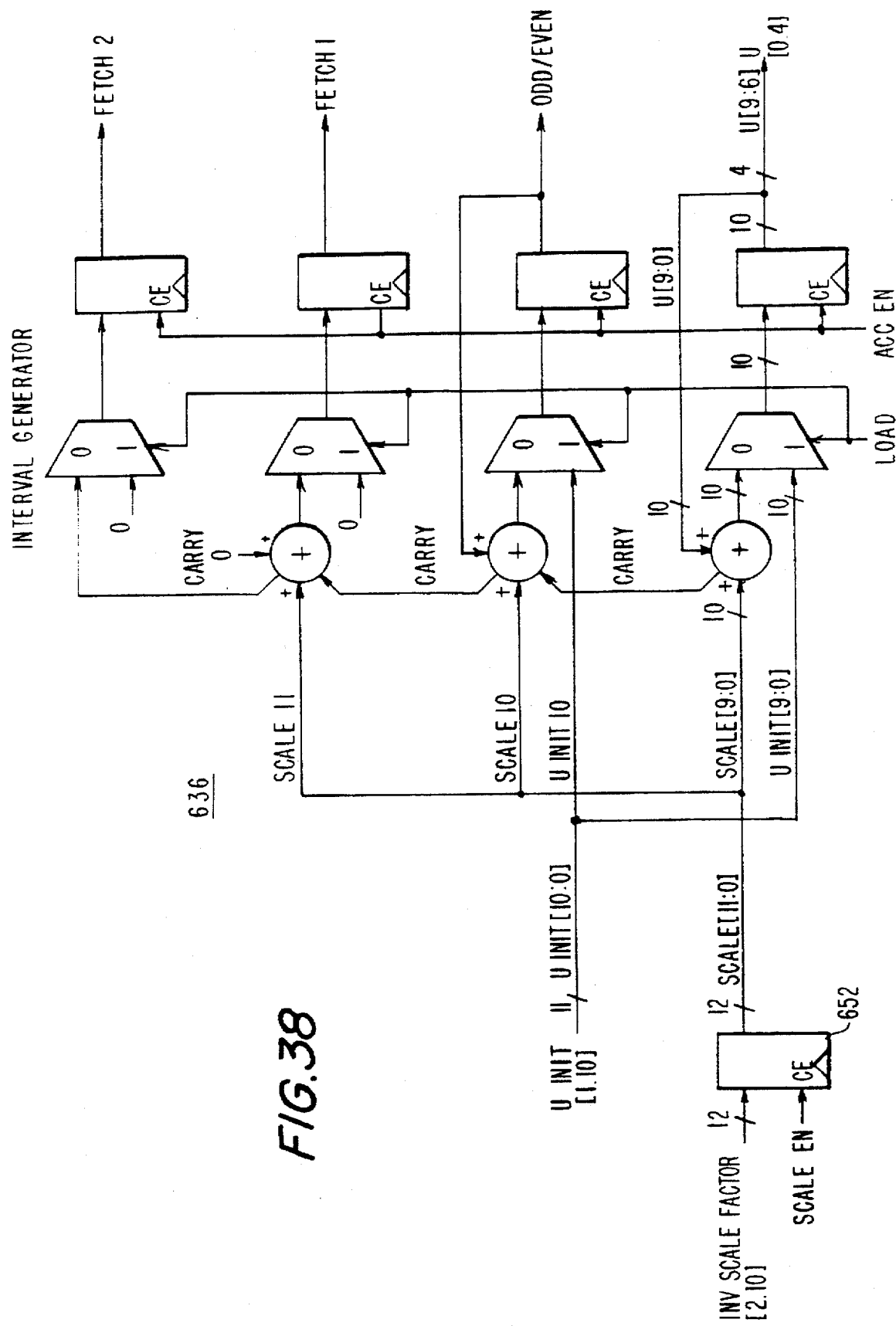
FIG. 38 is an illustrative embodiment of the interval generator circuitry that is preferably used in the warping circuitry of the image processor of the present invention.

After preload is complete (for the first line of a patch), or after the prior scanline is complete, the interval generator circuitry 636 (FIG. 34) is initialized. Interval generator circuitry 636 is shown in more detail in FIG. 38. The interval generator circuitry 636 produces the reverse mapped input ordinate, u, through the incremental addition of INVERSE_SCALE_FACTOR. Since clocking the VRAM shifter advances the integer portion of the input ordinate, the interval generator need only maintain the fractional portion of the u ordinate, plus the LSB of the integer portion. The integer LSB corresponds to the byte offset of the X0 pixel on the 16 bit-wide shifter bus. The notation "u" here refers to the reverse-mapped input pixel ordinate, while "U" refers to the hardware accumulator containing the integer LSB and the fractional part of u.

Loading of the interval generator consists of forcing the value of the U_INIT accumulator into the U accumulator shown in FIG. 35. U_INIT, from FIG. 35, contains the starting u ordinate for the scanline to be processed with 10 bit integer and 10 bit fractional precision. Since the 9 most significant bits (MSBs) of the integer part of U_INIT were used to select the tap address during the VRAM SRT cycle, only the integer LSB and fractional part are used to initialize U. Also, the value INV_SCALE_FACTOR from FIG. 36 is captured in register 652 in FIG. 38. This is an unsigned value with 2 bit integer and 10 bit fractional precision, used to advance U during the processing of pixels in the input scanline. The interval generator circuitry 636 is loaded exactly at the time when processing of the first pixel of the scanline has been initiated in the pipeline. This permits continuous processing of scanlines within a patch, without extra wait states.

After completion of a scanline, the values of the U_INIT and INV_SCALE_FACTOR accumulators are updated, the ROW_ADDR counter is incremented, and the Y_EXT counter is decremented. The U_INIT accumulator (FIG. 35) and INV_SCALE_FACTOR accumulator (FIG. 36) may be updated simultaneously using the ACC_EN clock enable lines. The update of U_INIT is performed through an add/accumulate operation with the signed value contained in the DELTA_X_START register. A total error of 6 bits will build up over an input patch of up to 64 lines. The 12 bit fractional precision of the add therefore insures that the value of U_INIT is maintained to 6 bit accuracy. The update of INV_SCALE_FACTOR is performed using an add/accumulate operation with the signed value contained in the DELTA_INV_SCALE register. The 16 bit fractional precision available provides for a 10 bit fractional accuracy over 64 lines.

3) Per-Pixel Operations

Operations performed on a per-pixel basis in the x warp circuitry 606 include: incremental update of the input pixel u ordinate; VRAM shift register clocking; pixel pipe control; interpolation of output pixels by convolution; patch cache handshake; and pixel counting.

As shown in FIG. 34, per-pixel (inner loop) operations are carried out in interval generator circuitry 636, shift control circuitry 640, and interpolator/decimator circuitry 638. The Interval Generator, detailed in FIG. 38, drives the inner loop. For each system clock, the interval generator circuitry 636 performs an add-accumulate operation with INV_SCALE_FACTOR into the U register. This advances the input pixel location, U. Of the 10 bits of fractional precision maintained, six bits are used for error accumulation over the input line. The 4 MSBs of the fractional part are used as the interpolation interval needed in resampling. The LSB of the integer part of U, ODD/EVEN is used to specify the byte offset of the X0 pixel in the pixel pipe, FIG. 37. The two MSBs of U specify the number of pixels to fetch to update the pixel pipe for the interpolation. These bits are labeled FETCH1 and FETCH2 in FIG. 38, and are the result of carries in the addition of INV_SCALE_FACTOR and U. These bits are not fed back into the U accumulator.

The FETCH1 signal indicates that one new word (2 pixels) of image data is required from the VRAM shifter to complete the neighborhood need to produce an output pixel. FETCH2 indicates that 2 words are needed (active during decimation only). These signals are fed to the shift control circuitry 640 to initiate a shifter cycle. Note that during decimation, the VRAM shifter may not keep up with the required input data rate. In this case, the shift control circuitry asserts a stall cycle which holds the interval generator circuitry 636, pixel pipe, and interpolator/decimator 638 by de-asserting clock enables on the data and pipeline registers.

The values of U and ODD/EVEN are delayed by pipeline registers (not shown) so that they arrive at the bottom of the pixel pipe coincident with the associated image data. Interpolator/decimator 638, which is shown in more detail in FIG. 39, therefore receives the pixels X-1 through X2 and the interval U properly aligned. The value of U is fed to 4 lookup tables (LUTs), which hold the binned values of the interpolation kernel. In the FIG. 39, the inner-product LUTs are 5 bits wide and outer LUTs are 4 bits wide for implementation using FPGA technology, where the complexity of 8×8 multipliers is presently prohibitive. This has the effect of limiting the selection of interpolation kernels which may be accurately sampled. For standard cell implementation, 8-bit wide LUTs and multipliers are preferred. The LUTs are implemented as RAMs in either technology, with PC processor access arranged via a register interface for writing the desired kernel.

Figure 39:
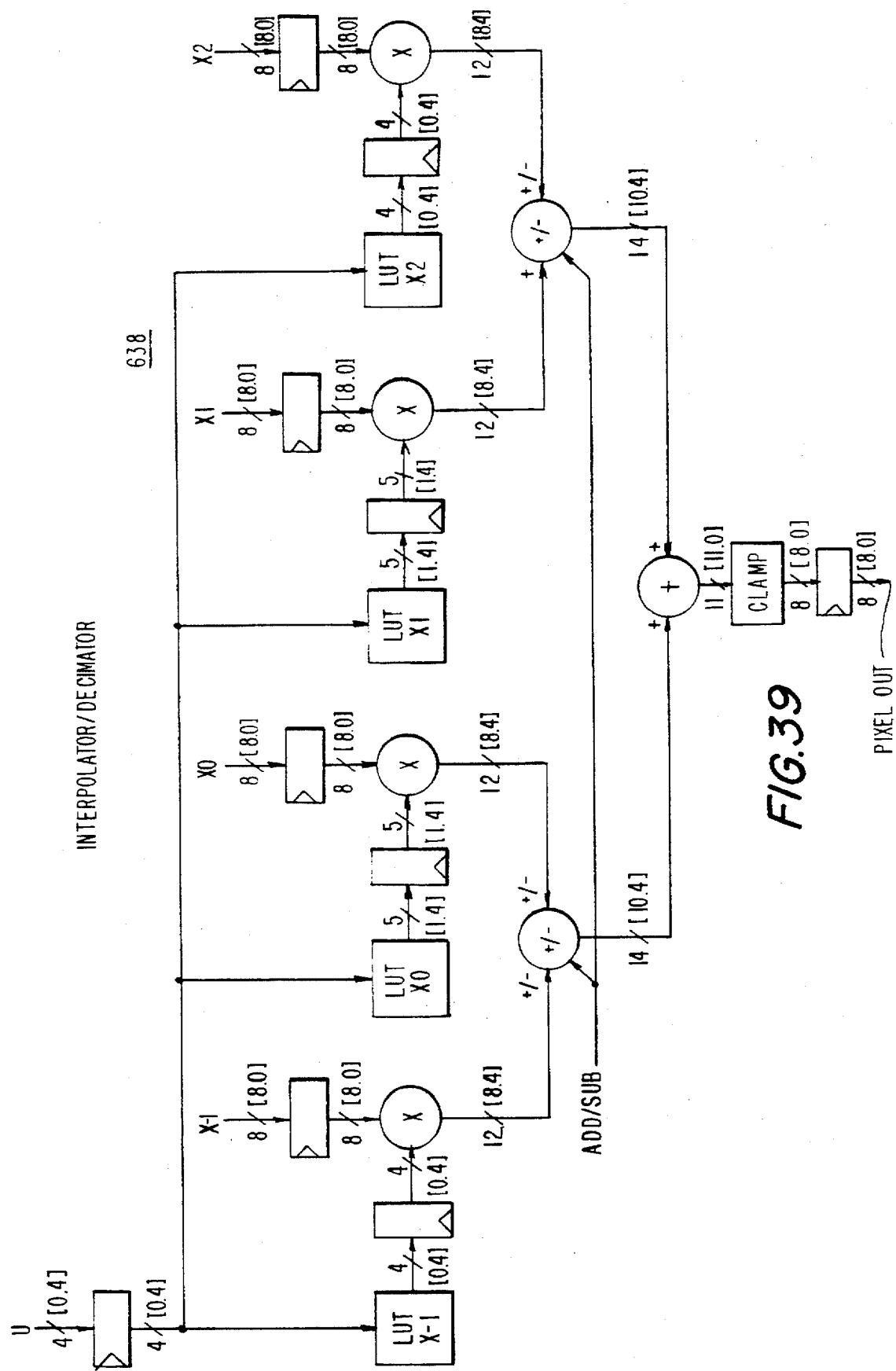
FIG. 39 is an illustrative embodiment of the interpolator/decimator circuitry that is preferably used in the warping circuitry of the present invention.

The levels of fixed point precision carried at each stage of the convolution are shown in brackets in FIG. 39. Multiplication of each pixel by the LUT outputs weights each pixel by the binned convolution factors. The weighted pixels are combined by addition or subtraction, depending on the kernel shape desired. Since the convolution may produce pixels with values which exceed 255 or are less than zero, a clamp circuit detects overflow and underflow conditions in the final sum of products, and clamps the pixel to 255 on overflow, or 0 on underflow.

At the beginning of each scanline, a counter in the x warp control circuitry 632 is initialized to the value 0. The counter is incremented by each system clock unless a stall condition is asserted. When the counter reaches 31, 32 output pixels have been produced, and an end of line signal is asserted.

Transformation Core: X Patch Cache Circuitry

Figure 40:
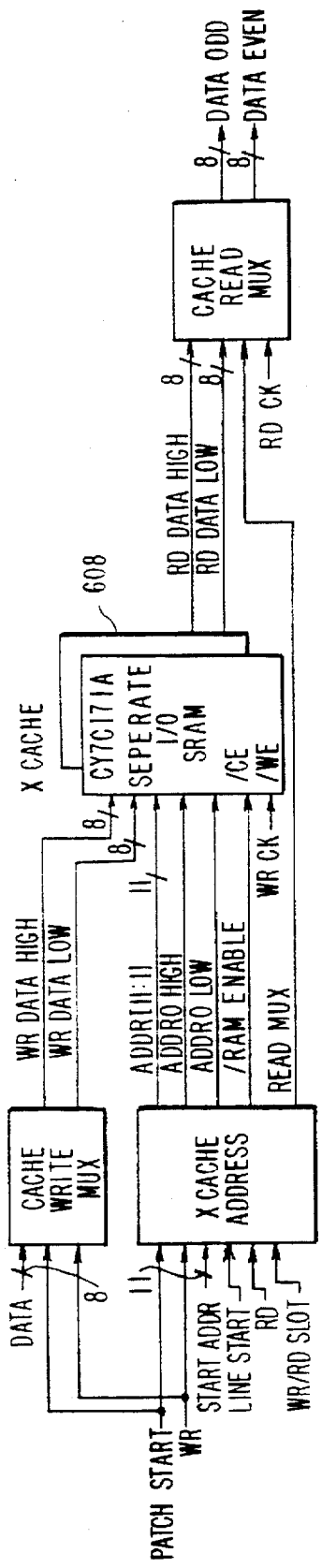
FIG. 40 is an illustrative embodiment of the x cache of the image processor circuitry of the present invention.
Figure 41:
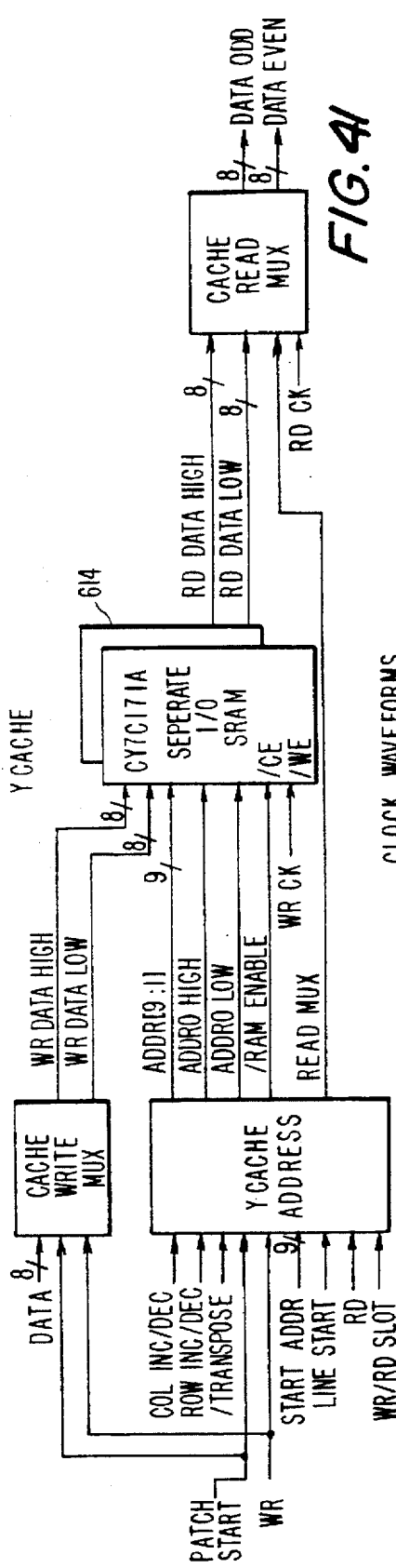
FIG. 41 is an illustrative embodiment of the y cache of the image processor circuitry of the present invention.

As shown in FIG. 30, the output of the x warp circuitry 606 is written into the x cache memory 608, via the x cache control circuitry 610. FIG. 40 is a block diagram of x cache memory 608 and x cache control circuitry 610. Y cache memory 614 and y cache control circuitry 618 is shown in FIG. 41. In the FPGA implementation, the SRAMs are preferably 4 bit wide, 4096 deep memories, such as part No. CY7C171A-15 available from Cypress Semiconductor Corporation of San Jose, Calif. These parts have separate data ports for read and write which simplifies the data paths. In a standard cell custom integrated circuit, the memories are constructed using SRAM cells, so that the transformation core and memories reside on a single chip.

Figure 42:
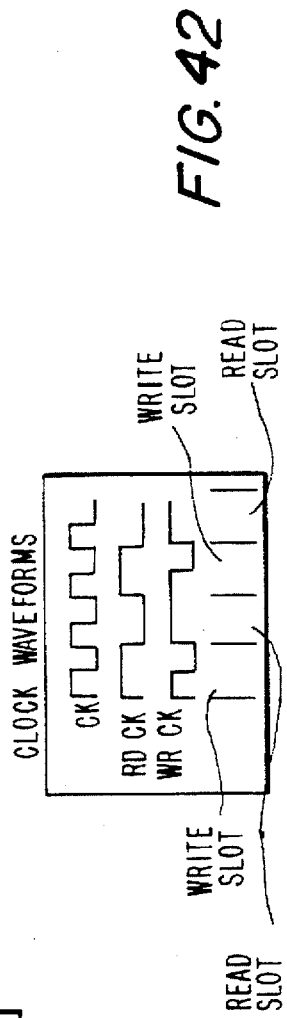
FIG. 42 is an schematic representation of some of the clock waveforms used in the image processor circuitry of the present invention.

The caches must support a pixel transfer rate equal to the system clock rate, for example, one pixel each 40 ns in a 25 MHz FPGA implementation. Using the double buffering scheme previously described, both a pixel write and a pixel read must occur without contention during a single system clock, on average. To support the required bandwidth, the cache memories are configured for 16 bit (two pixel) wide data paths. To provide access for both writes and reads, a slotted architecture is used. In this design, a RD__CK (Read Clock) signal is generated at ½ the system clock rate, or 80 ns. During each 80 ns interval, a 40 ns time slot is allotted for a 16 bit (2 pixel) write, and 40 ns slot for a 16 bit (2 pixel) read, using RD__CK to control the slots. Thus, a 40 ns per pixel average data rate is maintained for both reads and writes without access contention. The RD__CK signal and a WR__CK signal are generated synchronously with the system clock (CK) signal, shown in FIG. 42. In an FPGA implementation, this may be done using an external logic chip, such as part No. GAL16V8A-10, available from Lattice Semiconductor Corporation of Hillsboro, Oreg. WR__CK is fed directly to the SRAM !WE control pin. This scheme provides low-skew, timing signals for the SRAMs to overcome timing problems in FPGA-generated signals.

The double buffering scheme is implemented by a simple finite state machine controller. When both the read buffer is empty and the write buffer is full, the patch buffers are swapped. A simple handshake is provided to the x warp control circuitry 610 and y warp control circuitry 618, so that patch processing is stalled until a buffer is available for writing (x warp) or reading (y warp). This provides pipeline control with pipe stalls propagating either backward or forward in the patch processing chain as required.

The patch caches provide the function of electronic transposition. In the x cache circuitry, data is always written in rows and read in columns. Because the data path is 16 bits wide, reading along a column by consecutively incrementing the column address would provide two pixels lying along a row for each read. In order to provide the desired 2-pixel column access, a banded memory organization is used.

Cache memory organization is shown in FIGS. 43–46. The four SRAM memories of the cache are organized into two 8 bit (1 pixel) banks, termed LOW and HIGH, as shown in FIGS. 44 and 45, respectively. The memory is organized as a matrix of four-pixel elements, as shown in FIG. 43. Within each element, data storage locations along rows are swapped on consecutive rows. This produces the ability to correctly access consecutive pixels along both rows and columns, by using appropriate data multiplexing logic. The memory maps of FIGS. 44 and 45 show where the four-pixel matrix elements are stored in low and high memory.

Because the data path is 2 pixels wide, each matrix element must be 2 pixels wide in both row and column dimensions. Each matrix element thus contains two 2-pixel rows and two 2-pixel columns. All memory accesses are forced to occur within a single matrix element (represented by the heavy lines in FIG. 43), which forces all row or column accesses to occur on an even-byte boundary. By configuring the cache as two 8 bit/pixel memory banks (LOW and HIGH), each matrix element contains two pixel locations in each of the LOW and HIGH memory banks. By providing a separate address line (ADDR0) for each bank and conditionally swapping the pixels being written or read from the LOW and HIGH banks, row and column accesses are performed in the matrix element as follows:

ROW ACCESS – EVEN COLUMN:
    ADDR0 LOW = 0, ADDR0 HIGH = 0,
normal pixel order.
ROW ACCESS – ODD COLUMN:
    ADDR0 LOW = 1, ADDR0 HIGH = 1,
swap pixels.

-continued

COLUMN ACCESS – EVEN ROW:
    ADDR0 LOW = 0, ADDR0 HIGH = 1,
normal pixel order.
COLUMN ACCESS – ODD ROW:
    ADDR0 LOW = 1, ADDR0 HIGH = 0,
swap pixels.

The matrix element address (ADDR[4:1]) for the desired row or column access is computed by using the actual row and column indices divided by 2 and truncated respectively. That is ROW[2:0]->ROW[2:1] and COL[2:0]->COL[2:1], creating a matrix element address ADDR[4:i]=ROW[2:1], COL[2:1] which is shared by the LOW and HIGH banks. ROW0=0 for column access and COL0=0 for a row access, to insure even-byte boundaries.

Figure 47:
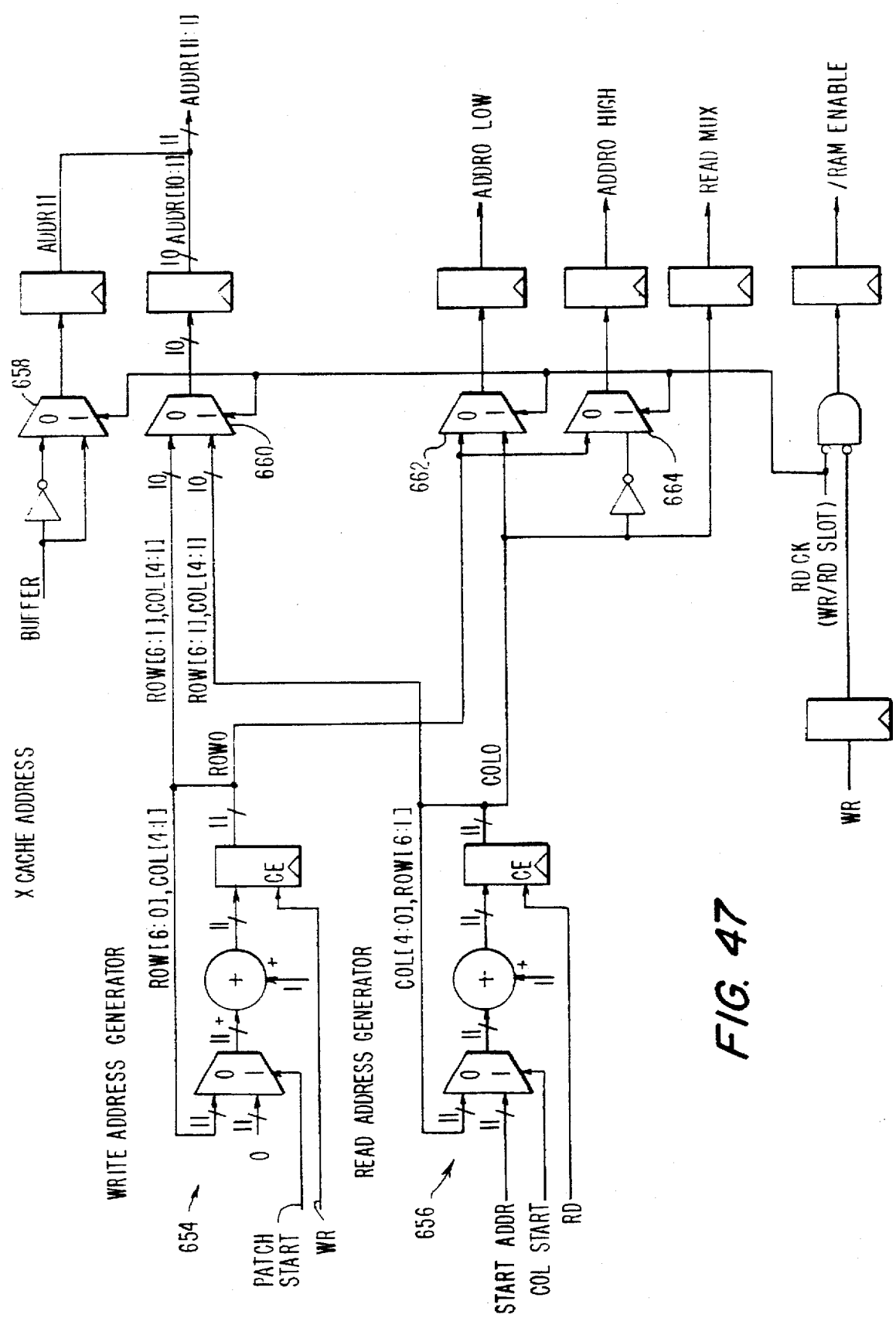
FIG. 47 is an illustrative embodiment of the x cache address circuitry of the present invention.

Cache addresses are generated and multiplexed for the x cache circuitry as shown in FIG. 47. Write address generator 654 and read address generator 656 are implemented as counters. Since the x warp circuitry 606 writes out consecutive scanlines of exactly 32 pixels, write addresses are generated using a simple counter which is initialized to zero at patch start. The counter of write address generator 654 is then permitted to wrap around from a value of 31 to a value of 0 at the end of each scanline in the patch. The write address generator 654 is incremented by the WR (write) signal provided by the x warp circuitry 606. This WR signal is pipelined and fed to the SRAM !CE pin to gate the WR__CK signal fed to the SRAM !WE pin.

Read Address Generator 656 must be set to the input image starting v ordinate for each new column, as computed by the y warp circuitry 612. Thus, a start address is furnished by the y warp circuitry 612, generated exactly like the SRT request address produced by the x warp circuitry 606 and fed to the frame buffer controller 592 (described above). The counter is loaded with the input image starting v ordinate by the COL__START signal from the y warp circuitry 612.

Address multiplexing is shown at the right of FIG. 47. Multiplexing is controlled by the RD__CK signal. RD__CK high indicates that a write slot is in progress, so that address and control information is output from the write address generator. RD__CK low selects a read address. Multiplexer 658 is fed with a BUFFER signal which controls the swapping of patches in the double buffered cache. The inversion causes alternate buffers to be used for reads and writes. Multiplexer 660 selects the main part of the address for reads and writes. Multiplexers 662 and 664 control the separate ADDR0 bits which are fed separately to each bank of the cache SRAM. This arrangement implements the fixed transposition of image data between writes and reads. The outputs of the multiplexers are registered. The cache address generator, multiplexers, and control signals are pipelined to achieve the required system clock rates.

Figure 48:
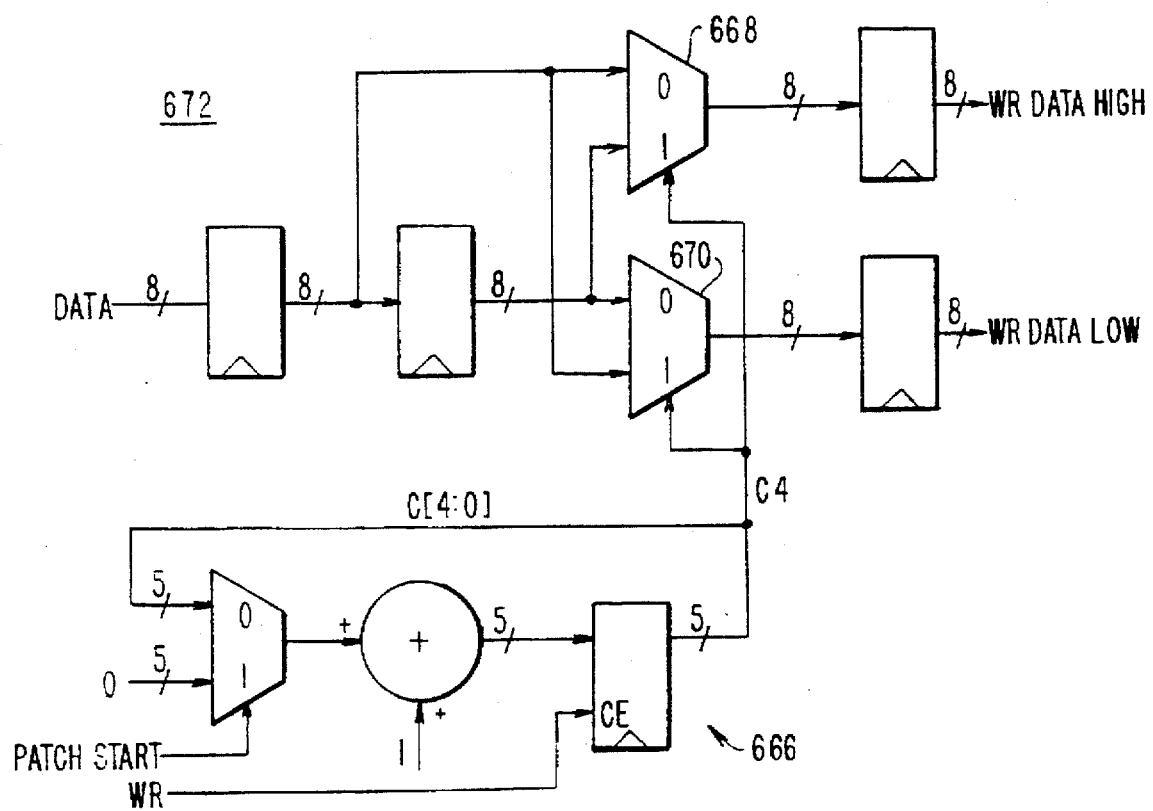
FIG. 48 is an illustrative embodiment of the cache write multiplexer circuitry of the present invention.
Figure 49:
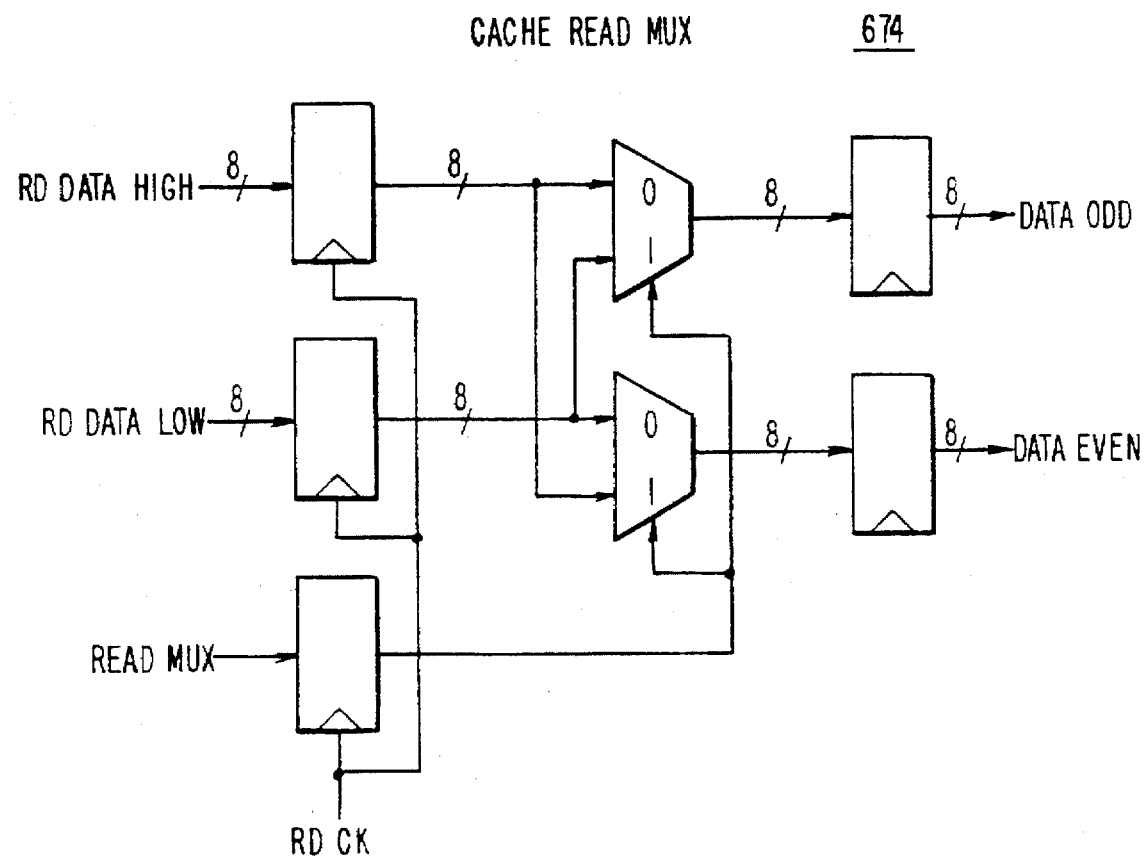
FIG. 49 is an illustrative embodiment of the cache read multiplexer circuitry of the present invention.

The data path multiplexers use to perform the byte-swapping function of the banded memory architecture are shown in FIGS. 48 and 49. As shown in FIG. 48, the cache circuitry write mux assembles 8 bit wide data from the x interpolator/decimator circuitry 638 into 16 bit words. A 5 bit counter 666, increments after each 2-pixel write into the x cache. The MSB of this counter is low for 32 pixels, and high for the next 32 pixels. Thus, an odd/even line signal, C4, is generated to control the byte-swap multiplexers 668 and 670 and the assembled 16 bit data will have bytes swapped on alternate lines. The output of the write multiplexer circuitry is registered to coincide with the pipelined addresses generated in FIG. 47. The ROW0 signal in FIG. 47 could be used in place of the C4 signal generated in FIG. 48.

In partitioning the design among multiple FPGA chips, the cache circuitry write mux 672 is located in the same FPGA chip as the interpolator function block. Generating the C4 signal from a separate counter eliminates pipeline problems caused by the delays between pins on multiple FPGA chips.

The cache circuitry read mux 674 shown in FIG. 49 provides the byte swapping function needed on column-access reads by the y warp section. Data from the output ports of the SRAMS is latched at the appropriate slot time using the RD_CK signal. Multiplexers select the proper byte order using the READ_MUX signal from FIG. 47, which is generated from the COL_0 address bit using a pipeline register. The data is latched at the multiplexer outputs, so that it is stable when sampled by the Y_warp.

Transformation Core: Y Warp and Cache Circuitry

Figure 50:
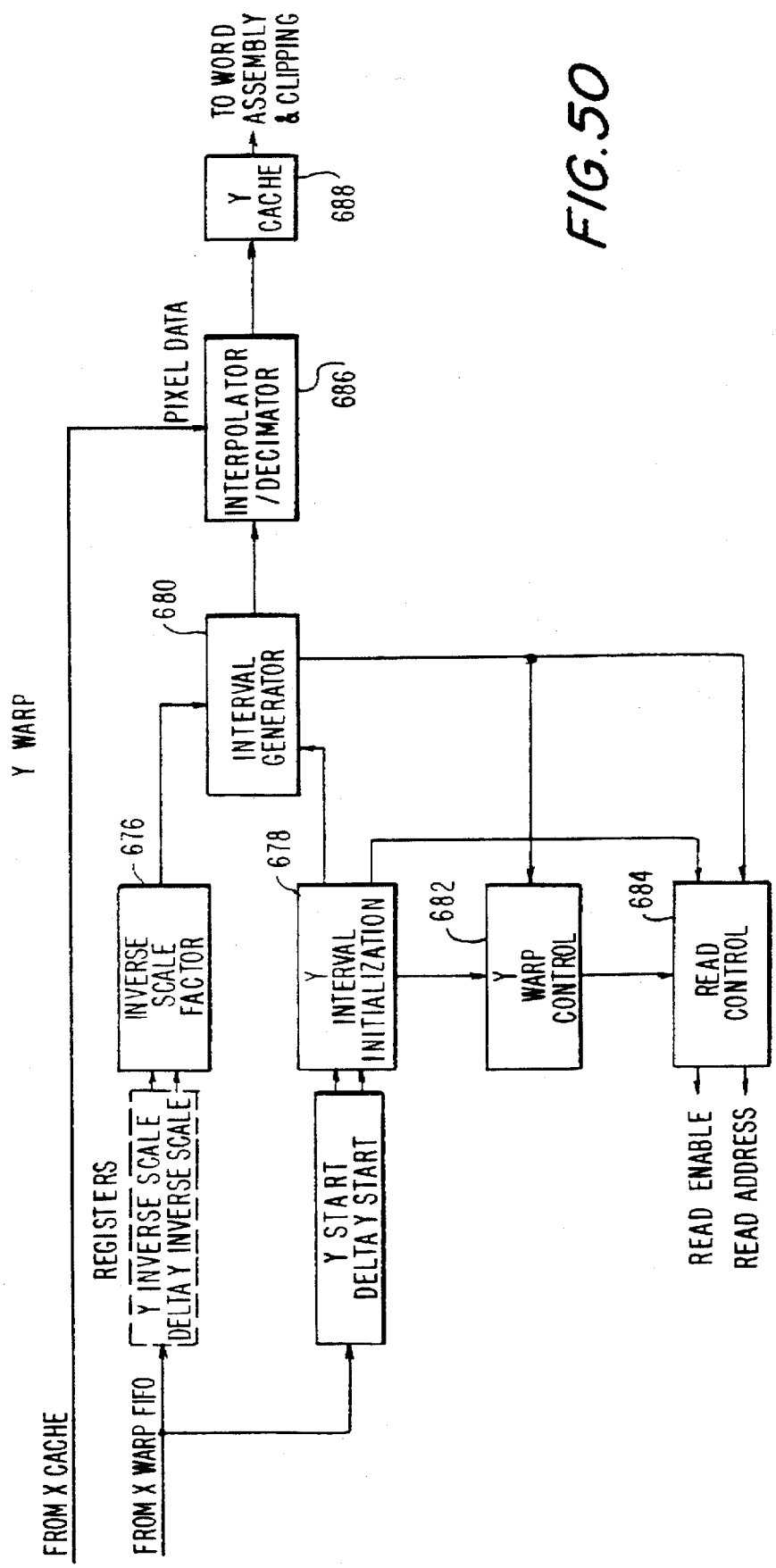
FIG. 50 is an illustrative embodiment of the y warping circuitry of the present invention.

The design of the y warp circuitry shown in FIG. 50 is nearly identical to the x warp circuitry. One minor difference between the two implementations results from the fact that the y warp inputs are received from the x cache circuitry instead of from the frame buffer 592. Another difference is that a single rather than a dual pixel pipe is used. There are also differences in the parameter fetch mechanisms. Further, there is a fixed region of interest in the x cache.

The dual pixel pipe of the interpolator/decimator circuitry 638 of the x warp circuitry 606 is needed in order to fetch the pixel neighborhood needed for cubic convolution while maintaining the needed pixel processing rates. The x warp circuitry 606 must process the pixel neighborhood in both x and y dimensions. The y warp interpolator/decimator 686 in the y warp circuitry 612 does not need extra pixels in the x dimension since x axis processing has been completed. Thus, throughput requirements are relaxed, and pre-fetch of pixels along image columns does not need to occur concurrently with processing of the previous column. The dual VRAM shifter path design of the frame buffer 592 permits an SRT cycle to occur in one VRAM bank while the alternate bank is accessed to process image data. The x patch cache circuitry design permits a new starting row and column address to be loaded without variable latency. Thus, a dual data path design is not needed for the y warp circuitry 612. Based on these considerations, only one of the two pixel pipes in FIG. 37 is used for the y warp circuitry 612. The second pipe may be omitted. Alternately, an identical interpolator FPGA configuration may be used for x and y sections, with the control signals for the second pipe tied low for use in the y warp circuitry 612.

The y warp circuitry 612 obtains the four warp control parameters from a FIFO memory in the x warp circuitry 606, using a dedicated bus. Thus, no parameter frame addressing mechanism is needed in the y warp circuitry 612, and this circuitry is omitted. The y warp control parameters (FIG. 33), and inverse scale factor circuitry 676, y interval initialization circuitry 678, and interval generator circuitry 680 are identical to the x warp circuitry case with one exception. As described above, the Y START parameter requires only 6 bits of precision in the integer (whole) portion. Thus, the U_INIT accumulator of the x interval initialization circuitry 636 is modified in the V_INIT accumulator of the y interval initialization circuitry 678 to carry 4 fewer bits of precision.

The x warp circuitry 606 must process a variable number of rows in the input image, based on the region of interest for the y warp, and specified by the Y_MIN and Y_EXTENT parameters. In contrast, The y warp circuitry always processes exactly 32 columns in the patch image in the x cache circuitry (see FIG. 29), starting at the zero x ordinate. Thus, no corresponding X_MIN or X_EXTENT parameters are required. The y warp control circuitry 682 uses a modified FSM design, and different microcode to account for these simplifications. Also, the shift control circuitry 640 of the x warp circuitry 606 is replaced by the read control circuitry 684 of the y warp circuitry 612, which performs the similar function of "shifting" pixels into the pixel pipe under control of a small FSM, by toggling the RD signal of the x cache circuitry address generator.

Figure 51:
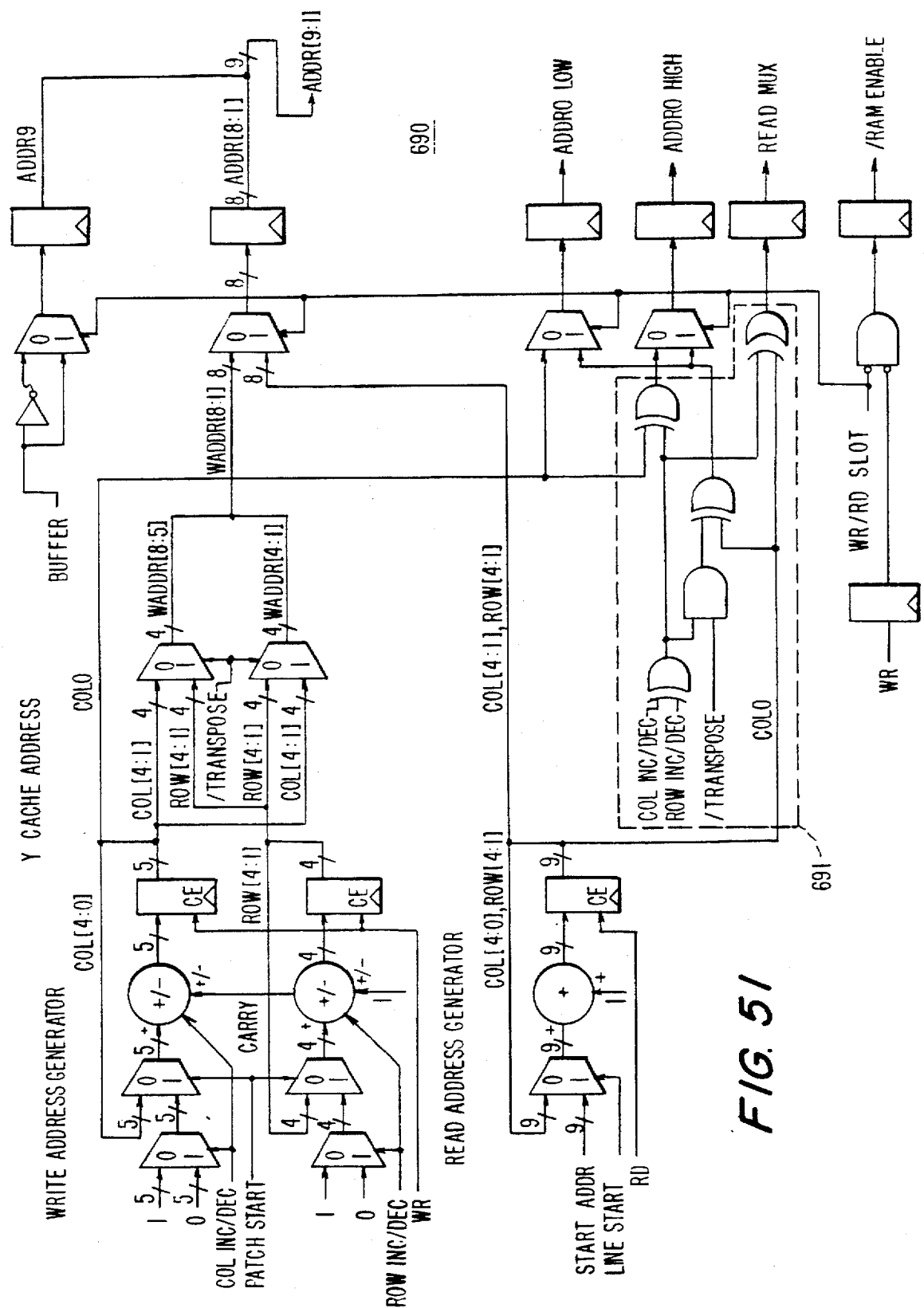
FIG. 51 is an illustrative embodiment of the y cache address circuitry of the present invention.

The y cache memory 688 is similar to the x cache memory 642 (FIG. 34). As shown in FIG. 51, a preferred design for cache address generation circuitry 690 uses the same banded memory organization as the x cache design of FIG. 47, but adds features which aid in image transformation. Preferably, an image mirroring function is provided to compensate for the odd number of mirrors in a folded optical design. Image rotations at 90 degree increments are also desired. The warp transforms can produce high quality rotations of ±45 degrees and with the addition of 90 degree rotations, a smooth 360 degree rotation range can be obtained. Because the y cache memory 614 always contains 32×32 pixel square patches, these functions can be conveniently implemented on writes into the y cache memory 614 using a combination of transposition and incrementing or decrementing row and column address counters.

The image transformation functions of the cache are controlled by three bits supplied from a PC-accessible register (not shown). The three control bits are COL_INC/DEC, ROW_INC/DEC, and !TRANSPOSE. The write address generator contains two counter sections, one for the row address and one for the column address. Each counter section can be independently set for an incrementing or decrementing count, using the control bits. At start of patch, the two counter sections are initialized. Each counter is initialized to all zeros if incrementing, or all ones if decrementing. The counters are incremented or decremented under control of the WR control, as before. Also, the row counter carry output is fed into the column counter, so that the write address wraps around at patch boundaries, as before. The !TRANSPOSE control signal permits the exchange of row and column address for address (and thus image) transposition into the slot multiplexer, which is arranged as before.

Cache address generation circuitry 690 contains a loadable read address generator, as in the x cache circuitry design of FIG. 47. Fewer bits are provided, since image height in the cache is a maximum of 32 bits. In an FPGA implementation, the extra cache memory is unused. In a standard cell chip, the y cache circuitry is ¼ the size of the x cache circuitry. Reads in the y cache circuitry always proceed in row order. The loadable counter provides access to sub-regions in the patch, for example to implement clipping.

Given the ability to increment or decrement both row and column addresses, and transpose rows and columns, the combinations of rotation and mirroring listed in Table 1. are possible:

TABLE 1

| ROW_INC/DEC | COL_INC/DEC | TRANSPOSE | |
|---|---|---|---|
| 0 | 0 | 0 | normal image |
| 1 | 0 | 0 | mirror |
| 1 | 0 | 1 | CW 90 |
| 0 | 10 | 1 | CW 90, mirror |
| 1 | 1 | 0 | 180 |
| 0 | 1 | 0 | 180, mirror |
| 0 | 1 | 1 | CCW 90 |
| 1 | 1 | 1 | CCW 90, mirror |

The image transformations given in Table 1 are performed on a patch-wise basis. Thus, it must be noted that corresponding adjustments must be made in the list of patch parameter frames so that the order in which patches are processed is correct. For example, to perform simple mirroring, the order of the patch stream should proceed from right to left, because the patches are always stored in incrementing row-then-column order at the transformation core output. Patches may be processed at the input in any order desired, so that all of the transformations are accommodated.

When decrementing either rows or columns, the byte order of pixels in the 16 bit cache data paths must be reversed to maintain proper pixel order. This is done by logic 691 by reversing the polarity of the signals which control byte swapping in the data multiplexers, depending on the combination of transformation control bits asserted, as shown in FIG. 51.

Output Section

As shown in FIG. 30, image processor 584 has an output section 692 that contains word assembly and clipping circuitry 694, display buffer 590, and display buffer controller 594, video digital-to-analog converter 696, and display control circuitry 698.

Assemble and clip circuitry 694 is used to convert pixel data to the desired format for storage in display buffer 590, and to clip the output data in order to provide for update of the display buffer in increments finer than the 32 pixel square patch size. This block also generates the addresses needed for sequential storage of processed patches.

Pixel data is displayed at 8 bits/pixel (BPP) resolution. However, display buffer 590 is also used for intermediate storage of image data to be downloaded into memory 90 of personal computer 76, via direct memory access (DMA) controller 700 and host interface circuitry block 702. Such intermediate data may be stored in 8 BPP, 4 BPP, or 1 BPP formats. The 4 BPP data format is produced by rounding image data, and is provided so that images may be stored more efficiently in PC memory 90. This is particularly useful for storage of text images which will be re-scaled and thresholded for display in low vision applications. The 1 BPP format is produced by thresholding the image data using a PC-set threshold level, and is used for most efficient storage of text image data. Further, image processor 584 uses thresholding and re-expansion of image data to 8 BPP by bit duplication, for high-contrast display of text in low-vision applications.

Three PC-accessible registers are provided to control the destination address of pixel data in display buffer 590. Two of the registers are used to specify the origin in the display buffer 590 for update from a stream of patch data. The third register is used to specify the pitch, in patches, of update in the x direction. Counters, initialized from these registers, are used to generate the incremental addresses used to write data into display buffer 590. Display buffer updating always proceeds in patch order in row then column order from top left to bottom right of the update region. Update within patches proceeds in the same order. This does not constrain the transformation of images, since any patch order may be specified in the input image by the list of parameter frames in the control store.

Four PC-accessible registers are provided to define the clipping window in the address space of display buffer 590. These registers are set by the PC to define the (x,y) coordinates of the rectangular clipping window. Any output pixel generated with an address falling outside the clip window will not be written into display buffer 590, as implemented using four magnitude comparator circuits. For efficiency, the patch stream is setup (via the parameter frames) so that only patches intersecting or falling within the clipping window are processed.

Display buffer 590 is implemented using the same VRAM memory chips as frame buffer 588. Sufficient memory is provided to double-buffer images at 640×480 resolution.

Note that higher display resolutions are obtained by scaling in the display control circuitry 698, described below. Double-buffering is preferably used to prevent update artifacts, such as rolling update, in display monitor 600. The random access port of the VRAM is used for image storage, and for PC-access. Sufficient bandwidth must be provided to permit real-time display of images processed by transformation core 586. In the double-buffered scheme, a 64 bit data path can be provided, so that VRAM static column mode writes will permit real-time display of 4:2:2 coded color images. In configuring display buffer 590 for this mode, the data ports and memory banks are arranged to permit re-multiplexing the luminance and color difference components on the VRAM shifter outputs.

Display buffer controller 594 provides VRAM control signal sequences, multiplexed addresses, and data path multiplexing to implement, in priority order: VRAM SRT cycles for display refresh, pixel storage from assemble and clip circuitry 694, memory refresh cycles, and PC access.

Display control circuitry 698 and video digital-to-analog converter 696 are preferably implemented using a chip such as part No. Bt885 available from Brooktree Corporation. This chip is preferably connected to a graphics adapter card in personal computer 76, using the standard VGA pass-through connector. This permits the computer display and digital video to be presented on a single CRT display using a windowed format. Display control circuitry 698 buffers the incoming video data stream from the VRAM in display buffer 590 using a FIFO stack and decodes the 4:2:2 format color signals into signals in the RGB format. Display control circuitry 698 also scales the video image to fit the chosen window size, and overlays the video data with computer graphics data using chroma-key detect and video window features. Display control circuitry 698 derives all video timings from VGA pass-through signals. Thus, display buffer controller 594 does not need to generate any video timing signals, and display resolutions greater than 640×480 are supported. Display buffer control circuitry 698 maintains a handshake with the display buffer controller 594 to perform VRAM SRT cycles as required, and to clock the VRAM shifters of display buffer 590 into the FIFO in display control circuitry 698 on a line by line and as-needed basis. Due to the FIFO, shift clock cycles need not be synchronized to the output pixel clock, which is derived from the VGA pass-through connector.

Thus, a scanning camera with both a real-time mode and a high resolution mode is provided. A scanning camera with a highly repeatable, low cost tiling system is also provided. Further, a tiling mechanism with minimal settling time is provided. A scanning camera with zoom and prescan capabilities is also provided. A hybrid zoom arrangement has also been provided that allows the magnification of an image on a display to be adjusted both mechanically—by automatically switching between lenses with different magnifications—and electronically, using electronic image processing to magnify the image. Techniques and circuitry for image processing have been provided that allow a user to remove undesirable motion blur from the real time image that would otherwise result from the relative displacement of the two interlaced video fields in a video frame. Techniques and circuitry for image processing have also been provided that allow an input image to be patch-wise warped into an output image. An optical encoder for accurately determining the position of a deflector such as a mirror has been provided that images a target pattern onto a split photodiode to generate position feedback signals that can be used to precisely position the mirror.

It will be appreciated by those skilled in the art that many modifications are possible to the preferred embodiment specified here without departing from the spirit of the invention. For example, the use of VRAM memories in the frame and display buffers is not required. Any memory configuration providing the required bandwidth may be used. For example, DRAM memories with a 64-bit bus width could be used. The size of patches need not be fixed at 32 pixels square. Larger or smaller patch sizes may be employed to provide alternate tradeoffs in bandwidth, intermediate buffer size, and the granularity of piece-wise approximation. The video input video section and display output sections are optional. As multimedia features are more commonly provided on computers, and as faster system busses are employed, only the image transformation core need be provided. Further, if speed constraints do not dictate otherwise, the software-only arrangement of the present invention may be preferred. If desired, circuitry such as the transformation core circuitry can be used in applications that do not use a personal computer. Such stand-alone devices include scanners, cameras, copiers, and reading appliances for the visually impaired.

What is claimed is:

1. An image input device for providing a composite image of an object, the composite image comprising a plurality of two-dimensional sub-images, the system comprising:

a multi-pixel image sensor for receiving one of the plurality of two-dimensional sub-images and for providing electrical signals representative of the two-dimensional sub-image;

a lens for focusing the two-dimensional sub-image onto the image sensor;

a rotatable disk having a plurality of optical elements each of which may be rotated to come to rest between the object and the lens, each optical element corresponding to one of the plurality of two-dimensional sub-images, for deflecting one of the plurality of two-dimensional sub-images onto the lens, such that when each two-dimensional sub-image is deflected onto the lens, that two-dimensional sub-image fills the lens completely; and control means for rotating the rotatable disk so that each of the two-dimensional sub-images that comprise the composite image is sequentially deflected onto the image sensor via the lens while the disk is at rest.

2. The apparatus of claim 1, further comprising memory means coupled to the image sensor for storing the electrical signals representative of the two-dimensional sub-images.

3. The apparatus of claim 2, further comprising processing means for combining the electrical signals representative of the two-dimensional sub-images stored in memory to provide an electrical representation of the composite image.

4. The apparatus of claim 1, wherein the image sensor comprises a charge-coupled device.

5. The apparatus of claim 1, further comprising means for illuminating the object.

6. The apparatus of claim 1, further comprising optical zoom means located in the optical path between the lens and the rotatable disk.

7. An image input device for providing a composite image of an object, the composite image comprising a plurality of two-dimensional sub-images, the system comprising:

a multi-pixel image sensor for receiving one of the plurality of two-dimensional sub-images and for providing electrical signals representative of the two-dimensional sub-image;

a lens for focusing the two-dimensional sub-image onto the image sensor;

a moveable optical deflection means having a plurality of optical elements, each corresponding to one of the plurality of two-dimensional sub-images, for deflecting one of the plurality of two-dimensional sub-images onto the lens; and control means for moving the optical deflection means so that each of the two-dimensional sub-images that comprise the composite image is sequentially deflected onto the image sensor via the lens, wherein the optical deflection means comprises a holographic optical disk that is brought to rest by the control means when the two-dimensional sub-images are sequentially deflected, the plurality of optical elements comprising holographic elements.

8. An image input device for providing a composite image of an object, the composite image comprising a plurality of two-dimensional sub-images, the system comprising:

an image sensor for receiving one of the plurality of two-dimensional sub-images and for providing electrical signals representative of the two-dimensional sub-image;

a lens for focusing the two-dimensional sub-image onto the image sensor;

a moveable optical deflection means having a plurality of optical elements, each corresponding to one of the plurality of two-dimensional sub-images, for deflecting one of the plurality of two-dimensional sub-images onto the lens;

control means for moving the optical deflection means so that each of the two-dimensional sub images that comprise the composite image is sequentially deflected onto the image sensor via the lens while the optical deflection means is at rest; and a plurality of focus correction means located in the optical path between the lens and the optical deflection means, wherein each focus correction means is associated with one of the optical elements for correction for the variations in the distance between the object and the lens.

9. The apparatus of claim 8 wherein each of the optical elements comprises a holographic deflecting element that incorporates a corrective lens.

10. An image input device for providing a composite image of an object, the composite image comprising a plurality of two-dimensional sub-images, the system comprising:

a multi-pixel image sensor for receiving one of the plurality of two-dimensional sub-images and for providing electrical signals representative of the two-dimensional sub-image;

a lens for focusing the two-dimensional sub-image onto the image sensor;

a variable optical deflection means having a plurality of optical settings, each corresponding to one of the plurality of two-dimensional sub-images, for deflecting one of the plurality of two-dimensional sub-images onto the lens, the variable optical deflection means being disposed between the object and the lens; and control means for moving the optical deflection means so that each of the two-dimensional sub-images that comprise the composite image is sequentially deflected onto the image sensor via the lens, such that when each two-dimensional sub-image is deflected onto the lens, that two-dimensional sub-image fills the lens completely, wherein the control means brings the optical deflection means to rest as each two-dimensional sub-image is sequentially deflected onto the image sensor.

11. The apparatus of claim 10, further comprising memory means coupled to the image sensor for storing the electrical signals representative of the two-dimensional sub-images.

12. The apparatus of claim 11, further comprising processing means for combining the electrical signals representative of the two-dimensional sub-images stored in memory to provide an electrical representation of the composite image.

13. The apparatus of claim 10 wherein the variable optical deflection means comprises a mirror galvanometer.

14. The apparatus in claim 10 wherein the variable optical deflection means has a further optical setting in which an additional image is deflected onto the image sensor, the image sensor providing a real-time imaging capability.

15. A scanning digital video camera for providing a video representation of an object image, the camera comprising:
   an array of a plurality of photosensitive elements, for providing an electrical representation of a received image;
   a lens for focusing an image onto the photosensitive array;
   tiling means for dividing the image of an object into a plurality of two-dimensional image tiles, the tiling means comprising a moveable set of fixed optical deflection elements, each element corresponding to a two-dimensional image tile;
   means for positioning the tiling means so that each of the plurality of two-dimensional image tiles is sequentially deflected to the lens, such that the tiles overlap;
   a memory coupled to the photosensitive array for storing the electrical representation of each received image;
   control means coupled to the positioning means and the memory means, for causing the positioning means to step sequentially through each of the plurality of two-dimensional image tiles and for causing the memory means to store the electrical representation of each two-dimensional image tile, the control means causing the positioning means to come to rest each time the positioning means steps through one of the plurality of two-dimensional image tiles; and
   processing means for combining the two-dimensional image tile representations stored in memory to produce an electrical representation of the object image.

16. A scanning video camera comprising:
   a base for supporting an object to be imaged;
   a monochromatic illuminating means for illuminating the object;
   means for optically dividing an image of the object into a plurality of two-dimensional image tiles;
   a multi-pixel optical imaging means for providing an electrical output representative of a received image;
   an optical deflection means for deflecting the image of one of the plurality of tiles comprising the object image onto the imaging means;
   control means for causing the optical deflection means to scan sequentially the plurality of tiles, the control means causing the optical deflection means to come to rest each time the optical deflection means deflects the image of one of the plurality of tiles onto the optical imaging means; and
   processing means coupled to the optical imaging means and the control means for combining a plurality of images received by the imaging means into a composite image, the processing means correcting for image distortion.

17. The apparatus of claim 16 wherein the processing means performs electronic image warping to correct for angle-of-view distortion.

18. The apparatus in claim 16 wherein the optical deflection means further comprises means for deflecting an additional image onto the optical imaging means, the optical imaging means providing a real-time imaging capability.

19. An optical imaging system, comprising:
   a multi-pixel image sensor having a fixed number of pixels for receiving a two-dimensional optical sub-image and for providing an electrical representation of the received sub-image;
   moveable tiling means having a plurality of image deflectors for optically dividing the image of an object into a plurality of two-dimensional sub-images and for deflecting each two-dimensional sub-image to the image sensor;
   positioning means coupled to the tiling means, for sequentially positioning each image deflector to deflect its corresponding two-dimensional sub-image to the image sensor in a predetermined sequence, the positioning means causing the tiling means to come to rest each time the positioning means positions one of the image deflectors to deflect its corresponding two-dimensional sub-image to the image sensor; and
   image processing means, coupled to the image sensor and the tiling means, for receiving the electrical representation of each two-dimensional sub-image from the image sensor and combining the two-dimensional sub-images to form a composite image comprising a number of pixels greater than the fixed number of pixels in the image sensor, the image processing means correcting for image distortion produced by individual image deflectors.

20. The apparatus of claim 19, further comprising an imaging lens positioned between the image sensor and the tiling means for focusing the two-dimensional sub-image from the tiling means onto the image sensor.

21. The apparatus of claim 20 wherein the tiling means comprises a disk of mirrors.

22. The apparatus of claim 20, wherein the tiling means comprises a disk of prisms.

23. The apparatus of claim 20, wherein the tiling means comprises a linear array of mirrors.

24. The apparatus of claim 20, wherein the tiling means comprises a linear array of prisms.

25. The apparatus of claim 20, wherein the tiling means further comprises a focusing means and a motor-driven lens between the focusing means and the imaging lens for deflecting an image of the entire object to the image sensor, so that a prescan function may be performed.

26. The apparatus of claim 19, wherein the image processing means comprises a memory means for storing an electrical representation of each two-dimensional sub-image and a processor for combining the two-dimensional sub-images to form the composite image.

27. The apparatus of claim 26, further comprising frame grabber means coupled to the image sensor and the processor, for buffering frames between the image sensor and the processor.

28. The apparatus of claim 19, wherein the positioning means comprises a stepping motor.

49

29. The apparatus of claim 19, wherein the tiling means further comprises a focus correction means for each of the image deflectors.

30. The apparatus of claim 19, wherein the image sensor comprises a charge-coupled device.

31. An optical imaging system, comprising:

an image sensor having a fixed number of pixels for receiving a two-dimensional optical sub-image and for providing an electrical representation of the received sub-image;

moveable tiling means having a plurality of image deflectors for optically dividing the image of an object into a plurality of two-dimensional sub-images and for deflecting each two-dimensional sub-image to the image sensor;

positioning means coupled to the tiling means, for sequentially positioning each image deflector to deflect its corresponding two-dimensional sub-image to the image sensor in a predetermined sequence while the positioning means is at rest; and image processing means, coupled to the image sensor and the tiling means, for receiving the electrical representation of each two-dimensional sub-image from the image sensor and combining the two-dimensional sub-images to form a composite image comprising a number of pixels greater than the fixed number of pixels in the image sensor, wherein the tiling means comprises a disk of offset plano-convex lens pairs.

32. An optical imaging system, comprising:

an image sensor having a fixed number of pixels for receiving a two-dimensional optical sub-image and for providing an electrical representation of the received sub-image;

moveable tiling means having a plurality of image deflectors for optically dividing the image of an object into a plurality of two-dimensional sub-images and for deflecting each two-dimensional sub-image to the image sensor;

positioning means coupled to the tiling means, for sequentially positioning each image deflector to deflect its corresponding two-dimensional sub-image to the image sensor in a predetermined sequence while the positioning means is at rest; and image processing means, coupled to the image sensor and the tiling means, for receiving the electrical representation of each two-dimensional sub-image from the image sensor and combining the two-dimensional sub-images to form a composite image comprising a number of pixels greater than the fixed number of pixels in the image sensor, wherein the tiling means comprises a linear array of offset plano-convex lens pairs.

33. An image input device for providing a composite image of an object, the composite image comprising a plurality of two-dimensional sub-images, the system comprising:

a multi-pixel image sensor for receiving one of the plurality of two-dimensional sub-images and for providing electrical signals representative of the two-dimensional sub-image;

a lens for focusing the two-dimensional sub-image onto the image sensor;

a movable linear array of optical elements each of which may be positioned to come to rest between the object and the lens, each optical element corresponding to one of the plurality of two-dimensional sub-images, for

50 deflecting one of the plurality of two-dimensional sub-images onto the lens, such that when each two-dimensional sub-image is deflected onto the lens, that two-dimensional sub-image fills the lens completely;

control means for positioning the optical deflection means so that each of the two-dimensional sub-images that comprise the composite image is sequentially deflected onto the image sensor via the lens.

34. The apparatus of claim 33, wherein the linear array comprises an array of prisms.

35. The apparatus of claim 33, wherein the linear array comprises an array of mirrors.

36. An image input device for providing a composite image of an object, the composite image comprising a plurality of two-dimensional image tiles, the system comprising:

a multi-pixel image sensor for receiving one of the plurality of two-dimensional image tiles and for providing electrical signals representative of the two-dimensional image tiles, the image sensor having a fixed number of pixels;

a lens for focusing the two-dimensional image tiles onto the image sensor;

a variable optical deflection means having a plurality of optical settings, each corresponding to one of the plurality of two-dimensional image tiles, for deflecting one of the plurality of two-dimensional image tiles onto the lens, the variable optical deflection means deflecting the two-dimensional image tiles so that the two-dimensional image tiles overlap;

control means for moving the optical deflection means so that each of the two-dimensional image tiles is sequentially deflected onto the image sensor via the lens, the control means bringing the optical deflection means to rest each time one of the two-dimensional image tiles is deflected onto the lens; and means for combining the two-dimensional image tiles to form a composite image comprising a number of pixels greater than the fixed number of pixels in the image sensor, wherein the overlap of the two-dimensional image tiles allows the means for combining to form the composite image without gaps.

37. An image input device for providing a two-dimensional image of an object located in an object plane comprising:

a first mirror;

a second mirror;

a first drive motor for positioning the first mirror;

a second drive motor for positioning the second mirror;

a lens for focusing the two-dimensional image;

a multi-pixel image sensor, wherein the image sensor generates: (1) a first field of pixels when the first and second mirrors are at rest in a first mirror position, such that a first portion of the two-dimensional image is deflected onto the sensor, and (2) a second field of pixels when the first and second mirrors are at rest in a second mirror position, such that a second portion of the two-dimensional image is deflected onto the sensor;

memory for storing the first field of pixels at first memory addresses and the second field of pixels at second memory addresses;

a display on which the two-dimensional image is displayed; and control means for controlling the position of the first and second mirrors with the first and second motors, and for calculating the relative displacement between the first and second portions of the two-dimensional image based on the first and second mirror positions, the control means receiving the first and second fields of pixels and adjusting the first and second addresses to compensate for blur in the interlaced video signal, so that the image of the object on the display is not blurred.

38. The input image device of claim 37, wherein:
the memory comprises a video frame buffer for receiving and storing the interlaced video signal; and
the control means comprises a buffer controller connected to the video buffer for adjusting the relative addressing of the first and second fields of pixels.

39. The image input device of claim 38, further comprising a user interface for receiving positioning commands from a user and providing these commands to the control means, the control means positioning the first and second mirrors in response to the positioning commands.

40. An image input device for providing a composite image of an object, the system comprising:
a multi-pixel image sensor for receiving one of a plurality of two-dimensional sub-images of the object and for providing electrical signals representative of the two-dimensional sub-image;
a lens for focusing the two-dimensional sub-image onto the image sensor;
a variable optical deflection means having a plurality of optical settings, each corresponding to one of the plurality of two-dimensional sub-images, for deflecting one of the plurality of two-dimensional sub-images onto the lens, the variable optical deflection means being disposed between the object and the lens;
control means for moving the optical deflection means so that each of the two-dimensional sub-images is sequentially deflected onto the image sensor via the lens, such that when each two-dimensional sub-image is deflected onto the lens, that two-dimensional sub-image fills the lens completely, wherein the control means brings the optical deflection means to rest as each two-dimensional sub-image is sequentially deflected onto the image sensor;
means for processing the electrical signals that are representative of the two-dimensional sub-images, so that each two-dimensional sub-image is warped to form a warped sub-image to compensate for distortion; and
means for assembling each of the warped sub-images to form a composite image.

41. The image input device of claim 40, wherein the means for processing the electrical signals comprises an image processing circuit for digitally patch-wise warping each of the two-dimensional sub-images, the two-dimensional sub-image being divisible into a plurality of multi-pixel image patches, the image processing circuit comprising:
first warping circuitry for performing a first warping pass on one of the image patches to create an intermediate image patch, the first warping pass corresponding to a first axis of the image patch; and
second warping circuitry for performing a second warping pass on the intermediate image patch to create a final image patch, the second warping pass corresponding to a second axis of the image patch, the first and second axes being distinct.

42. The image input device of claim 41, wherein the first warping circuitry comprises:

x warping circuitry for receiving the image patch and for transforming the image patch to the intermediate image patch;
x cache memory; and
x cache control circuitry connected between the x warping circuitry and the x cache memory for storing the intermediate image patch in the x cache memory.

43. The image input device of claim 41, wherein the second warping circuitry comprises:
y warping circuitry for receiving the intermediate image patch and for transforming the intermediate image patch to the final image patch;
y cache memory; and
y cache control circuitry connected between the y warping circuitry and the y cache memory for storing the final image patch in the y cache memory.

44. The image input device of claim 40, wherein the means for processing the electrical signals comprises a control store in which parameters are stored that represent geometrical transform data obtained from calibration using a fiducial pattern.

45. The image input device of claim 40, wherein the variable optical deflection means comprises at least one mirror having a front mirror surface and a rear mirror surface, the image input device further comprising:
a target pattern;
means for illuminating the target pattern; and
sensor means for receiving an image of the target pattern that is indicative of the position of the mirror.

46. The image input device of claim 45, wherein the means for illuminating the target pattern is a lamp.

47. The image input device of claim 46, wherein:
the sensor means comprises a lens and a split diode photodetector; and
the target pattern is disposed adjacent to the rear mirror surface so that the rear mirror surface deflects the image of the target pattern onto the photodetector via the lens, the photodetector generating an output signal that is indicative of the position of the mirror.

48. The image input device of claim 45, wherein the means for illuminating the target pattern is a laser diode.

49. The image input device of claim 48, wherein:
the sensor means comprises a split diode photodetector;
the target pattern is disposed on the rear surface of the mirror; and
when the laser diode illuminates the target pattern the image of the target pattern is provided to the photodetector, the photodetector generating an output signal that is indicative of the position of the mirror.

50. The image input device of claim 40, wherein the two-dimensional sub-images are provided to the multi-pixel image sensor along an optical path, and wherein the lens comprises:
a first lens arrangement having a first magnification, and
a second lens arrangement having a second magnification, the image input device comprising means for placing in the optical path one of: (1) the first lens arrangement, and (2) the second lens arrangement, to adjust the magnification of the image, wherein the means for processing the electrical signals electronically varies the magnification of the two-dimensional sub-images.

51. The image input device of claim 50, wherein the means for placing comprises a shuttle mechanism connected to the first and second lens arrangements.

52. The image input device of claim 50, wherein the means for placing comprises a motor for rotating a rotatable cube containing the first and second lens arrangements.

53. The image input device of claim 50, wherein the means for processing the electrical signals comprises a frame grabber for electronically acquiring the electrical signals from the image sensor and scaling the magnification of the image in real time.

54. The image input device of claim 50, wherein the means for processing the electrical signals comprises a dedicated image processor.

55. The image input device of claim 50, wherein the second lens arrangement has a magnification less than or equal to approximately 1.5× relative to the first lens arrangement.

56. The image input device of claim 50, wherein the second lens arrangement has a demagnification of less than or equal to approximately 1.5× relative to the first lens arrangement.

* * * * *